(12) United States Patent
Costa et al.

(10) Patent No.: US 9,178,995 B2
(45) Date of Patent: Nov. 3, 2015

(54) SYSTEMS AND METHODS FOR EVENT AND INCIDENT REPORTING AND MANAGEMENT

(71) Applicants: Marc Alexander Costa, Stanhope, NJ (US); Robert Edward Clark, Jr., Whitehouse Station, NJ (US); Akshay Ender Sura, Edison, NJ (US)

(72) Inventors: Marc Alexander Costa, Stanhope, NJ (US); Robert Edward Clark, Jr., Whitehouse Station, NJ (US); Akshay Ender Sura, Edison, NJ (US)

(*) Notice: Subject to any disclaimer, the term of this patent is extended or adjusted under 35 U.S.C. 154(b) by 0 days.

(21) Appl. No.: 14/071,393

(22) Filed: Nov. 4, 2013

(65) Prior Publication Data

US 2014/0058730 A1    Feb. 27, 2014

Related U.S. Application Data

(63) Continuation-in-part of application No. 13/566,996, filed on Aug. 3, 2012.

(60) Provisional application No. 61/612,926, filed on Mar. 19, 2012.

(51) Int. Cl.
| | |
|---|---|
| *H04M 11/04* | (2006.01) |
| *H04M 3/51* | (2006.01) |
| *G10L 15/26* | (2006.01) |
| *H04W 4/22* | (2009.01) |
| *G06F 17/28* | (2006.01) |
| *G06Q 10/06* | (2012.01) |
| *G06Q 10/10* | (2012.01) |
| *G06Q 50/10* | (2012.01) |

(52) U.S. Cl.
CPC ........... *H04M 3/5116* (2013.01); *G06F 17/289* (2013.01); *G06Q 10/06* (2013.01); *G06Q 10/10* (2013.01); *G06Q 50/10* (2013.01); *G10L 15/265* (2013.01); *H04W 4/22* (2013.01); *G10L 15/26* (2013.01)

(58) Field of Classification Search
CPC ......... H04W 4/22; G06F 17/28; G10L 15/26; H04M 3/5116
USPC ............................ 704/2, 4, 8, 235; 455/404.1
See application file for complete search history.

(56) References Cited

U.S. PATENT DOCUMENTS

| | | | |
|---|---|---|---|
| 5,636,122 A * | 6/1997 | Shah et al. ..................... 701/454 |
| 6,518,881 B2 * | 2/2003 | Monroe ...................... 340/539.1 |
| 7,231,396 B2 * | 6/2007 | Ayachitula et al. ................... 1/1 |
| 7,248,159 B2 * | 7/2007 | Smith ....................... 340/539.13 |
| 8,045,954 B2 * | 10/2011 | Barbeau et al. ............. 455/404.1 |
| 2001/0028364 A1 * | 10/2001 | Fredell et al. .................. 345/751 |
| 2003/0028536 A1 * | 2/2003 | Singh et al. ....................... 707/10 |
| 2003/0195775 A1 * | 10/2003 | Hampton et al. ................. 705/3 |

(Continued)

*Primary Examiner* — Shaun Roberts
(74) *Attorney, Agent, or Firm* — Lyman Smith

(57) ABSTRACT

Systems and methods for information and action management including managing and communicating critical and non-critical information relating to certain emergency services events or incidents as well as other applications. More specifically, systems and methods for information and action management including a plurality of mobile interface units that include one or more of a language translation sub-system, an action receipt sub-system, a voice-to-text conversion sub-system, a media management sub-system, a revision management sub-system that restricts the abilities of some users, and a report generation sub-system that creates reports operatively coupled to the language translation sub-system, the action receipt sub-system, the voice-to-text conversion sub-system, the media management sub-system, and the revision management sub-system to auto-populate report fields.

15 Claims, 38 Drawing Sheets

(56) References Cited

U.S. PATENT DOCUMENTS

| | | | |
|---|---|---|---|
| 2005/0203892 A1* | 9/2005 | Wesley et al. | 707/3 |
| 2006/0167686 A1* | 7/2006 | Kahn | 704/235 |
| 2009/0198641 A1* | 8/2009 | Tortoriello | 706/52 |
| 2011/0307241 A1* | 12/2011 | Waibel et al. | 704/2 |
| 2012/0190324 A1* | 7/2012 | Hatton et al. | 455/404.1 |

* cited by examiner

SYSTEMS AND METHODS FOR EVENT AND INCIDENT REPORTING AND MANAGEMENT

CROSS-REFERENCE TO RELATED APPLICATION

This application is a continuation-in-part of U.S. patent application Ser. No. 13/566,996, filed Aug. 3, 2012, currently pending, which claims the benefit of U.S. provisional application No. 61/612,926 filed Mar. 19, 2012, the contents of which are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright whatsoever.

BACKGROUND OF THE INVENTION

Embodiments of the present invention generally relate to systems and methods for event and incident reporting and management including managing and communicating critical and non-critical information relating to certain emergency services events or incidents, although this invention may also have applicability beyond emergency services. More specifically, the present invention relates to systems and methods for event and incident reporting and management including a plurality of mobile interface units that include one or more of a language translation sub-system, an action receipt sub-system, a voice-to-text conversion sub-system, a media management sub-system, a revision management sub-system that restricts the abilities of some users, and a report generation sub-system that creates reports operatively coupled to the language translation sub-system, the action receipt sub-system, the voice-to-text conversion sub-system, the media management sub-system, and the revision management sub-system to auto-populate report fields. Additional features include Live talk enabling users in different locations to share video feeds, e-ticketing enabling users to issue summons remotely, fingerprint feature which enables users to scan fingerprints of themselves (login ID) and others, heads up display enabling automobile manufacturers to incorporate functionality of this system into their current heads up display for emergency services vehicles, a remote app which enables smart phone users to communicate prospective threats they witness through GPS technology to the nearest emergency services dispatch location, suspect mapping feature which enables users to understand more about the connections persons of interest have, and a feature which enables an agency to communicate interactively with the public in order to update them on the status of various incidents. Each of the above-referenced sub-systems is implemented as discussed herein, for example, via execution of software by a client application interacting with a remote server and database.

Various systems and methods for information and action management exist in the art. Many such systems include an event recording component for recording events as they occur. The user interface portion of such components often present the user with appropriate data fields relevant to the incident being managed. For example, an interface customized for an Emergency Medical Technician may include data fields relating to the medical condition of an individual having a medical crisis. Additionally, such systems may include the ability to further expand and enrich the data entered by the user at the scene of the incident at a later time and/or in another location.

Information and action management systems may also include components to facilitate use of the system and entry of data by users and/or to enhance communication between a system user and individuals of the public. Systems may be controlled by speech of the user via a voice command recognition component. In addition, data entry facilitation components may include a voice-to-text sub-system that records the data that the user provides orally and translates that data into written text. In such a system, a user may present a request for a particular component to the system and/or provide the relevant data captured by the system orally. In addition to voice-to-text components, some systems include the ability to translate text to other languages to facilitate communication between system users and members of the public.

Information and action management systems are also present in the art that include personnel management components that allow management level users to instantly communicate direction and next steps to individual system users or a particular group of system users. For instance, some Computer Aided Dispatch ("CAD") systems include a central dispatch system and a mobile data terminal for each user that is in wireless communication with the central dispatch system. For instance personnel using the central dispatch system may communicate service assignments, maps showing the location of a particular assignment, and critical notes and information regarding particular situations to the mobile data terminal used by each user of the information and action management system. Additionally, mobile data terminal systems may include components for entry of information by the users thereof that is relayed back to the central dispatch system. Mobile data terminal systems are known in which the users may compare relevant data to existing remote databases. For instance, police officers may look up drivers licensing and/or vehicle registration information via a mobile data terminal system.

As can be seen, there is a need for improved systems and methods for event and incident reporting and management.

SUMMARY OF THE INVENTION

In one aspect of the present invention, an information management and action system employed for use by mobile and non-mobile users comprises an access sub-system operable to receive credentials from a user communicatively coupled to said management system, and that upon receiving said credentials, logs said user into said management system; an action sub-system operable to receive an action request from a first user and transmits said action request to a second user; one or more mobile interface units, each of said mobile interface units including a language translation sub-system, an action receipt sub-system, a voice-to-text conversion sub-system, a media management sub-system, a revision management sub-system that restricts abilities of at least a portion of said users, and a report generation sub-system that creates reports operatively coupled to at least one of said language translation sub-system, said action receipt sub-system, said voice-to-text conversion sub-system, said media management sub-system, and said revision management sub-system to auto-populate report fields. Additional features include Live talk enabling users in different locations to share video feeds, e-ticketing enabling users to issue summons remotely, fingerprint feature which enables users to scan fingerprints of themselves (login ID) and others, heads up display enabling automobile manufacturers to incorporate functionality of this system into their current heads up display for emergency services vehicles, a remote app which enables smart phone users to communicate prospective threats they witness through GPS technology to the nearest emergency services dispatch location, suspect mapping feature which enables users to understand more about the connections persons of interest have, and a feature which enables an agency to communicate interactively with the public in order to update them on the status of various incidents. The information management and action system further includes one or more non-mobile interface units; a central processing device operatively connected to said mobile interface units via a first network, said central processing device operatively connected to said non-mobile interface units via a second network; and an information storage sub-system internal to or operatively coupled to said central processing device.

These and other features, aspects and advantages of the present invention will become better understood with reference to the following drawings, description and claims.

DETAILED DESCRIPTION OF THE INVENTION

Figure 1A:
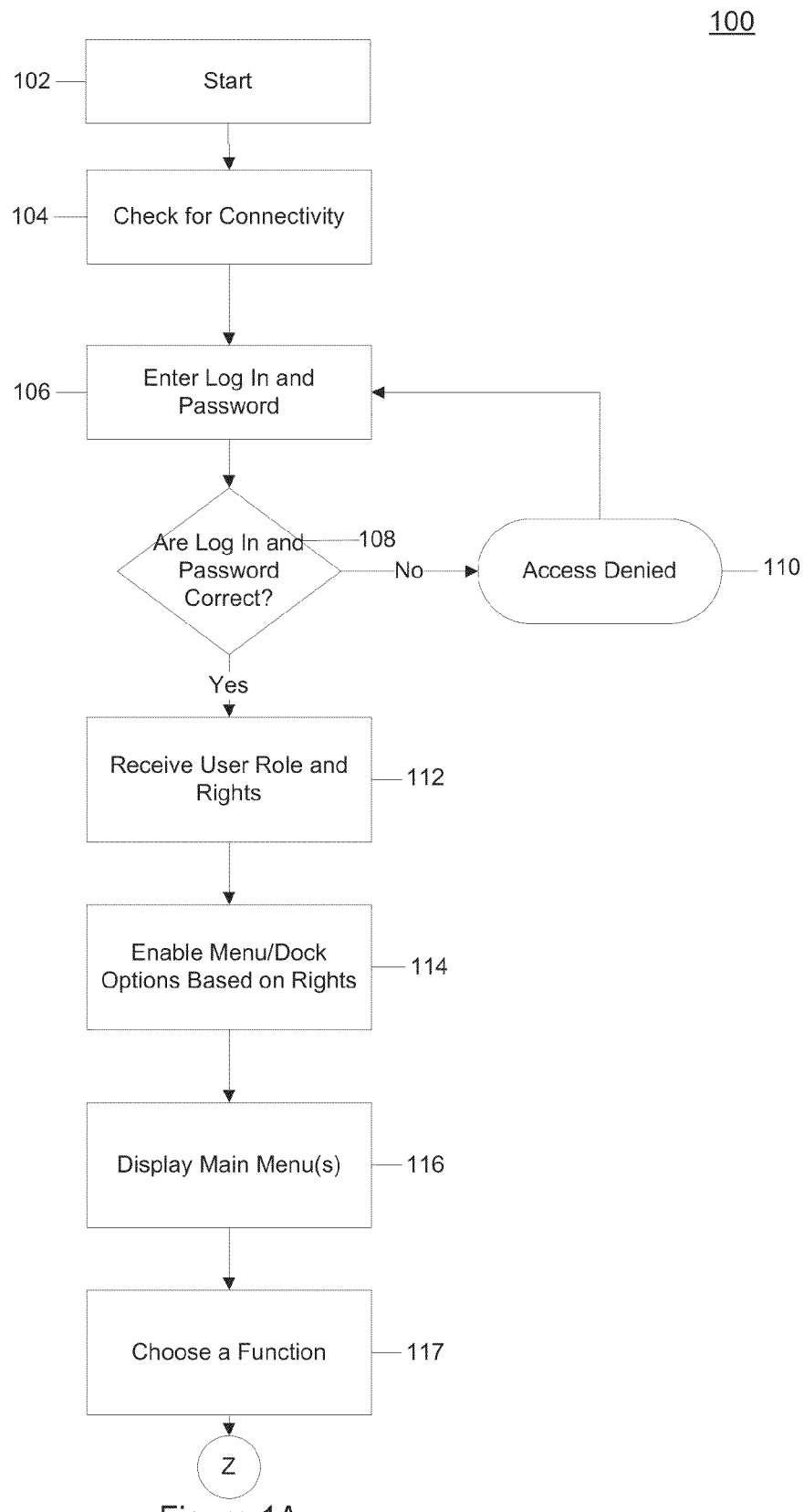
FIGS. 1A-1B depict a flowchart of an overview of an exemplary event and incident reporting and management method in accordance with one embodiment of the present invention including a CAD Sub-System, a Report Management Sub-System ("RMS"), and a Supervisor Management Sub-System (SMS)

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an information management and action system employed for use by a plurality of mobile and non-mobile users. This system includes an access sub-system that receives credentials from a user communicatively coupled to the management system, and that upon receiving the credentials, logs the user into the management system; an action sub-system that receives an action request from a first user and transmits the action request to a second user; a plurality of mobile interface units, each of the mobile interface units including a language translation sub-system, an action receipt sub-system, a voice-to-text conversion sub-system, a media management subsystem, a revision management sub-system that restricts abilities of at least a portion of the plurality of users, and a report generation sub-system that creates reports operatively coupled to at least one of the language translation sub-system, the action receipt sub-system, the voice-to-text conversion sub-system, the media management sub-system, and the revision management sub-system to auto-populate report fields; a plurality of non-mobile interface units; central processing device operatively connected to the plurality of mobile interface units via a first network, the central processing device operatively connected to the plurality of non-mobile interface units via a second network; and an information storage sub-system internal to or operatively coupled to the central processing device. Additional features include Live talk enabling users in different locations to share video feeds, e-ticketing enabling users to issue summons remotely, fingerprint feature which enables users to scan fingerprints of themselves (login ID) and others, heads up display enabling automobile manufacturers to incorporate functionality of this system into their current heads up display for emergency services vehicles, a remote app which enables smart phone users to communicate prospective threats they witness through GPS technology to the nearest emergency services dispatch location, suspect mapping feature which enables users to understand more about the connections persons of interest have, and a feature which enables an agency to communicate interactively with the public in order to update them on the status of various incidents.

TERMINOLOGY

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a user" may include a plurality of users. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the typical methods, constructs and materials are now described. All publications mentioned herein are incorporated herein by reference in their entirety. Where there are discrepancies in terms and definitions used in references that are incorporated by reference, the terms used in this application shall have the definitions given herein.

Example Computing Environment

Figure 2:
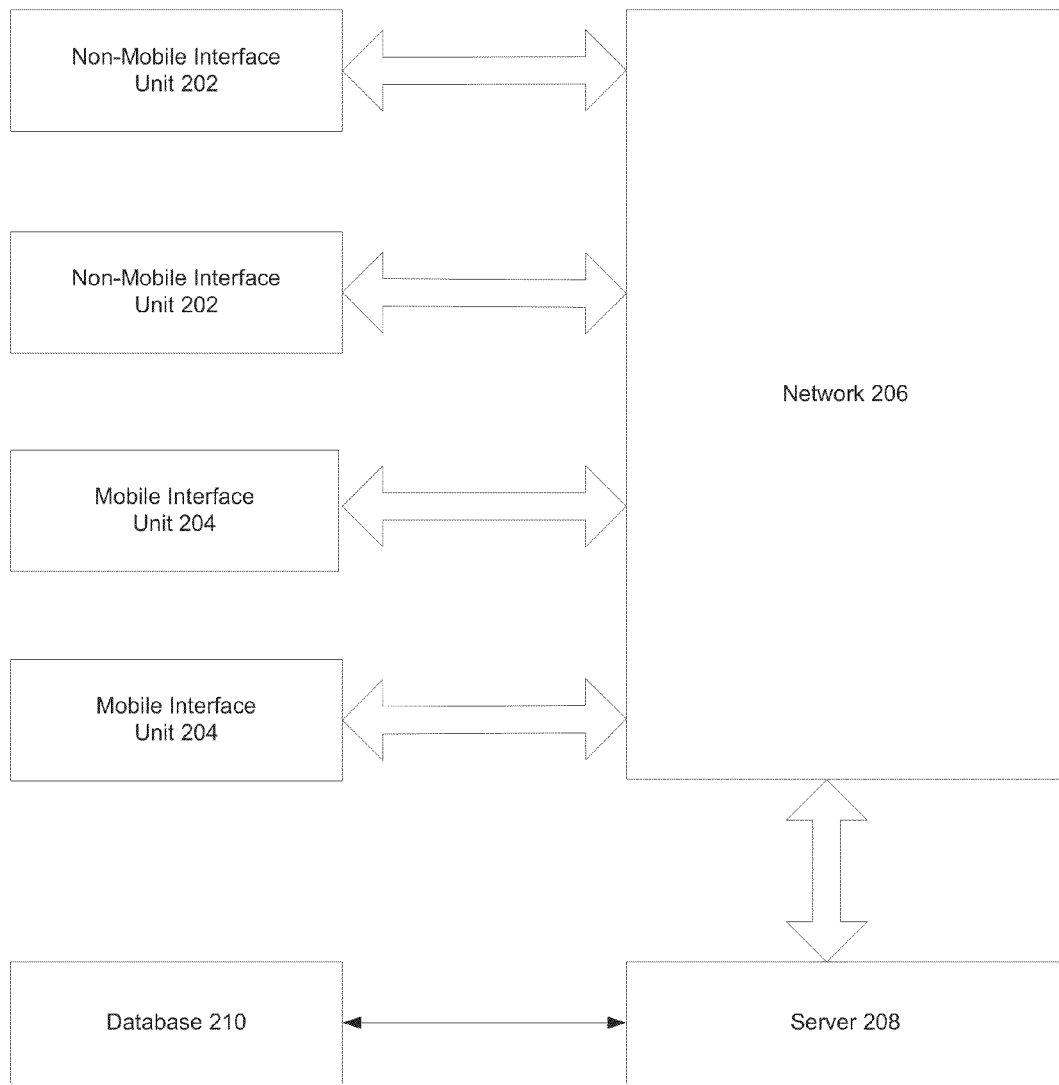
FIG. 2 is a block diagram of an exemplary computing environment within which various embodiments of the present invention may be implemented.
Figure 3:
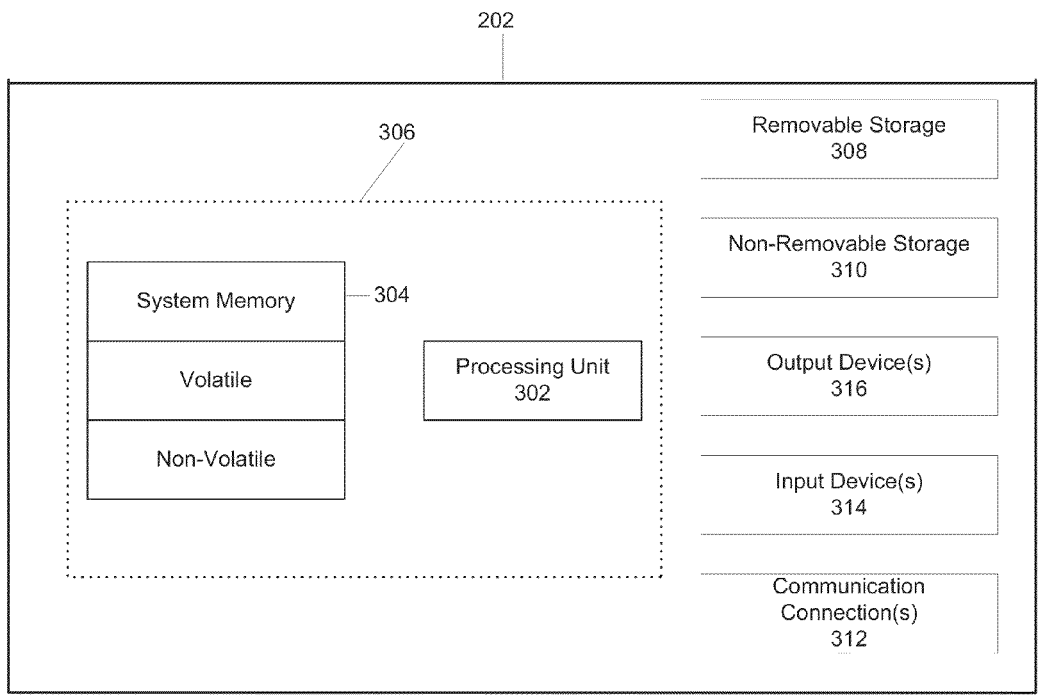
FIG. 3 is a block diagram of an exemplary non-mobile interface unit of the computing environment of FIG. 2.
Figure 4:
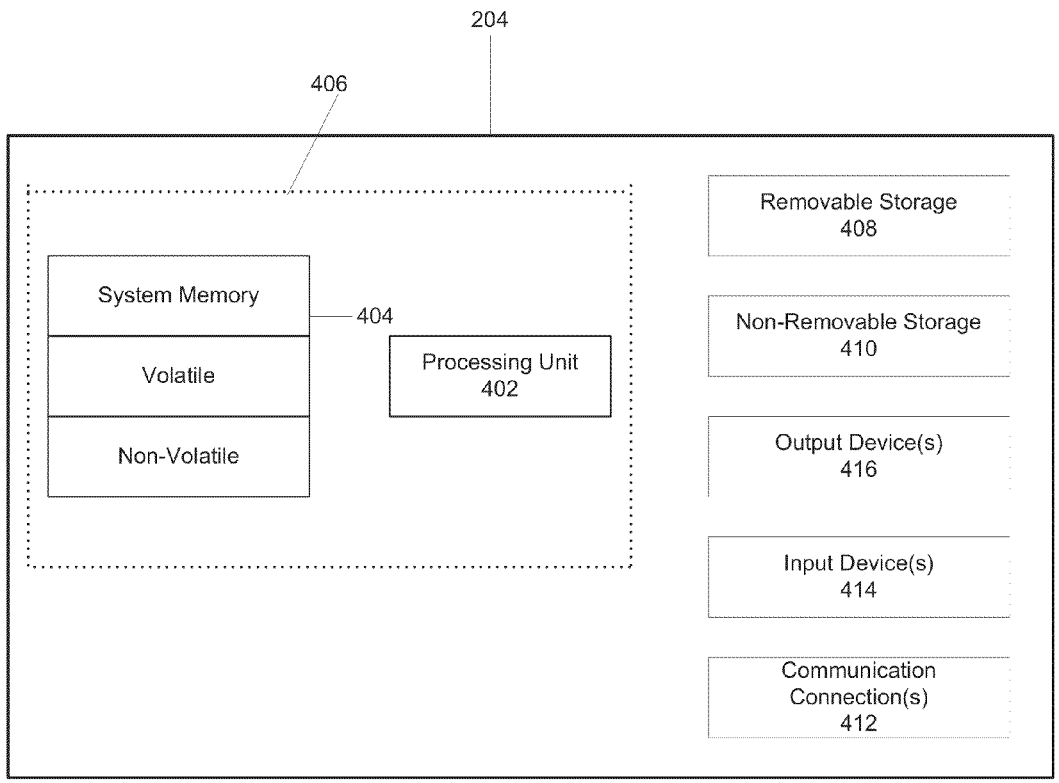
FIG. 4 is a block diagram of an exemplary mobile interface unit of the computing environment of FIG. 2.

FIGS. 2, 3, and 4 set forth herein represent an exemplary computing environment in which various embodiments of the present invention may be implemented. The depicted computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers ("PCs"), server computers, handheld or laptop devices, tablet computers, mobile electronic devices, such as smartphones, multi-processor systems, microprocessor-based systems, network PCs, mini-computers, mainframe computers, embedded systems, distributed computing environments that include any of the above systems or devices, and the like.

Computer-executable instructions such as program modules executed by a computer may be used. The computer-executable instructions can be written in one or more computer codes and disposed on a computer readable media. Generally, program modules include routines, programs, objects, components, data structures, and the like that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices, cloud-based data storage devices and systems, and the like.

Referring now to FIG. 2, depicted is an exemplary system 200 for implementing embodiments of the present invention. This exemplary system includes, inter alia, non-mobile interface units 202 and mobile interface units 204. It should be noted that "non-mobile" and "mobile" refer to the typical condition of the user of the interface unit and not the portability of the interface unit itself. That is, a user of non-mobile interface unit 202 will typically sit at a desk or other work location (e.g., an administrative assistant, a dispatcher, etc.) whereas a user of a mobile interface unit 204 is typically a mobile user such as a police officer, firefighter, etc. who may use mobile interface unit 204 while walking (e.g., at the scene of an accident, crime, fire, etc.) or from a vehicle (e.g., a police vehicle, fire truck, ambulance, etc.). Therefore, a non-mobile interface unit 202 may be a desktop PC or a portable interface unit such as a laptop, tablet personal computer ("PC"), etc. that is used by a non-mobile user at a desk or other non-mobile location. In the depicted embodiment, mobile interface unit 204 is a Motion CL900 Tablet PC as manufactured by Motion Computing, and it is equipped with a Windows 7 operating system. However, alternate mobile interface units may be substituted without departing from the scope of the present invention including varying models also manufactured by Motion, or models manufactured by an entity other than Motion. Additionally, mobile interface unit 204 may be equipped with versions of Windows operating systems other than Version 7 or non-Windows operating systems without departing from the scope hereof.

In their most basic configurations, non-mobile interface unit 202 and mobile interface unit 204, as depicted in FIGS. 3 and 4, respectively, typically each include at least one processing unit 302 and 402, respectively, and at least one memory 304 and 404, respectively. Depending on the exact configuration and type of the interface unit, memories 304 and 404 may be volatile (such as random access memory (RAM)), non-volatile (such as read-only memory (ROM), flash memory, etc.), or some combination of the two. This most basic configuration is illustrated in FIGS. 3 and 4 by dashed lines 306 and 406, respectively.

Interface units 202 and 204 may have additional features/functionality. For example, interface units 202 and 204 may include additional storage (removable and/or non-removable)

including, but not limited to, magnetic or optical disks or tape, thumb drives, and external hard drives as applicable. Such additional storage is illustrated in FIGS. 3 and 4 by removable storage 308 and 408, respectively, and non-removable storage 310 and 410, respectively.

Interface units 202 and 204 typically include or are provided with a variety of computer-readable media. Computer-readable media can be any available media that can be accessed by interface units 202 and 204 and includes both volatile and non-volatile media, removable and non-removable media. By way of example, and not limitation, computer-readable media may include computer storage media and communication media.

Computer storage media includes volatile and non-volatile, removable and non-removable media implemented in any method or technology for storage of information such as computer-readable instructions, data structures, program modules or other data. Memories 304 and 404, removable storage 308 and 408, and non-removable storage 310 and 410 are all examples of computer storage media. Computer storage media includes, but is not limited to, RAM, ROM, electrically erasable programmable read-only memory ("EE-PROM"), flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can accessed by interface units 202 and/or 204. Any such computer storage media may be part of interface unit 202 and/or 204 as applicable.

Interface units 202 and 204 may also contain communications connection(s) 312 and 412, respectively, that allow the units to communicate with other devices. Each such communications connection 312 and 412 is an example of communication media. Communication media typically embodies computer-readable instructions, data structures, program modules and/or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency ("RF"), infrared and other wireless media. The term computer-readable media as used herein includes both storage media and communication media.

Interface units 202 and 204 may also have input device(s) 314 and 414, respectively, such as keyboard, mouse, pen, voice input device, touch input device, and the like. Output device(s) 316 and 416, respectively, such as a display, speakers, printer, and the like may also be included. All these devices are generally known to the relevant public and therefore need not be discussed in any detail herein except as provided.

Notably, interface units 202 and 204 are each one of a plurality of interface units 202 and 204 inter-connected by a network 206. As may be appreciated, network 206 may be any appropriate network and each interface unit 202 and 204 may be connected thereto by way of connections 312 and 412, respectively, in any appropriate manner, and each interface unit 202 and 204 may communicate with one or more of the other interface units 202 and 204 in network 206 in any appropriate manner. For example, network 206 may be a wired network, wireless network, or a combination thereof within an organization or home or the like, and may include a direct or indirect coupling to an external network such as the Internet or the like. Likewise, the network 206 may be such an external network. Interface units 202 and 204 may connect to a server 208 via such an external network.

In the exemplary system 200, server 208 includes a database 210. As may be appreciated, database 210 may be any appropriate database capable of storing data and it may be included within or connected to server 208 in any appropriate manner. In the exemplary embodiment of the present invention depicted in FIGS. 2, 3, and 4, database 210 is a structured query language ("SQL") database with a relational database management system, namely, Microsoft® SQL Server 2008 as is commonly known and used in the art that is resident within server 208. However, other databases may be substituted without departing from the scope of the present invention including, but not limited to, PostgreSQL, MySQL, Microsoft® Access®, and Oracle databases and such databases may be internal or external to server 208.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions, scripts, and the like) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the interface unit generally includes a processor, a storage medium readable by the processor (including volatile and non-volatile memory and/or storage elements), at least one input device, and at least one output device. One or more programs may implement or utilize the processes described in connection with the presently disclosed subject matter (e.g., through the use of an application-program interface ("API"), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as network 206 or a distributed computing environment. Still further, aspects of the presently disclosed subject matter may be implemented in or across a plurality of processing chips or devices, and storage may similarly be affected across a plurality of devices in network 206. Such devices might include personal computers, network servers, and handheld devices, for example.

Exemplary Database Tables

Referring now to FIGS. 19A-19E, depicted are exemplary database tables for use with the present invention. Following is a description of the types of data available in each table.

Streets table 1902: this table is used to store location addresses including street names, cities, state codes (i.e., database links to States table 1906), zip codes, area zones (A, B, C, D, as categorized by the user of system 200) and fields used for auditing purposes such as Created By, Created Date, LastUpdatedBy, and LastUpdatedDate.

States table 1906: this table is used to store state information including a unique ID for each state and the state name.

Permissions table 1908: this table is used to store the various permissions available via system 200 including, without limitation, review report and access to the motor vehicle database. This table includes Permission name, description and fields used for auditing such as CreatedBy, CreatedDate, LastUpdatedBy and LastUpdatedDate.

PermissionsInRole table 1910: this table is used to store the permission related to a specific role. This table includes the PermissionID and RoleID fields.

Roles table 1912: this table is used to store the roles available in system 200. This table stores RoleID, role name, role description and fields used for auditing such as CreatedBy, CreatedDate, LastUpdatedBy and LastUpdatedDate.

UsersInRole table 1914: this table is used to store the information related to the roles assigned to a specific user. This table includes the UserID and RoleID fields.

Messages table 1916: this table is used to store the messages. This table stores MessageID, SenderID (i.e., the ID of the person sending the message), ReceiverID (person receiving the message), TextID (text associated with the message), IsDelivered (flag which is set when the receiver of the email acknowledges it), SendDate, RecieveDate, ReadDate, IsBroadcast (set to yes if the message is sent to everyone) and IsAdminMessage (if the message is only for administrators).

MessagesImages table 1918—this table is used to store an image related to a message. This table contains MessageID (the ID of the message related to the image), the image (type image field to store binary image data), name and image extension.

AudioItems table 1920: this table is used to store an audio item related to the translate function. This table stores the filename and fields for auditing such as Createdby and Createddate.

Users table 1922: this table is used to store records for each user of system 200. The records include, but are not limited to, UserName (a unique name to be used to log in), Password, Email, IsBlocked (if the user is blocked and will be prevented from logging in), LoginAttempts (the number of invalid login attempts), IsDelete (a flag set when a user id is deleted) and fields used for auditing such as CreatedBy, CreatedDate, LastUpdatedBy and LastUpdatedDate.

MessagesTexts table 1924: this table is used to store the text related to the messages. This table stores the text as SQL Database Field type text to allow the table to store large messages having up to 2 GB when system 200 is implemented using Microsoft® SQL Server 2008.

Departments table 1926: this table is used to define personnel departments. This table includes department name, department type, and fields used for auditing such as CreatedBy, CreatedDate, LastUpdatedBy and LastUpdatedDate.

Personnel table 1928: this table is used to store personnel. Each personnel is assigned a user ID, department, and personnel category. This table stores departmentID, personnelcategoryID, badge number, first name, last name, active status (if the person's employment is active or inactive), IsDeleted (flag set when a person is deleted) and fields used for auditing such as CreatedBy, CreatedDate, LastUpdatedBy and LastUpdatedDate.

PersonnelCategories table 1930: this table is used to categorize personnel into categories including, without limitation, squads, and zones. This table stores the category name and fields used for auditing such as CreatedBy, CreatedDate, LastUpdatedBy and LastUpdatedDate.

DepartmentType table 1932: this table is used to store departments including, without limitation, police, EMT, and fire. This table stores department type name and fields used for auditing such as CreatedBy and Created Date.

IncidentPersonnel table 1934: this table is used to assign personnel to a specific incident. This table stores the incidentID, personnelId, sequence (used to store the personnel sequence with the lowest person in the sequence being assigned as the primary) and fields used for auditing such as CreatedBy and Created Date.

PersonnelSupervisors table 1936: this table is used to store the supervisors for Personnel categories. This table stores the personnelID (the supervisor), personnelcategoryID (the personnel category supervised by the supervisor), and fields used for auditing such as CreatedBy and Created Date.

IncidentPersonnelStatuses table 1938: this table is used to store personnel statuses (e.g., assigned, enroute, dispatched and cleared) that may be assigned to the personnel for an incident. This table stores information including, without limitation, the incident personnel, personnel status, the date and time the status was assigned, and fields used for auditing such as CreatedBy and Created Date.

PersonnelStatuses table 1940: this table is used to store the different statuses related to an incident such as dispatched, enroute, arrived and cleared. This table stores the status name, active (set flag to remove a status), and fields used for auditing such as CreatedBy and CreatedDate.

EventPersonnel table 1942: this table is used to assign personnel to an event. This table stores the personnel ID, the eventID, Sequence, and fields used for auditing such as CreatedBy and CreatedDate.

EventPersonnelStatuses table 1944: this table is used to store the personnel statuses (assigned, enroute, dispatched and cleared) to the personnel on an event. This table stores information about the event personnel, personnel status, the date and time the status was assigned, and fields used for auditing such as CreatedBy and CreatedDate.

IncidentNotes table 1946: this table is used to store the notes related to an incident. This table stores the incidentIDs, notes, and fields used for auditing such as CreatedBy and CreatedDate and IsSystemNote (set to yes if the note is not entered by a user).

Incidents table 1948: this table is used to store the incident data. This table includes the IncidentID (auto generated by the SQL server), IRNumber (system generated number based on year and counter), location, incidentStatus, incident type, IsDeleted (set to yes if incident is deleted) and fields used for auditing such as CreatedBy, CreatedDate, LastUpdatedBy and LastUpdatedDate.

ReportsHistory table 1950: this table is used to store a history of a report including, without limitation, report creation, transmission, saved, rejected, and the like, along with all auditing data. This table includes the report, the type of the report, report status, data (in XAML data format), and fields used for auditing such as Created By, Created Date, LastUpdatedBy and LastUpdatedDate.

IncidentStatuses table 1952: this table is used to store the statuses for the CAD users including, without limitation, new, active, and clear. This table stores the incidentstatusID, status name, active status, and fields used for auditing such as CreatedBy and CreatedDate.

Reports table 1954: this table is used to store the reports related to an incident. This table includes the incidentID, the type of the report, the status of the report, the report data (in XAML format) and fields used for auditing such as CreatedBy, CreatedDate, LastUpdatedBy and LastUpdatedDate.

ReportStatuses table 1956: this table is used to store report statuses including, without limitation, saved, sent, deleted, returned and approved. This table includes the status ID and name.

ReportTypes table 1958: this table is used to store the different types of reports including, without limitation, incident report, crash report, and the like. The entries in this table should correspond to report .DLL files present on the client device. This table includes the typeID, name and description.

IncidentTypes table 1960: this table is used to store incident type information. This table includes the incident type code, name, ReportRequired (whether a report is required for an incident of this type), and fields used for auditing such as CreatedBy, CreatedDate, LastUpdatedBy and LastUpdatedDate.

ReportAttachments table 1962: this table is used to store the photo and/or video attachments for a specific report. This table includes the reportID, the name and description of the attachment, and fields used for auditing such as CreatedBy and CreatedDate.

ReportNotes table 1964: this table is used to store the notes added to the report either by the personnel creating it or by the supervisor reviewing it. This table includes the reportID, note and fields used for auditing such as CreatedBy and CreatedDate.

ReportTransmits table 1966: this table is used to store information of the report transmission to and from personnel. This table includes the reportID, the user and personnel transmitting it, the user and personnel receiving it, the date of the transmission, transmission type and any notes.

ReportTransmitTypes table 1968: this table is used to store the transmit types including, without limitation, send for approval, rejected and approved. This table includes the transmittypeID and name.

EventStatuses table 1970: this table is used to store the different event statuses including, without limitation, new, active and clear. This table stores event statusID, status name, active status, and fields used for auditing such as CreatedBy and CreatedDate.

Events table 1972: this table is used to store the events information. This table includes the eventID, IRNumber, location, event statusID, IsDeleted, and fields used for auditing such as CreatedBy, CreatedDate, LastUpdatedBy and LastUpdatedDate.

EventNotes table 1974: this table is used to store the notes for a specific event. This table includes the eventnotesID, eventID, note, IsSystemNote (whether this note was entered by a user), and fields used for auditing such as CreatedBy and CreatedDate.

MotorVehicles table 1976: this table is used to store the motor vehicles added during writing reports so that the user can utilize them in the future reports. This table includes the MotorVehicleID, PlateNo, StateCode, VIN, other fields to identify a vehicle, and fields used for auditing such as CreatedBy and Created Date.

AdditionalReportMotorVehicles table 1978: this table is used to store the motor vehicles linked to a report. This table includes the MotorVehicleID, ReportID, and fields used for auditing such as CreatedBy and Created Date.

Articles table 1976: this table is used to store the articles added during writing reports so that the user can utilize them in the future reports. This table includes the ArticleID, Manufacturer, SerialNo, other fields to identify an article, and fields used for auditing such as CreatedBy and Created Date.

AdditionalReportMotorArticles table 1982: this table is used to store the articles linked to a report. This table includes the ArticleID, ReportID, and fields used for auditing such as CreatedBy and Created Date.

Subjects table 1984: this table is used to store the subjects added during writing reports so that the user can utilize them in the future reports. This table includes the SubjectID, First Name, Last Name, DOB (Data of Birth), other fields to identify a person, and fields used for auditing such as CreatedBy and Created Date.

AdditionalReportMotorSubjects table 1986: this table is used to store the subjects linked to a report. This table includes the SubjectID, ReportID, and fields used for auditing such as CreatedBy and Created Date.

System Access

FIG. 1 depicts process 100, which is an overview of an exemplary method for use of the systems and methods of the present invention by a non-mobile or mobile user in accordance with one embodiment of the present invention. The systems and methods of the present invention may be utilized by any state or federal agency (e.g., police departments, fire departments, the Federal Emergency Management Agency) or any other entity that performs management and directing of resources and manpower to an event. The present invention is particularly useful for managing and directing resources and manpower for active emergencies but the present invention is not limited to emergency use.

Process 100 begins at 102, wherein a user enables a non-mobile interface unit 202 or a mobile interface unit 204 for use in accordance with the present invention. For example, when process 100 is operated on a system such as that described in greater detail above with respect to FIGS. 2-4, such enabling typically includes activating a client application that resides and/or operates on non-mobile interface unit 202 or mobile interface unit 204. The client application may be activated, for example, via double-clicking an icon or the like or entering a Uniform Resource Locator ("URL") via a Web browser such as Internet Explorer, Mozilla, Firefox, or the like. Alternatively, the client application may be programmed to automatically start when non-mobile interface unit 202 or a mobile interface unit 204 is enabled (or turned on). For example, the application may be automatically launched by including it in the startup group of the operating system. Activation of the client application will display a user interface to the user via an appropriate output device 316 such as a display or monitor.

Next, at 104, the client application will initiate communication between the non-mobile interface unit 202 or mobile interface unit 204 and server 208 to check for connectivity. In the exemplary embodiment of the invention depicted in FIGS. 1 through 19E, communication between interface units 202 and/or 204 and server 208 is performed via the Windows Communication Foundation ("WCF") messaging subsystem of the Windows operating system utilizing a .NET Framework 3.0 programming interface ("API"). The WCF provides a service-oriented architecture ("SOA") for passing messages between applications locally, across a local network, and over the Internet. The exemplary embodiment also utilizes the Windows Presentation Foundation ("WPF") user interface subsystem.

Further, Microsoft Enterprise Library 5.0 application blocks are utilized to perform functions including, but not limited to, logging, validation, data access, and exception handling. However, alternate messaging subsystems, user interface subsystems, and/or application blocks may be substituted without departing from the scope of the present invention including, but not limited to, custom-written systems and/or blocks.

Further, in the exemplary embodiment of the present invention depicted in FIGS. 1 through 19E, the communication between interface units 202 and/or 204 and server 208 is performed using a Secure Sockets Layer ("SSL") security protocol. This protocol, inter alia, validates the identity of the client application and automatically creates an encrypted connection for sending information. The identity of the client application is validated via the use of digital certificates, private keys, and/or public keys utilizing a minimum of 128 bit encryption. However, alternate security protocols may be substituted without departing from the scope of the present invention including, but not limited to, those utilizing encryption greater than 128 bit.

At 104, the client application checks for connectivity with server 208 by via a predefined WCF connectivity call to server 208. Once server 208 verifies connectivity, process 100 proceeds to 106.

Next, at step 106, the non-mobile user is prompted to enter a login identification code ("login") and password. Process 100 then proceeds to 108, at which the login and password are transmitted to server 208 to be tested for authenticity against the data stored in database 210. This feature and/or such testing may be performing using any method known in the art including, but not limited to, the Microsoft Enterprise Library 5.0 logging application block. If the login and password are authentic, process 100 proceeds to 112. Alternatively, if they are not authentic or the password does not correspond to the entered login, process 100 returns to 106 at which the user is prompted to re-enter a login and password.

At 112, upon successful entry of a user login and password, the client application obtains information from server 208 regarding the particular user's roles and rights along with a success indicator. That is, server 208 determines which menu items (e.g., system information, system functions, etc.) are available to the user (i.e., the items to which the user has "rights"). Such rights are determined based upon the user's login and/or password. In one aspect of the present invention, such rights are determined by querying database 210 to determine what functions are enabled for the specific login and/or password. In the exemplary embodiment, the following tables are queried: Personnel 1928, Roles 1912, UsersInRoles 1914, Permissions 1908, and PermissionsInRoles 1910 to determine the permissions available to each personnel based upon the personnel's specific login and/or password. However, alternate methods of determining menu, information, and function data in correlation to password, position, or similar data may be substituted (e.g., via registers, memory locations, etc.) without departing from the scope hereof.

Once server 208 has determined the user's rights, process 100 proceeds to 114. At 114, specific user menu options will be selectively enabled and disabled based upon the level of access associated with the login and/or password as determined at 112. Process 100 then proceeds to 116, at which one or more main menus are displayed to the user. For example, in the depicted embodiment, based upon the user's rights, one of the CAD, RMS, or SMS menus will be depicted. In one aspect of the present invention, the CAD, RMS, or SMS main menu may be customized such that it only includes those functions for which the user has rights. In another aspect of the present invention, the functions for which the user does not have rights are grayed to indicate that they are not accessible or such rights are otherwise disabled. Alternatively, the entire CAD, RMS, or SMS menu may be depicted without any limitations or grayed areas. In yet another alternative embodiment, if a user has proper rights, the user is able to select one of the CAD, RMS, or SMS main menus from a list of same. However, other methods of presenting the main menu to the user may be substituted in accordance with the present invention.

In the exemplary embodiment of the present invention depicted in FIGS. 1 through 19E, the available CAD functions 118 include new incident function 118a, new event function 118b, edit incident function 118c, edit event function 118d, closed incidents and events function 118e, police function 118f, fire/other department function 118g, information search function 118h, motor vehicle/NCIC function 118i, miscellaneous functions 118j, log off function 118k, and exit function 118l. The available RMS functions include personnel activity function 120a, information search function 120b, motor vehicle/NCIC function 120c, miscellaneous functions 120d, log off function 120e, and exit function 120f. Additionally, the available SMS functions include RMS function 122a, CAD function 122b, review reports function 122c, charts and statistics function 122d, management function 122e, log off function 122f, and exit function 122g. However, functions may be added, deleted, and/or modified without departing from the scope hereof.

Process 100 then proceeds to 117, at which the user selects the desired function from the list of functions available to the user as determined at steps 112 and 114. Such function may be selected in any one of a variety of methods known in the art including, but not limited to, touching the desired option on a touch screen of a non-mobile user interface 202 or mobile user interface 204, entering a number associated with such function via a user input device such as input device 314 or 414, placing a cursor atop a desired function displayed on an output device 316 and 416 such as a monitor and clicking it via a user input device such as input device 314 or 414, receiving a voice command via a user input device such as user input device 314 or 414, and the like.

After the user has selected a function, process 100 executes a process associated with the selected function 118, 120, or 122. That is, a new process begins that executes the tasks for the chosen function. Exemplary embodiments of processes for functions 118a-118l, 120a-120f, and 122a-122g are depicted in FIGS. 5-19D. After any one of the functions are executed, process 100 returns to 117 to allow a user to select a new function.

Figure 5:
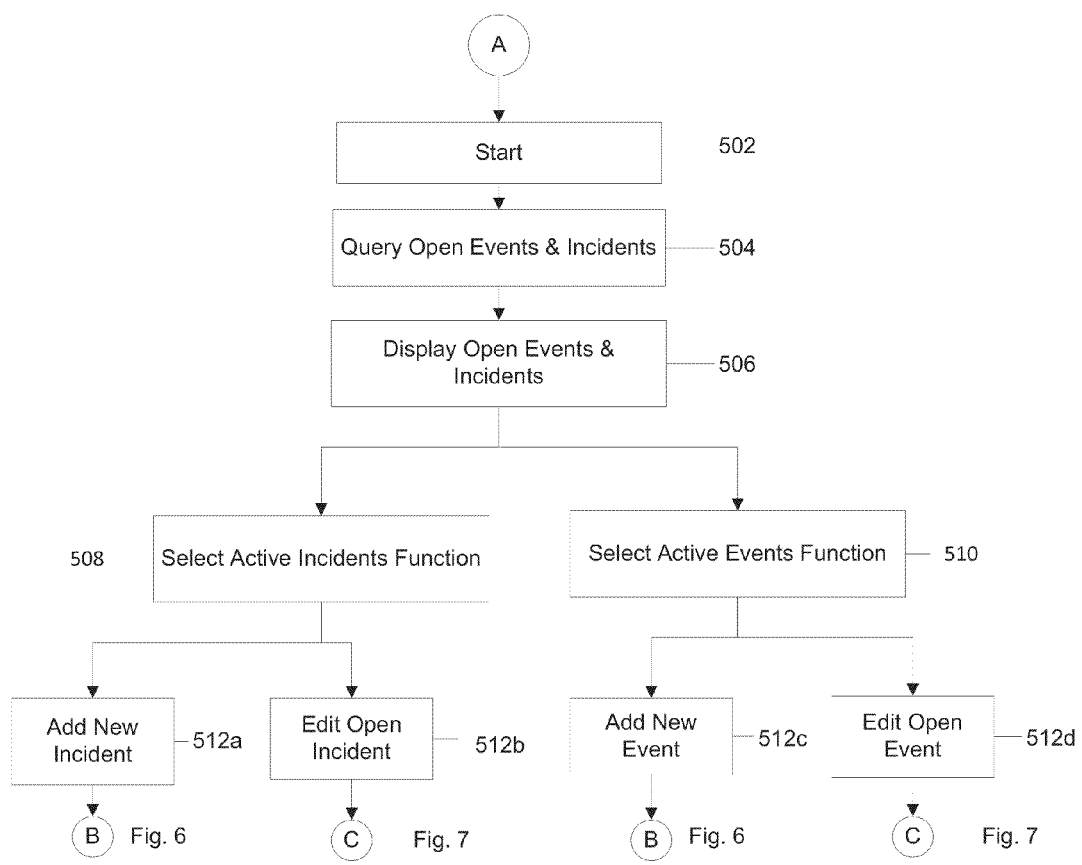
FIG. 5 depicts a flowchart of a process that is executed when the CAD sub-system menu is loaded for a user in accordance with the method of the present invention illustrated in FIG. 1.

Turning next to FIG. 5, illustrated is a flowchart of a process that is executed when the CAD sub-system menu is loaded for a user. Process 500 begins at 502, typically after the user's credentials are analyzed and it is determined that the user has permission to use the CAD sub-system such as occurs at step 114 of FIG. 1. However, process 500 is only executed when step 114 determines that the CAD sub-system should be loaded, and it is executed as a part of a larger loading process that also displays the various functions as discussed in greater detail herein. Process 500 then proceeds to 504.

At 504, the client application executes an open event and incident query to server 208 and database 210 to obtain a list of all incident or event data stored in database 210 related to the incidents or events capable of being added or edited in step 512 as well as all incident or event data needed to populate any selection lists (available personnel names, available incident types, available event locations, etc.).

For example, when open events are queried, the messaging subsystem described above queries database 210, specifically, EventStatuses table 1970 (to obtain event status such as active or inactive), Events table 1972 (to obtain IR number and location), EventNotes table 1974 (to obtain event notes), EventPersonnel table 1942 (to obtain personnel associated with the event), and Personnel table 1928 (to obtain information related to the personnel such as department, personnel category, badge number, first and last name, whether employment of personnel is active, and the like). For example, when open incidents are queried, the messaging subsystem described above queries database 210, specifically, IncidentStatuses table 1952 (to obtain incident status such as active or inactive), Incidents table 1948 (to obtain IR number and location), IncidentNotes table 1946 (to obtain incident notes), IncidentPersonnel table 1934 (to obtain personnel associated with the incident), and Personnel table 1928 (to obtain information related to the personnel such as department, personnel category, badge number, first and last name, whether employment of personnel is active, etc.), IncidentPersonnelStatusID table 1938 (to obtain personnel ID and personnel status related to the incident such as dispatched, enroute, arrived, cleared), IncidentTypes table 1960 (to obtain incident types such as riot, robbery, etc.), Reports table 1954 (to obtain report information such as IncidentID, TypeID, ReportData, etc.), ReportHistory table 1950 (to obtain historical information of the different status changes for a particular report), ReportStatus table 1956 (to obtain report status information such as saved, sent, deleted, returned, and approved), ReportTypes table 1958 (to obtain report types such as incident report, crash report, etc.) and ReportTransmits table 1966 (to obtain information about the transmits related to a particular report, the user who initiated the report, and the user who received the report). Although FIGS. 19A-E depict a specific database table format for information storage, other database table formats or methods of storing data other than database tables may be substituted without departing from the scope of the present invention.

Figure 1B:
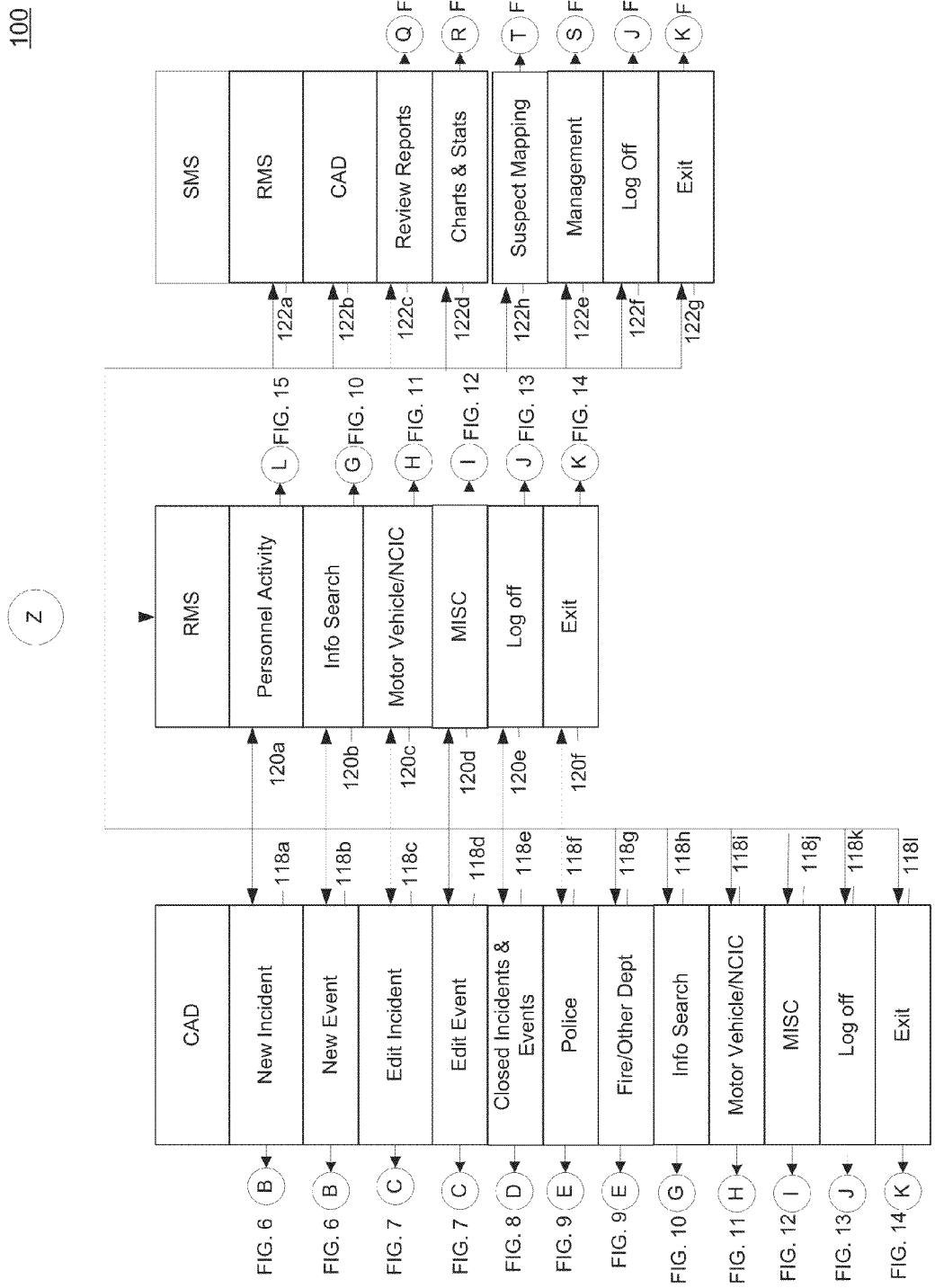

Once this data is retrieved, process 500 proceeds to step 506, at which all open incidents are displayed to the user via incident specific icons. These icons are displayed along with the other function icons for functions 118a-118l as shown in FIG. 1B in association with the CAD sub-system main menu. These icons are displayed on an output device 316 or 416 of the non-mobile interface unit 202 or mobile interface unit 204 as described in greater detail with respect to FIGS. 2-4.

In the depicted embodiment of the present invention, the user is also initially presented with a "Show Events" icon. When the "Show Events" icon is selected, a list of open events is displayed along with a "Show Incidents" icon and the other function icons. In this manner, the user may switch between "Show Incidents" and "Show Events" by simply clicking the respective icon. Alternatively, process 500 may begin by depicting a list of open events and a "Show Incidents" icon without departing from the scope hereof.

If the user selects the "Show Incidents" icon or remains in the initially displayed list of incidents, process 500 proceeds to 508. At 508, the user may select an incident function. In this exemplary embodiment of the present invention, the incident functions include add new incident function 512a and edit open incident function 512b. Once the user selects a function, process 500 activates a sub-method to perform the selected function. For example, if the add new incident or edit open incident functions 512a or 512b, respectively, are selected, process 500 proceeds to sub-method B or sub-method C, respectively, as depicted in FIGS. 6 and 7, respectively, as described below.

Alternatively, if, at 506, the user selects the "Show Events" icon, process 500 proceeds to 510. At 510, the user may select an events function. In this exemplary embodiment of the present invention, the events functions include add new event function 512c and an edit open event function 512d. Once the user selects a function, process 500 activates a sub-method to perform the selected function. For example, if the add new event or edit open event functions 512c or 512d, respectively, are selected, process 500 proceeds to sub-method B or sub-method C, respectively, as depicted in FIGS. 6 and 7, respectively, as described below. Although FIG. 5 depicts four incident and event functions 512a through 512d, greater or fewer functions may substituted without departing from the scope of the present invention.

Figure 6:
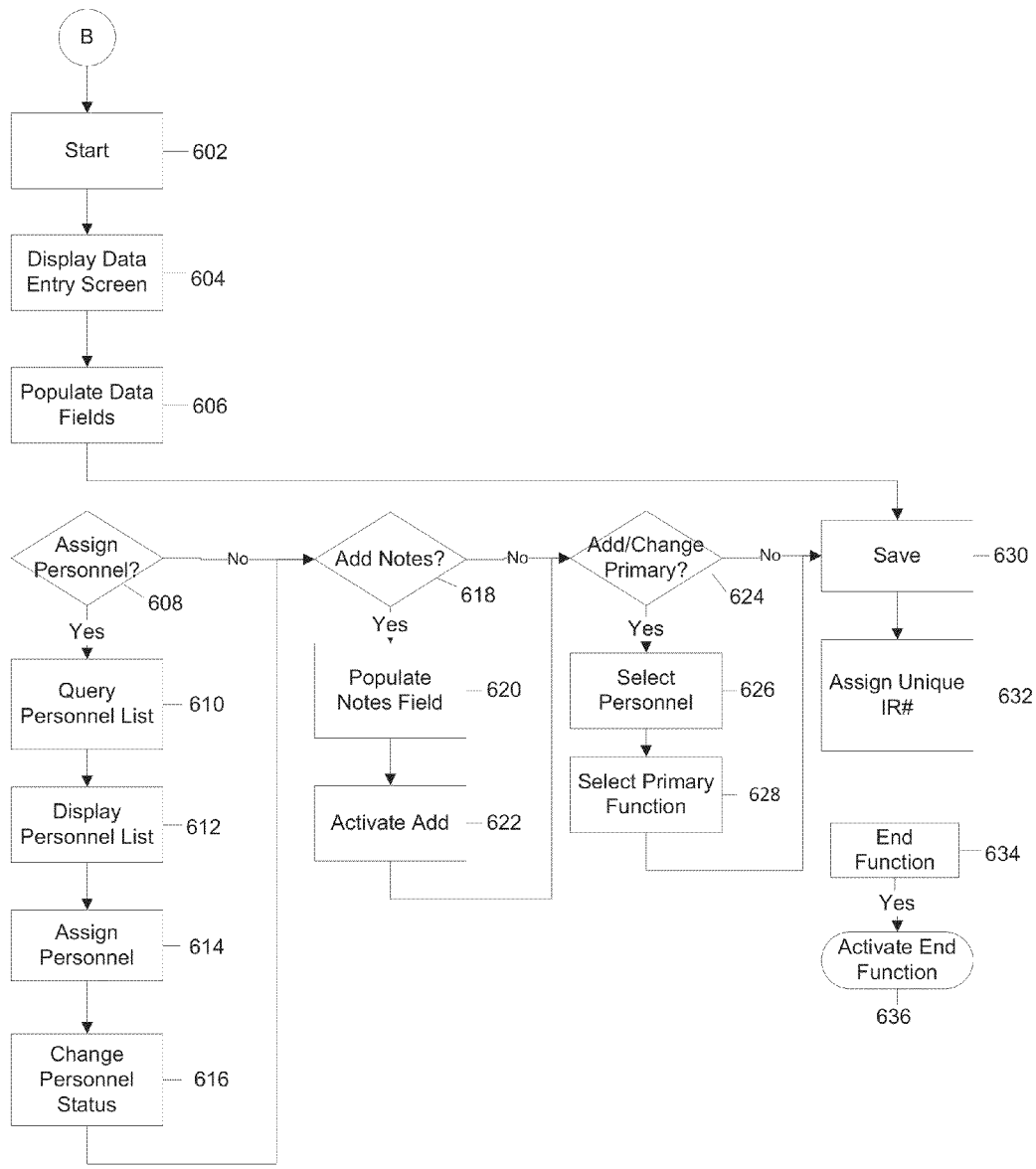
FIG. 6 depicts a flowchart of one method of allowing a user to add an incident or event via the CAD sub-system in accordance with the method of the present invention illustrated in FIG. 1.
Figure 7:
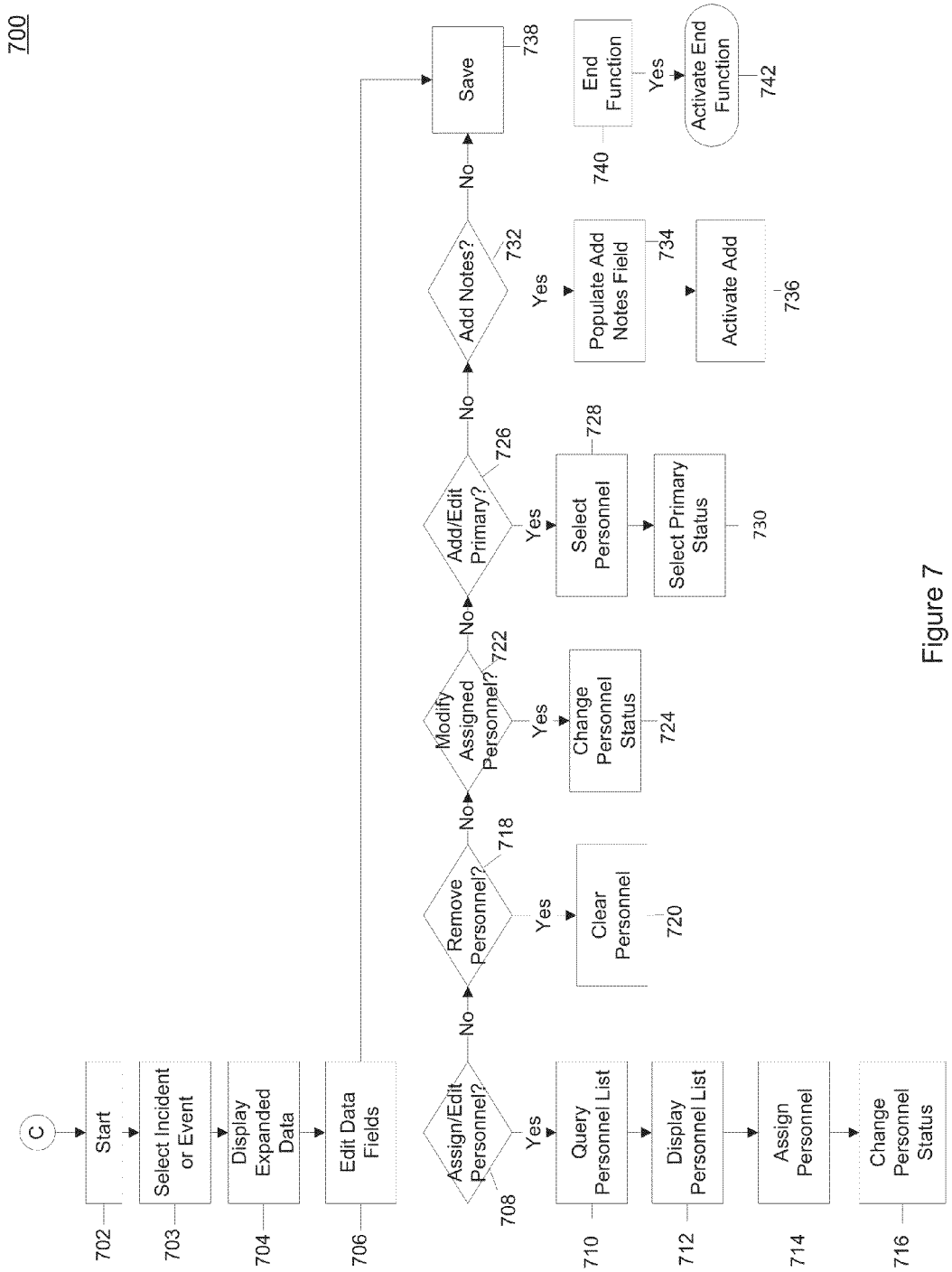
FIG. 7 depicts a flowchart of one method of allowing a user to edit an incident or event via the CAD sub-system in accordance with the method of the present invention illustrated in FIG. 1.

Referring now to FIG. 6, illustrated is a flowchart of one method of allowing a user to add an incident or event in accordance with the method of the present invention illustrated in FIG. 1. Process 600 begins at 602, typically after being launched from a master process such as process 100 as described above with respect to FIG. 1. For example, process 600 may be initiated by selecting new incident function 118a (FIG. 1) or new event function 118b (FIG. 1) from the CAD sub-system main menu. These functions, as well as any of the other functions depicted in FIG. 1B, may be initiated, for example, by tapping, clicking, or double-clicking an "New Incident", "New Event", or other relevantly titled button or the like via the user's finger or an input device such as input device 314 or 414 as discussed above with respect to FIGS. 2-4. Once process 600 has been initiated, it proceeds to 604.

Next, at 604, the client application displays the data entry screen along with supporting information for the incident or event to the user. This information is retrieved in step 504 of FIG. 5 as described in detail above. This information may include, but is not limited to, locations, incidents types, and the like.

The new incident data entry screen includes data fields for entry of information including, but not limited to, incident type, incident location, and non-mobile user notes. Similarly, the new event data entry screen includes data fields for entry of information including, but not limited to, event type, event location, and non-mobile user notes. Additionally, both the new incident data entry screen and new event data entry screen include an add personnel function icon to allow one or more personnel (e.g., police officers, firefighters, emergency medical technicians ("EMT")) to be assigned to the incident or event by the non-mobile user.

At 606, the user populates one or more of the data fields displayed in the data entry screen. In the depicted embodiment, information that may be selected from a list (e.g., incident type and incident location or event type and event location) is selected from a pull-down menu. However, any of the data fields discussed herein may be populated in other manners including, but not limited to, entry of a predetermined code and manual data entry.

Once the user has populated the desired data fields, process 600 proceeds to 630, at which a user typically saves the information entered into the data fields in order to create a new incident or event. This step may be performed when the user clicks or touches a save icon or it may be performed automatically when all data fields are populated. Saving the data causes the data to be automatically sent to server 208 and database 210 for creation of a new incident or new event in database 210 and storage of the data entered by the user in association therewith. That is, to save an incident, the messaging subsystem creates entries in database 210, specifically, IncidentStatuses table 1952 (incident status such as active or inactive), Incidents table 1948 (generate IR number and store entered fields), IncidentNotes table 1946 (to store incident notes), IncidentPersonnel table 1934 (to store personnel associated with the incident), and Personnel table 1928 (to obtain information related to the personnel such as PersonnelID), IncidentPersonnelStatusID table 1938 (to store personnel ID and personnel status related to the incident such as dispatched, enroute, arrived, and cleared), and IncidentTypes table 1960 (to obtain incident types such as riot, robbery, and the like).

To save an event, the messaging subsystem creates entries in database 210, specifically, EventStatuses table 1970 (to obtain event status such as active or inactive), Events table 1972 (to store IR number and other information entered by the user), EventNotes table 1974 (to store notes), EventPersonnel table 1942 (to store personnel associated with the event), and Personnel table 1928 (to obtain information related to the personnelID or the like). Saving the data also causes an icon associated with the new incident or event to be created and displayed to the user via output device 316 (e.g., a monitor or screen) of non-mobile interface unit 202.

During step 630, the information transmitted via the messaging sub-system is saved in database 210 using standard SQL commands. The SQL server automatically assigns a unique identification number ("ID") to the Identity column associated with the incident or event. Next, at 632, the messaging subsystem also generates a unique IR number comprised of the last two digits of the current year followed by a hyphen and a four digit number. The four digit number starts with "0000" at the beginning of the year and is incremented every time a unique IR number is assigned. The four digit number is reset at the beginning of each new year.

At this point, the new incident or event has been created and the user may choose to make one or more additional entries such as: assigning one of more personnel, adding notes, adding or changing the personnel assigned to "primary" status, or exiting the current function.

If a user wishes to assign one or more personnel to the newly created incident, the user activates a personnel icon via double-clicking, touching, or the like to cause process 600 to perform step 608. The process then proceeds to 610, at which the client application executes a personnel list query to server 208 and database 210 to obtain a list of all current personnel that pertains to the currently selected function (e.g., add incident function 118*a* or add event function 118*b*) as stored in database 210. When the initiated function is add incident function 118*a*, such data may include, but is not limited to, personnel name, personnel position, personnel precinct, etc. Alternatively, when the initiated function is add event function 118*b*, such data may include, but is not limited to, firefighter or EMT name, firefighter house location, EMT medical institution, and the like. Once this data is retrieved, process 600 proceeds to step 612, at which the retrieved personnel list is displayed to the user.

Next, at 614, the user assigns the personnel to the incident or event by selecting the name of the personnel and then selecting the status of the personnel relative to the incident or event (e.g., dispatched, enroute, arrived, or cleared). In other embodiments of the present invention, the selecting process may include dragging and dropping and/or other methods. At 616, the user may change the status of the assigned personnel. If the status of the primary personnel assigned to the incident or event is set to cleared, the status of the associated incident or event is set to closed. The process of selecting primary personnel is depicted at 624.

At 618, the user can add notes to the incident or event. If the user chooses to do so, process 600 proceeds to 620, at which the user enters the notes text. Next, at 622, the user clicks on the Add note button which causes the note to be timestamped using the device date and time and this timestamp is then displayed in the notes section of the event or incident. In the depicted embodiment of the present invention, the user cannot modify notes after they have been timestamped and/or saved.

At 624, the user can assign or edit the primary personnel associated with the incident or event. If the user chooses to do so, process 600 proceeds to 626 at which the user selects the name of the intended primary personnel. Process 600 then proceeds to 628, at which the user clicks on the primary button to assign the personnel "primary" status. In one embodiment of the present invention, an asterisk or a star is displayed next to the personnel's name to indicate his or her primary status. However, other methods of assigning or editing "primary" status may be substituted.

Finally, if a user wishes to exit new incident function 512*a* or new event function 512*c*, this process begins at step 634. It then proceeds to 636, at which the user activates an end function. In one embodiment, a user clicks an "End", "Close", or similar button. This action automatically ends process 600. Since process 600 is invoked by process 100, process 600 then returns control to process 100 at step 117 of process 100 (FIG. 1) at which the user may select a new function from the user's assigned sub-system main menu. After any of the sub-functions are performed at steps 608, 618, or 624 (and their associated steps), the user saves the changes via steps 630 and 632 before exiting the function.

Turning next to FIG. 7, illustrated is a flowchart of one method of allowing a user to edit an incident or event via the CAD sub-system in accordance with the method of the present invention illustrated in FIG. 1. Process 700 begins at 702, typically after being launched from a master process such as process 100 as described above with respect to FIG. 1. A user may need to edit an incident or event, for example, when a supervisor rejects a submitted report (i.e., a report created and submitted via personnel activity function 120*a*) due to errors or if a user wishes to make changes prior to submitting a report for approval. It should be noted that the information required for processes 600 and 700 is retrieved from database 210 and/or displayed to the user as part of process 500 as depicted in FIG. 5. Process 700 then proceeds to 703.

At 703, a user selects an open incident or event to edit by double-clicking or double-tapping the icon associated with the open incident or event as displayed to the user in step 506. Next, at 704, the client application displays an expanded incident or event icon that includes more information than the icon originally displayed to the user. This information is retrieved in step 504 as described in greater detail above. Once the expanded icon is displayed, process 700 proceeds to step 706.

Next, at 706, the user edits one or more of the data fields displayed in the expanded icon data screen. In the depicted embodiment, new information that may be selected from a list (e.g., incident or event type and/or location) may be entered by selecting the new information from a pull-down menu, wherein the menu is populated by the data retrieved in step 504 as described above. Or, alternatively, information may be edited by erasing previously submitted information and re-writing it. However, any of the data fields discussed herein may be edited in other manners including, but not limited to, entry of a predetermined code and manual data entry.

In one embodiment of the present invention, a user is unable to change previously entered notes and/or the timestamping information recorded with those notes. However, such a limitation is not required to implement the systems and methods of the present invention. Alternatively, other editing limitations may be substituted without departing from the scope hereof.

Once the user has edited the desired data fields, process 700 proceeds to 738, at which a user typically saves the information associated with the edited incident or event. This step may be performed when the user clicks or touches a save icon. Saving the data causes the data to be automatically sent to server 208 and database 210 for creation of a newer version of the incident or event in database 210 and storage of the data edited by the user in association therewith. Alternatively, saving the edited data may cause the previous version of the incident or event to be overwritten. Specifically, the messaging subsystem of the client application runs an SQL query to update the event or incident information, notes, and personnel information in its respective tables as discussed above with respect to step 504. At this point, the new incident or event has been edited. The user may also choose to assign personnel, remove personnel, modify assigned personnel, add or change primary personnel, add notes, or to exit the current function.

If a user wishes to assign or edit one or more personnel associated with the incident or event being edited, the user activates a personnel icon via double-clicking, touching, or the like to cause process 700 to perform step 708. At 708, both the edit incident data screen and edit event data screen include an add/edit personnel function icon to allow one or more personnel (e.g., police officers, firefighters, emergency medical technicians ("EMT")) to be assigned to the incident or to allow personnel assigned to the incident or event to be edited by the user.

If the user decides to add personnel to the incident or event, process 700 proceeds to 710, at which a list of personnel is queried based on the department the user chooses. The client application executes a personnel list query to server 208 and database 210 to obtain a list of all current personnel that pertains to the currently selected function (e.g., edit incident function 512*b* or edit event function 512*d*) as stored in database 210. When the initiated function is edit incident function 512*b*, such data may include, but is not limited to, personnel name, personnel position, personnel precinct, etc. Alternatively, when the initiated function is edit event function 512*d*, such data may include, but is not limited to, firefighter or EMT name, firefighter house location, EMT medical institution, or the like. Once this data is retrieved, process 700 proceeds to step 712, at which the retrieved personnel list is displayed to the user.

At 714, the user assigns the personnel to the incident or event by selecting the personnel and then selecting the status on the incident (e.g., dispatched, enroute, arrived, and cleared). In other embodiments, the assignment process may include dragging and dropping names or other methods. Next, at 716, the user may change the status of the assigned personnel. If the status of the primary personnel assigned to the incident or event is set to cleared, the status of the associated incident or event is set to closed. The process of selecting primary personnel is depicted at 726.

At 718, the user can remove already assigned personnel from the incident or event. If the user chooses to do, process 700 proceeds to 720 at which the user can select the personnel and click to apply a "cleared" status to the personnel.

At 722, the user can change the status of previously assigned personnel. If the user chooses to do so, process 700 proceeds to 724 at which the user can select the desired personnel and the personnel's new status.

At 726, the user can assign or edit the primary personnel associated with the incident or event. If the user chooses to do so, process 700 proceeds to 728 at which the user selects the name of the intended primary personnel. Process 700 then proceeds to 730, at which the user clicks on the primary button to assign the personnel "primary" status. In one embodiment of the present invention, an asterisk or a star is displayed next to the personnel's name to indicate his or her primary status. However, other methods of assigning or editing "primary" status may be substituted.

At 732, the user can add notes to the current incident or event. If the user chooses to do so, process 700 proceeds to 734, at which the user enters the notes text. Next, at 736, the user clicks on the Add note button which causes the note to be timestamped using the device date and time and this timestamp is then as displayed in the notes section of the event or incident. In the depicted embodiment of the present invention, the user cannot modify notes after they have been timestamped and/or saved.

Finally, if a user wishes to exit edit incident function 512*b* or edit event function 512*d*, this process begins at step 740. It then proceeds to 742, at which the user activates an end function. In one embodiment, a user clicks an "End", "Close", or similar button. This action automatically ends process 700. Since process 700 is invoked by process 100, process 700 then returns control to process 100 at step 117 of process 100 (FIG. 1) at which the user may select a new function from his or her designated sub-system main menu. After any of the sub-functions are performed at steps 708, 718, 722, 726, or 732 (and their associated steps), the user saves the changes via step 738 before exiting the function.

Figure 8:
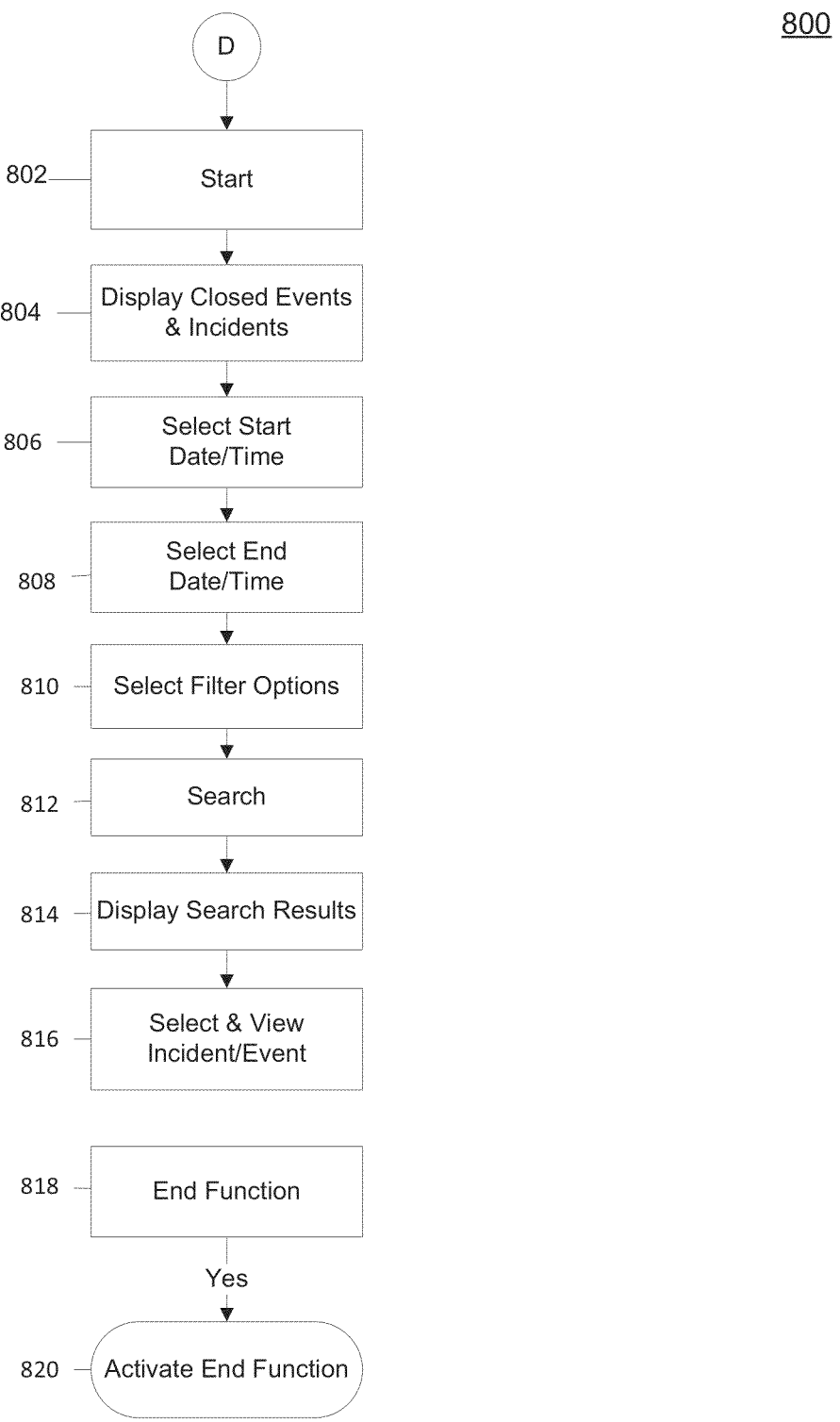
FIG. 8 depicts a flowchart of one method of allowing a user to perform a closed events and incidents function in accordance with the method of the present invention illustrated in FIG. 1.

Turning next to FIG. 8, depicted is a flowchart of one method of performing a closed events and incidents function in accordance with the method of the present invention illustrated in FIG. 1. Process 800 begins at 802, typically after being launched from a master process such as process 100 as described above with respect to FIG. 1. For example, process 800 may be initiated by selecting closed events and incidents function 118*e* (FIG. 1) from the CAD user main menu. Once process 800 has been initiated, it proceeds to 804.

At 804, the client application displays all closed incidents and events to the user via incident specific icons. Closed Incidents are incidents that have been set to cleared status. These icons are displayed on an output device 316 or 416 of the non-mobile interface unit 202 or mobile interface unit 204 as described in greater detail with respect to FIGS. 2-4. Process 800 then proceeds to 806.

At 806 and 808, the user selects the start and end dates and times, respectively, for the search query. That is, the query will only search incidents or events that occurred after the start date and time and prior to the end date and time as inputted by the user. Next, at 810, the user selects the filter to be used for the search query. The filter options are: only closed incidents, only closed events, and both closed incident and events.

Once the criteria for the search has been entered and/or selected, process 800 proceeds to 812, at which point the search function is executed by clicking on a search item or similar button. This initiates a call to the messaging system that includes the criteria selected by the user. The messaging system executes an SQL query to database 210 to retrieve the incidents matching the criteria specified by the user. This query accesses, specifically, IncidentStatuses table 1952 (to obtain incident status such as active or inactive), Incidents table 1948 (to obtain IR number and location), IncidentNotes table 1946 (to obtain incident notes), IncidentPersonnel table 1934 (to obtain personnel associated with the incident), Personnel table 1928 (to obtain information related to the personnel such as department, personnel category, badge number, first and last name, whether employment of personnel is active, etc.), IncidentPersonnelStatuses table 1938 (to obtain personnel ID and personnel status related to the incident such as dispatched, enroute, arrived, or cleared), IncidentTypes table 1960 (to obtain incident types such as riot, robbery, etc.), Reports table 1954 (to obtain report information such as IncidentID, TypeID, ReportData, etc.), ReportHistory table 1950 (to obtain historical information of the different statuses of each report), ReportStatus table 1956 (to obtain report status information such as saved, sent, deleted, returned, or approved), ReportTypes table 1958 (to obtain report types such as incident report, crash report, etc.) and ReportTransmits table 1966 (to obtain information about the transmits related to a particular report including the user who initiated the transfer and the user who received the report), EventStatuses table 1970 (to obtain event status such as active or inactive), Events table 1972 (to obtain IR number and location), EventNotes table 1974 (to obtain event notes), EventPersonnel table 1942 (to obtain personnel associated with the event), and Personnel table 1928 (to obtain information related to the personnel such as department, personnel category, badge number, first and last name, whether employment of personnel is active, and the like).

Next, at 814, the results of the search are displayed to the user. Next, at 816, the user can select an incident or event in the search results by double tapping, double clicking, or otherwise activating the desired search result. Selection of a particular incident or event also allows the user to view any report(s) attached to the current incident or event. The reports are similar to those created via personnel activity function 120*a* (See FIGS. 1B and 15A-15D).

Finally, if a user wishes to exit closed events and incident function 118*e*, this process begins at step 818. It then proceeds to 820, at which the user activates an end function as discussed above with reference to FIG. 6. Process 800 then returns control to process 100 at step 117 of process 100 (FIG. 1) at which the user may select a new function from his or her designated sub-system main menu.

Figure 9:
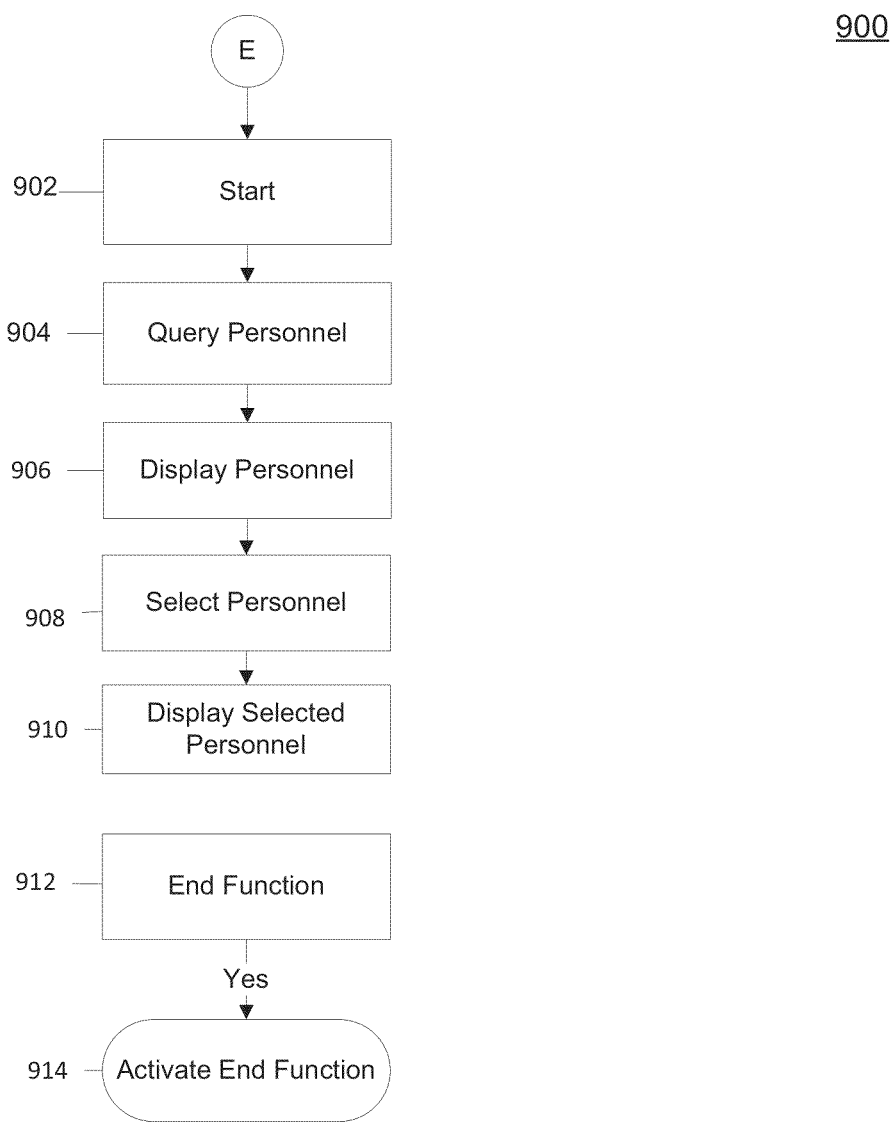
FIG. 9 depicts a flowchart of one method of allowing a user to create a default shortened personnel list including those personnel who are working on a particular day in accordance with the method of the present invention illustrated in FIG. 1.

Referring now to FIG. 9, illustrated is a flowchart of one method of allowing a user to create a default shortened personnel list including those personnel who are working on a particular day in accordance with the method of the present invention illustrated in FIG. 1. This shortened default personnel list may be accessed by other functions including, without limitation, new incident function 118*a*, new event function 118*b*, edit incident function 118*c*, and edit event function 118*d* for ease of data entry. That is, the CAD sub-system user can find and assign the desired personnel more quickly by accessing a shortened list of personnel who are on duty at the time the user is accessing system 200.

Process 900 begins at 902, typically after being launched from a master process such as process 100 as described above with respect to FIG. 1. For example, process 900 may be initiated by selecting police function 118*f* (FIG. 1) or fire/other department. function 118*g* from the CAD sub-system main menu. Both functions operate in an identical manner with the exception of the personnel data that is being accessed to create the default list (i.e., function 118*f* creates a default list of police personnel and function 118*g* creates a default list of fire/other department personnel). Once process 900 has been initiated, it proceeds to 904.

At 904, the client application executes a data query to server 208 and database 210 to obtain a list of all personnel for a specific department as stored in database tables Departments 1926 and Personnel 1928. Next at 906, the list of personnel is displayed to the user. At 908, the user can select one or more personnel by clicking/tapping on the corresponding name(s) of the personnel the user wishes to add to the default personnel list. In this step, the default list of all selected personnel is created and saved to the memory of non-mobile interface unit 202 or mobile interface unit 204.

Then, at 910, the user has the option of selecting whether to use his or her customized default personnel list or a personnel list that includes all personnel. This selection is made by toggling an icon between "Display Selected Personnel" and "Display All Personnel". The selected list will be the one available to the user in other functions including, but not limited to, new incident function 118*a*, new event function 118*b*, edit incident function 118*c*, and edit event function 118*d*. When the user operates in "Display Selected Personnel" mode, the user may more quickly select personnel by pulling it from the customized, shortened list.

Finally, if a user wishes to exit police or fire/other department functions 118*f* or 118*g*, this process begins at step 912. It then proceeds to 914, at which the user activates an end function as discussed above with reference to FIG. 6. Process 900 then returns control to process 100 at step 117 of process 100 (FIG. 1) at which the user may select a new function from the user's designated sub-system main menu.

Figure 10:
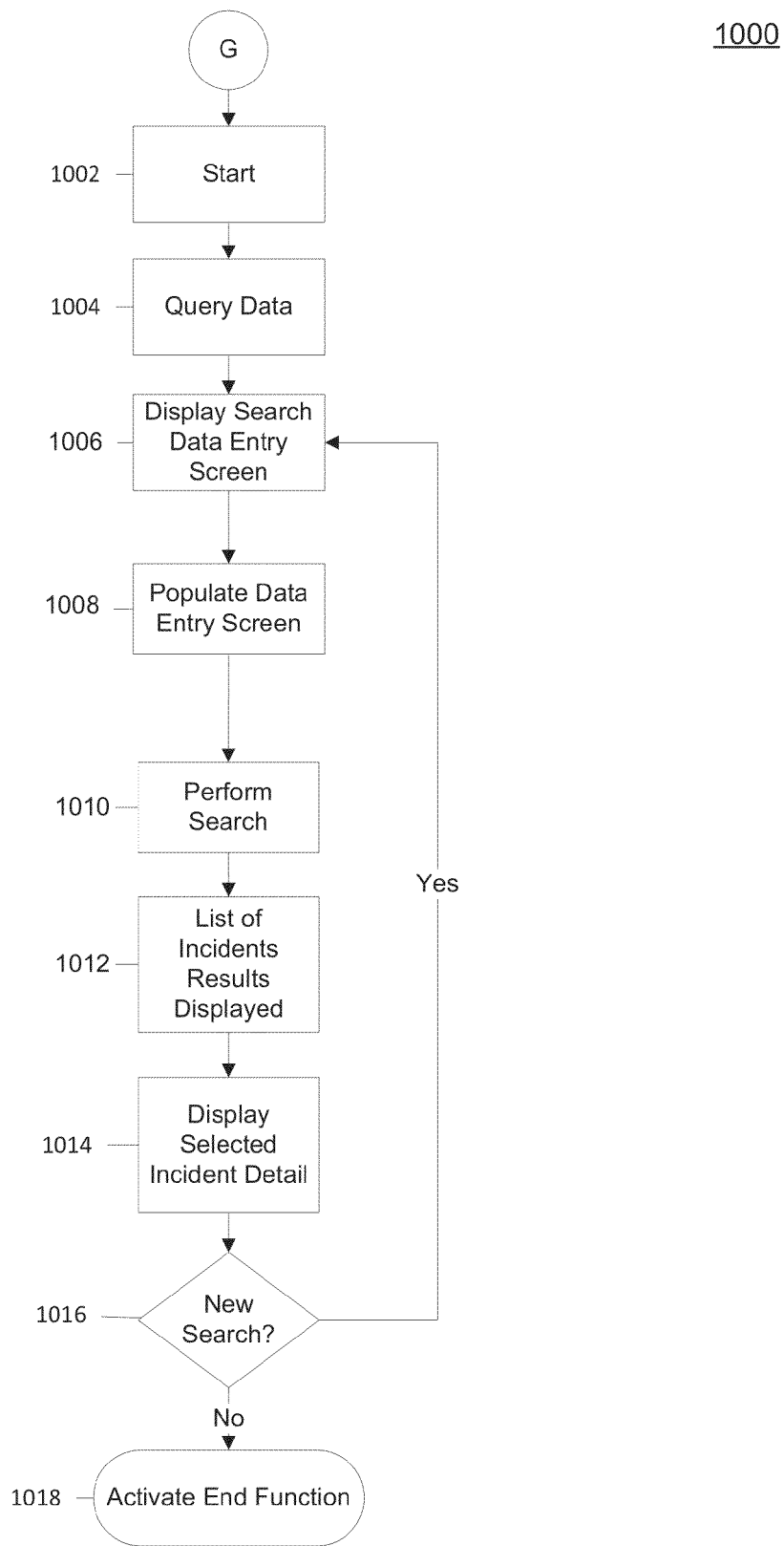
FIG. 10 depicts a flowchart of one method of allowing a user to search for a particular incident or event in accordance with the method of the present invention illustrated in FIG. 1.

Now referring to FIG. 10, illustrated is a flowchart of one method of allowing a user to search for a particular incident or event in accordance with the method of the present invention illustrated in FIG. 1. Process 1000 begins at 1002, typically after being launched from a master process such as process 100 as described above with respect to FIG. 1. For example, process 1000 may be initiated by selecting information search function 118*h* (FIG. 1) from the CAD sub-system main menu. Once process 1000 has been initiated, it proceeds to 1004. Although the depicted embodiment of the present invention does not show a search function available to an SMS sub-system user, such an SMS function may be incorporated without departing from the scope of the present invention.

At 1004, the client application executes a data query to server 208 and database 210 to obtain a list of search data stored in database 210 including data retrieved from Personnel 20 table 1928 (i.e., first name, last name, and personnel ID) and IncidentTypes table 1960 (i.e., incident type ID and incident type).

Once this data is retrieved, process 1000 proceeds to step 1006, at which a search data entry screen is displayed to a user. The search data entry screen includes data fields for entry of information related to the desired incident (i.e., the incident the user wishes to locate) including, but not limited to, date and/or time range for the incident, personnel associated with the incident, incident type, and informational text associated with the desired incident. The search will search all fields of all incidents to find text matching the desired informational text as entered by the user. The data fields may, for example, require manual entry by the user or may include pre-populated pull down menus from which a user may select the desired data. Process 1000 then proceeds to 1008.

At 1008, the user populates one or more of the data fields displayed in the search data entry screen. In the depicted embodiment, information that may be selected from a list (e.g., personnel, incident type, and incident location) is selected from a pull-down menu populated by the data retrieved in step 1004 from database 210. However, any of the search data fields discussed herein may be populated in other manners including, but not limited to, entry of a predetermined code, manual data entry, date selection from a calendar, and the like.

Once the user has populated the desired data fields, process 1000 proceeds to 1010, at which the client application executes a query to server 208 and database 210 to obtain a list of all incidents from Incidents Table 1948 that match the search parameters entered by the user at 1008. This initiates a call to the messaging system that includes the selected criteria. The messaging system executes an SQL query to database 210 to query, specifically, IncidentStatuses table 1952 (to obtain incident status such as active or inactive), Incidents table 1948 (to obtain IR number and location), IncidentNotes table 1946 (to obtain incident notes), IncidentPersonnel table 1934 (to obtain personnel associated with the incident), Personnel table 1928 (to obtain information related to the personnel such as department, personnel category, badge number, first and last name, whether employment of personnel is active, etc.), IncidentPersonnelStatuses table 1938 (to obtain personnel ID and personnel status related to the incident such as dispatched, enroute, arrived, or cleared), IncidentTypes table 1960 (to obtain incident types such as riot, robbery, etc.), Reports table 1954 (to obtain report information such as IncidentID, TypeID, ReportData, etc.), ReportHistory table 1950 (to obtain historical information of the different report statuses), ReportStatus table 1956 (to obtain report status information such as saved, sent, deleted, returned, and approved), ReportTypes table 1958 (to obtain report types such as incident report, crash report, etc.) and ReportTransmits table 1966 (to obtain information about the transmits related to a particular report including the user who initiated it and the user who received the report) to pull the incidents matching the criteria entered by the user. Once these incidents are retrieved, process 1000 proceeds to step 1012, at which a list of all retrieved incidents is displayed to the user.

Next, at 1014, the user selects a particular incident from the incident list and the report associated with the selected incident is displayed to the user. In the depicted embodiment, the report is displayed in a read only format since the ability to edit or revise an incident report is limited to the personnel who originally created the report. However, alternate embodiments of the present invention are envisioned in which a user may read and edit an incident report at step 1014.

Next, at 1016, the user decides whether to run a new search or to end function. If the user wishes to run a new search for one or more new incidents, the user initiates this by tapping, clicking, or double-clicking a "Run Search" button or the like via the user's finger or an input device such as input device 314 or 414 as discussed above with respect to FIGS. 2-4, and process 1000 returns to 1006.

Alternatively, if a user wishes to exit information search function 118h, the user activates an end function, and process 1000 proceeds to 1018. In one embodiment, a user clicks an "End", "Close", or similar button. This action automatically ends process 1000. Since process 1000 is invoked by process 100, process 1000 then returns control to process 100 at step 117 at which the user may select a new function from the user's designated sub-system main menu.

Figure 11:
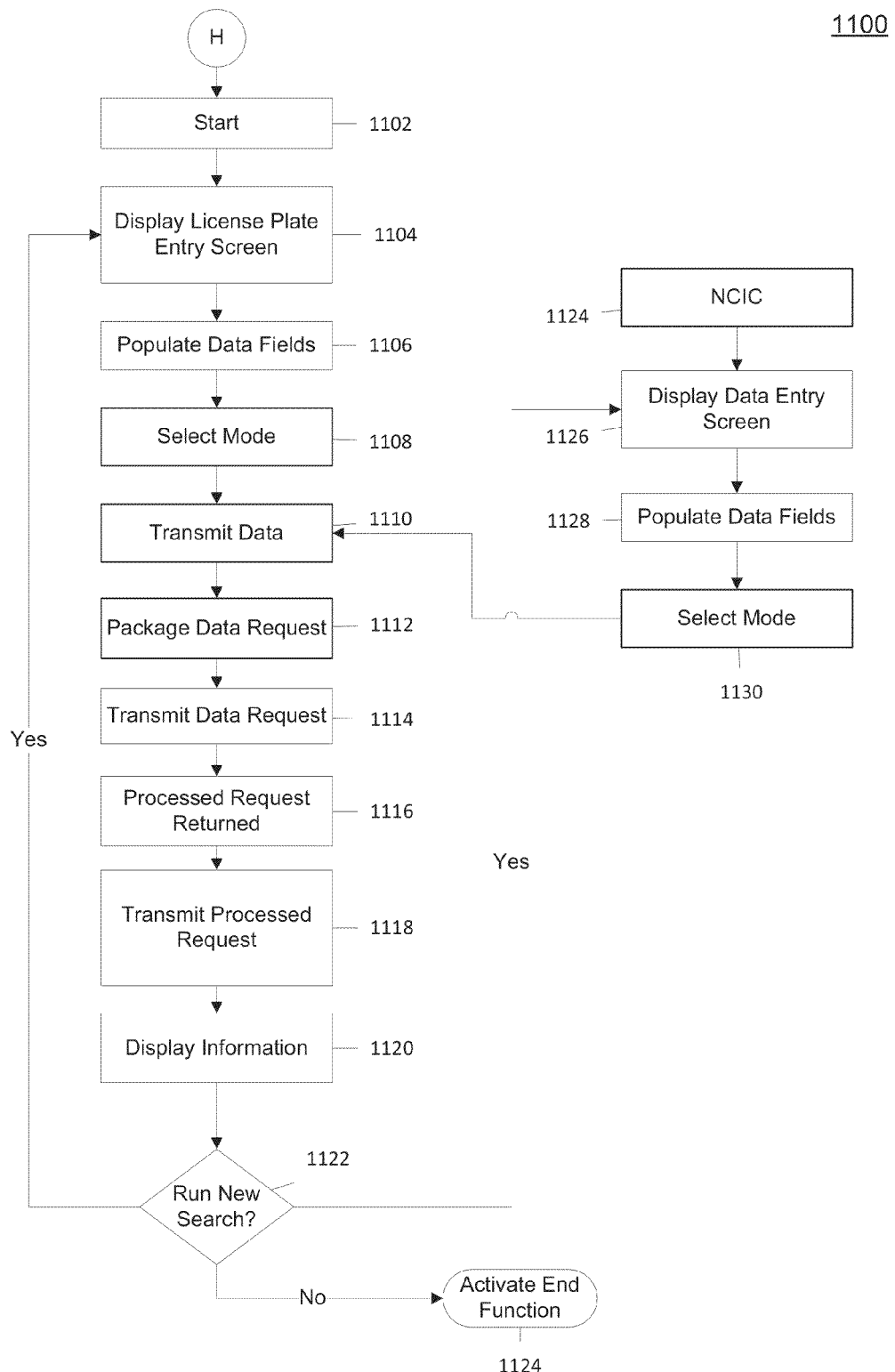
FIG. 11 depicts a flowchart of one method of allowing a user to search for data associated with a particular license plate number, article, vehicle identification number ("VIN"), and/or person in accordance with the method of the present invention illustrated in FIG. 1.
Figure 12:
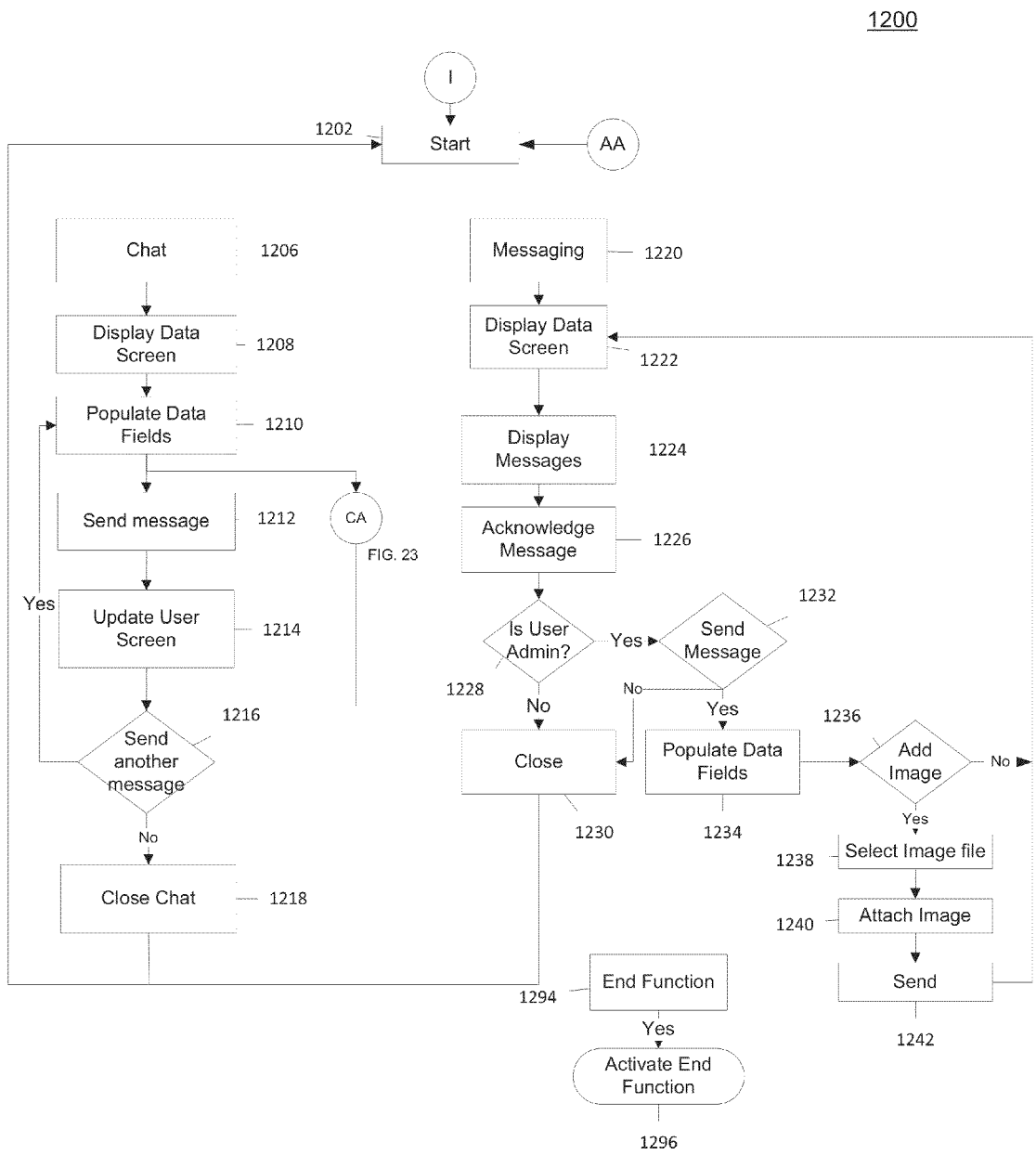
FIGS. 12A-12B depicts a flowchart of one method of allowing a user to access miscellaneous functions including chat, messaging, maps, and translation in accordance with the method of the present invention illustrated in FIG. 1.
Figure 12:
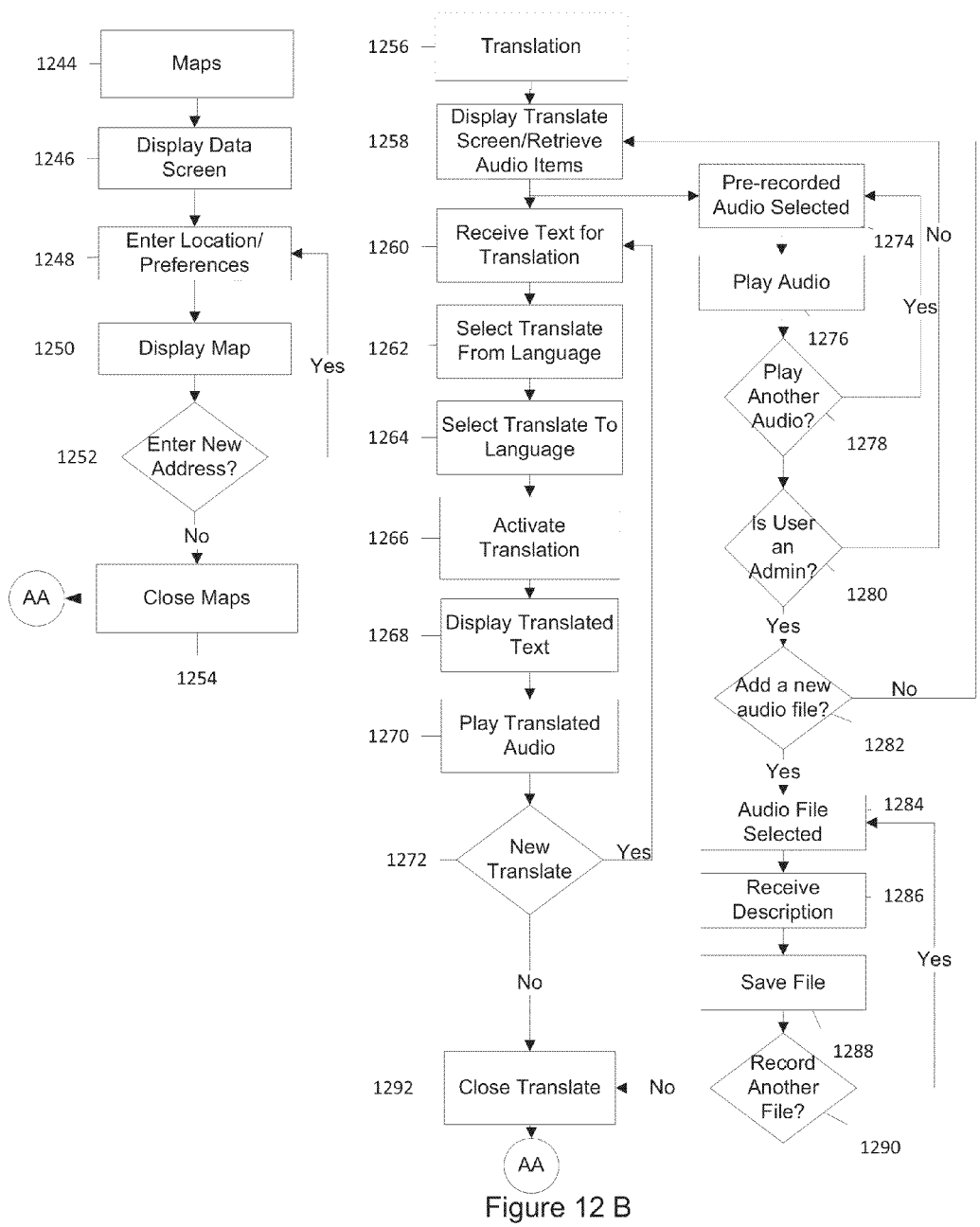

Now referring to FIG. 11, illustrated is a flowchart of one method of allowing a user to search for data associated with a particular license plate number, article, VIN, and/or person in accordance with the method of the present invention illustrated in FIG. 1. In the depicted embodiment of the present invention, a user may search for US or Canadian license plate numbers; however, alternate embodiments are envisioned in which a user may search for the license plates of varying countries.

Process 1100 begins at 1102, typically after being launched from a master process such as process 100 as described above with respect to FIG. 1. For example, process 1100 may be initiated by selecting motor vehicle/NCIC function 118i (FIG. 1) from the CAD sub-system main menu or motor vehicle/NCIC function 120c from the RMS sub-system main menu. Once process 1100 has been initiated, it proceeds to 1104.

At 1104, a motor vehicle data entry screen is displayed to a user. In the depicted embodiment, the motor vehicle data entry screen includes data fields for entry of one to three US and/or Canadian motor vehicle license plate numbers. The data fields may, for example, require manual entry by the user. However, alternate embodiments accepting a varying quantity of license plate numbers and/or license plate numbers from varying countries are envisioned. Process 1100 then proceeds to 1106.

At 1106, the user populates one or more of the data fields displayed in the motor vehicle data entry screen. Data entry may be performed in virtually any manner including speech to text conversion. Once the user has populated the desired data fields, process 1100 proceeds to 1108, at which the user selects the search mode, which may be Random or Full Disclosure. The former returns limited information related to the entered license plate numbers (e.g., the vehicle's registration status and the registered owner's driver license status), and the latter returns more comprehensive information related to the entered license plate numbers (e.g., the information that is disclosed in random mode, name and address of the registered owner, photo of the registered owner, motor vehicle history related to the license plate and the owner's driver's license). The information returned in the Random or Full Disclosure mode is controlled by the motor vehicle service of the state(s) that issued the license plate(s).

After the search mode is selected, process 1100 proceeds to 1110, at which the client application transmits the data entered in steps 1106 and 1108 to server 208 and database 210. This step may be performed when the user clicks or touches an enter, submit, or similar icon. Next, at 1112, the information received by server 208 in step 1110 is packaged in accordance with the requirements of the server(s) of the state(s) handling the request. That is, each state's motor vehicle department might require the information to be packaged differently and sent using a different method. For example, in the state of New Jersey, the packaged format must be compatible with IBM's WebSphere MQ messaging protocol as this is the protocol utilized in the State of New Jersey and all requests must be accompanied by an ORI number (which is assigned and approved in advance) that is unique to the entity issuing the request.

Once the data is packaged at 1112, process 1100 proceeds to 1114, at which the data is transmitted to the state server(s) utilizing the state(s)' required messaging protocol for processing. Next, at 1116, the processed request is returned to the messaging subsystem of the present invention, whereupon the messaging subsystem transforms it to a format compatible with the client application.

At 1118, the transformed processed request is sent to the client application. Next, at 1120, the information received from server 208 is displayed by the client application of the non-mobile interface unit 202 or mobile interface unit 204. On the client application, the data is rendered as text. If the client application detects binary information, it assumes it is an image or picture and tries to render the image using standard .NET image libraries and namespaces. Such processing allows the desired information to be displayed to the user adjacent the associated data fields of the motor vehicle data entry screen (or the NCIC data entry screen as discussed below). That is, limited or detailed information about each license plate number, article, person, or VIN is displayed in correlation to each entered data field.

Next, at 1122, the user decides whether to run a new search or to end function. If the user wishes to run a new search for one or more new license plate numbers, the user initiates this by tapping, clicking, or double-clicking a "New Search" button or the like via the user's finger or an input device such as input device 314 or 414 as discussed above with respect to FIGS. 2-4, and process 1100 returns to 1104. Alternatively, if a user wishes to exit the function, the user activates an end function, and process 1100 proceeds to 1124. In one embodiment, a user clicks an "End", "Close", or similar button. This action automatically ends process 1100. Since process 1100 is invoked by process 100, process 1100 then returns control to process 100 at step 117, at which the user may select a new function from the user's designated sub-system main menu.

In another alternative, a user may execute a National Crime Information Center ("NCIC") function from within the motor vehicle screen by clicking or otherwise activating an "NCIC" or similar icon to query article, VIN, or personal information from the FBI's NCIC database. To do this, the user activates the NCIC function at 1124, after which process 1100 proceeds to 1126.

At 1126, an NCIC data entry screen is displayed to a user. In the depicted embodiment, the NCIC data entry screen includes various data fields. Two of the data fields, namely, NCIC serial number and NCIC category code, are used when searching for an article. An article search may be conducted, for example, upon the receipt of a report of a stolen item. The user enters the NCIC serial number and the category code associated with the category of the item as defined by the NCIC. In this scenario, the search queries the NCIC database and returns any items, and its associated information, that correspond with the entered information. The associated information may include items such as date, location and other information related to the stolen item as determined by the NCIC database.

One of the data fields, namely, VIN, is used when searching for, or verifying, information related to a vehicle associated with the VIN.

For personal information searches, the data fields may include items such as first name, last name, middle initial, date of birth, social security number, race, sex, driver license number, driver license state, and an option of receiving an image of the person, all as defined by the NCIC database. The user can enter any or all information for the personal information search. The degree of specificity of the search results is dependent on the amount and accuracy of information entered.

Process 1100 then proceeds to 1128, at which the user populates the necessary data fields. Data entry may be performed in virtually any manner including speech to text conversion. Once the user has populated the desired data fields, process 1100 proceeds to 1130, at which the user selects the Full Disclosure mode, as discussed above.

After the search mode is selected, process 1100 proceeds to 1110 and steps 1110 through 1122 are performed as discussed above. Although the NCIC search accessed the NCIC database rather than the state's motor vehicle database, in the depicted embodiment, the NCIC database is accessed through the state server in substantially the same manner as the motor vehicle database is accessed. However, alternate embodiments are envisioned in which the NCIC database is accessed directly or through other mediums than state servers.

Turning next to FIGS. 12A and 12B, illustrated is a flowchart of one method of allowing a user to access miscellaneous functions including chat, messaging, maps, and translation in accordance with the method of the present invention illustrated in FIG. 1. In the depicted embodiment of the present invention, a user may select any one of these four functions, however, alternate embodiments having greater or fewer miscellaneous functions are envisioned. The chat function enables the user to have a one-on-one chat with another user or a public chat with all other users who are currently logged into the system.

The messaging function enables the SMS administrator to transmit messages and/or orders, with or without images, to all personnel or a subset thereof. It also enables all users to receive such messages and acknowledge the receipt.

The maps function enables a user to look up an address on a map by entering the zip code or a part or whole address. In one embodiment of the present invention, the maps functionality is provided by Google® Maps via the current Google® Maps API. The present invention is programmed to provide access to. Google's street and satellite views.

The translation function enables a user to translate speech or text into different languages as well as playing pre-recorded audio messages through standard audio controls. In one embodiment of the present invention, the pre-recorded messages may include pre-recorded Miranda right warnings, Driving Under the Influence ("DUI") consent checks, and other similar requirements in one or more languages. In one embodiment of the present invention, the SMS sub-system allows an administrator to add new audio items to the translate function for use by other users. In one embodiment of the present invention, the translate function is provided by the Microsoft® Translate API, which supports most major international languages.

Process 1200 begins at 1202, typically after being launched from a master process such as process 100 as described above with respect to FIG. 1. For example, process 1200 may be initiated by selecting miscellaneous function 118*j* (FIG. 1.) from the CAD sub-system main menu or miscellaneous function 120*d* from the RMS sub-system main menu.

Once process 1200 has been initiated, the user may select any one of the four miscellaneous functions by activating the respective button, icon, or the like. If the user selects the "Chat" option, process 1200 proceeds to 1206. Next, at 1208, the chat data entry screen is displayed to the user and it includes a text box for entry of a message as well as an area for selection of the recipient(s) of the message. Simultaneously, the client application makes a call to the messaging subsystem to retrieve a list of the users who are currently logged into system 200. This list is used to create a potential recipient list which is also displayed to the user.

Figure 23:
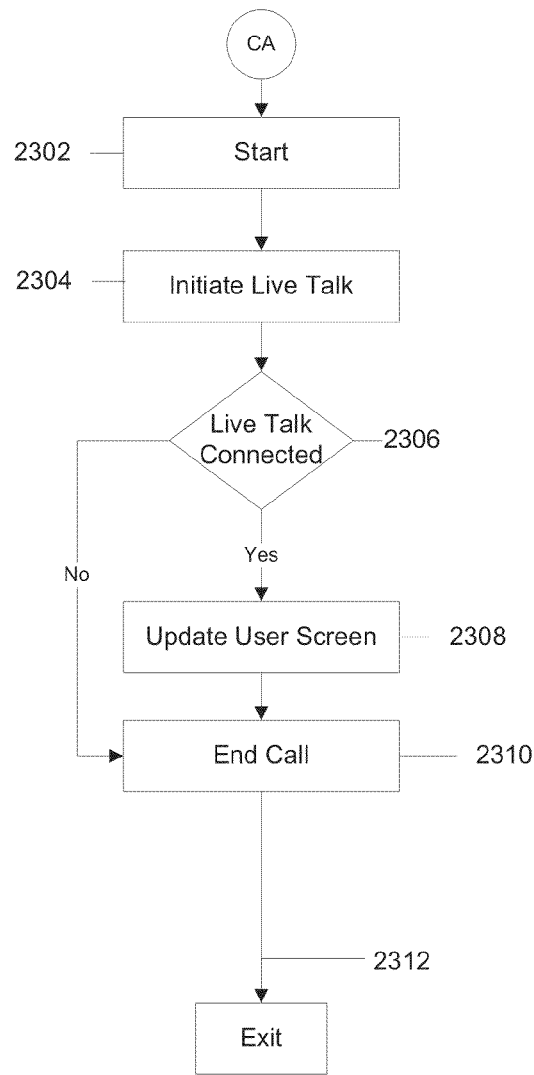
FIG. 23 depicts a flowchart of one method of allowing a user to initiate Live Talk functionality which enables one user to have a video/audio call with another.

Next, at 1210, the user enters a message and selects one or more recipients from the list populated in step 1208. In the depicted embodiment, there is also an option to send the message to all logged-in users; however, this feature is not required to implement the present invention. In the depicted embodiment, the user may also select another user to initiate the Live Talk function as depicted in FIG. 23.

At 1212, the message is transmitted to the selected recipient(s) by sending the message and the intended recipients to the messaging subsystem. If the sender has chosen to send the message to all logged-in users, the message is sent to the messaging subsystem with the recipient field set to "ALL". Once the messaging subsystem receives this information, it pushes the message using callbacks to the intended recipients. In the depicted embodiment, a duplex WCF call is implemented to achieve two way communications.

Process 1200 then proceeds to 1214, at which the client application receives a return message (or new message) from the messaging subsystem. The user's screen is updated to depict the received messages and the list of available recipients is simultaneously updated.

Next, at 1216, the user can decide to send another message. If the user chooses to do so, process 1200 returns to 1210. Alternatively, at 1216, the user can decide to close the chat function by clicking or otherwise activating a "Back" or similar button. If the user chooses to close, process 1200 returns to 1202 at which the user may select any one of the four miscellaneous functions by activating the respective button, icon, or the like.

If the user selects the "Messaging" option, process 1200 proceeds to 1220. Next, at 1222, the messaging data entry screen is displayed. Simultaneously, the client application makes a call to the messaging subsystem to retrieve a list of all messages sent to the user since the user last accessed his or her messaging function. That is, the messaging subsystem runs an SQL query of Messages table 1916 (to obtain information about the messages, the sender, and the users who needs to receive it), Users 1922 (to obtain the sender's and the receiver's messaging information such as user name), MessagesImages 1918 (to obtain any images related to the messages being retrieved) and MessagesText 1924 (to obtain text related to the messages being retrieved).

Next, at 1224, the client application displays a list of the messages retrieved in step 1222. The user views individual messages by selecting each one as desired. When a user opens the message, the text part of the message is rendered and a check is made to see if the message data contains binary image data. If yes, standard .NET libraries are used to display the image to the user.

At 1226, if the user wishes to acknowledge receipt of the message, the user can select an "I acknowledge receipt" or similar option. If selected, this information is transmitted to server 208 and it is marked in Messages table 1916 (i.e., the read date is updated for the record specific to the user receiving that specific message). Next, at 1228, if the user is an administrator, process 1200 proceeds to 1232 at which the user has the option to transmit a new message. If the user is not an administrator, the user can continue to view and acknowledge messages until the user decides to close the messaging function by clicking or otherwise activating a "Back" or similar button at 1230. If the user chooses to close, process 1200 returns to 1202 at which the user may select any one of the four miscellaneous functions by activating the respective button, icon, or the like.

At 1232, if the user wishes to transmit a message, process 1200 proceeds to 1234 at which the message text is entered. Then, at 1236, the user has the option of attaching an image to the message. If the user wishes to attach an image, process 1200 proceeds to 1238 at which the user is presented with a standard windows file browse window via which an image can be selected from the file system. At 1240, the image is marked for attachment to the message.

Next, at 1242, the user selects the Send function. The send function can also be initiated at 1236 if the user chooses not to include an image. Once the send function is initiated, a request is sent to the messaging subsystem and the message and the optional image is transmitted to server 208. The server stores this information in the following tables: Messages 1916 (message information such as sender, receiver, textID, send date, etc.), MessagesImages 1918 (to store any images related to the message), and MessagesText 1924 (to store the text entered for the message). Process 1200 then returns to 1222, at which the user can continue to view, acknowledge, and send messages until the user decides to close the messaging function by clicking or otherwise activating a "Back" or similar button at 1230. If the user chooses to close, process 1200 returns to 1202 at which the user may select any one of the four miscellaneous functions by activating the respective button, icon, or the like.

If the user selects the "Maps" option, process 1200 proceeds to 1244. At 1244, the client application initiates a mapping program and/or software for display to the user. In one embodiment, the client application calls a mapping program module via an application programming interface ("API") such as the Google™ Maps API. The Google™ Maps API is a language and message format that allows the Google™ Maps program to communication with, and be initiated by, the client application operating on non-mobile user interface 202 or mobile user interface 204. The Google Maps API is initiated using the browser control in the messaging subsystem. All functions and rendering of the map are controlled by Google™ Maps API calls. That is, at step 1246, a function call is initiated that activates the Google™ Maps subroutine. However, other map subroutines may be substituted including, without limitation, custom map subroutines, Yahoo™ maps, Map Quest™, and the like.

In the depicted embodiment, the Google™ Maps subroutine is called through a direct Internet connection between non-mobile user interface 202 or mobile user interface 204 and one or more Google™ servers hosting the map subroutine(s). However, alternate embodiments are envisioned in which non-mobile user interface 202 or mobile user interface 204 initiates a map subroutine request via server 208, the latter of which then calls the Google™ Maps subroutine through its Internet connection. In the latter embodiment, use of the maps function may then be tracked and recorded by server 208.

At 1246, a data screen associated with the mapping subroutine is displayed to the user via an output device such as output device 316 or 416 as described above with respect to FIGS. 2-4. This data screen is, or includes, the Google™ Maps user interface which accepts information from a user.

Next, at 1248, the user enters data such as user preferences and/or an address that the user wishes to find. Preferences may include, but are not limited to, street view or satellite view. Once data has been entered, process 1200 proceeds to 1250, at which a map of the entered address is displayed to the user. This may be initiated by click or tapping on the Search button. This is done by calling a JavaScript function provided by Google Maps API. We provide the method search the information entered in the address box. The processing of the command and the rendering of the browser page is handled by Google Maps API. The map renders with the information provided.

Next, at 1252, the user decides whether to enter a new address or to end function. If the user wishes to view a new map for a new address, the user initiates this by tapping, clicking, or double-clicking an "Enter New Address" button or the like via the user's finger or an input device such as input device 314 or 414 as discussed above with respect to FIGS. 2-4, and process 1200 returns to 1248. Alternatively, at 1252, the user can decide to close the maps function by clicking or otherwise activating a "Back" or similar button at step 1254. If the user chooses to close, process 1200 returns to 1202 at which the user may select any one of the four miscellaneous functions by activating the respective button, icon, or the like.

If the user selects the "Translation" option, process 1200 proceeds to 1256, at which point a translation data entry screen is displayed to the user. The translation feature allows a user to interact with a third party who speaks a language other than that of the user. For example, in the police officer embodiment of the present invention, the translation feature allows the officer to read a suspect his or her Miranda rights in his or her native language.

At 1258, the client application initiates a translation program and/or software for display to the user. In one embodiment, the client application accesses a translation Web site via the Internet and automatically opens a built-in Web browser on mobile user device 204 to display the translation Web site to the user. In the depicted embodiment, mobile interface unit 204 accesses the Microsoft™ Translate Web site. However, other translation Web site and/or other methods of providing a translation function may be substituted including, but not limited to, calling a translation program module via an API.

In the depicted embodiment, the Microsoft™ Translate Web site is accessed through a direct Internet connection between mobile user interface 204 and one or more Microsoft™ servers hosting the Translate Web site. However, alternate embodiments are envisioned in which mobile user interface 204 accesses a translation Web site or initiates a translation subroutine request via server 208, the latter of which then accesses a translation Web site or initiates a translation subroutine through its Internet connection. In the latter embodiment, use of the translation function may then be tracked and recorded by server 208.

At 1258, the client application also retrieves the audio items available from the AudioItems 1920 database table to obtain a list of available audio items available (e.g., Miranda rights warnings).

If the user does not wish to select a pre-recorded audio item, process 1200 then proceeds to 1260, at which the user manually enters the text to be translated into the translation Web site. Next, at 1262, the user selects the language from which the text will be translated. Next, at 1264, the user selects the language to which the text will be translated. The translation is activated at 1266, for example, by tapping, clicking, or double-clicking a "Translate" button or the like via the user's finger or an input device such as input device 314 or 414 as discussed above with respect to FIGS. 2-4.

Next, at 1268, the translated text is displayed to the user with an option to play the text as audio. At 1270, upon selection of the audio feature of the Translate Web site, the audio is played to the third party. Then, at 1272, the user has the option to enter additional text for translation, which causes process 1200 to return to 1260.

Alternatively, at 1258, the user has the option of playing a pre-recorded, pre-loaded audio file, which causes process 1200 to proceed to 1274. At 1274, the user selects such an audio file from the list displayed in step 1258.

Next, at 1276, the user plays the pre-recorded, pre-loaded audio file by selecting an audio function similar to the ones on a standard audio player such as play, stop, pause, and skip.

At 1278, the user has the option of selecting another pre-recorded audio file for manipulation, thereby causing process 1200 to return to 1274. Alternatively, process 1200 proceeds to 1280, at which process 1200 queries whether the user is an administrative user. If no, process 1200 returns to 1258. If yes, process 1200 proceeds to 1282, at which the user has the option of adding a new audio file. If the user does not wish to add a new audio file, process 1200 returns to 1258.

If the user chooses to add a new audio file, a standard windows file selector is displayed at 1284. The user selects the desired pre-recorded audio file, and process 1200 proceeds to 1286, at which the user enters a description of the file. The description is used as both a label for the file (to be used when the file is displayed in the list of pre-recorded audio) and the filename. Finally, at 1288, once the information entry and selection is complete, the user initiates the save function which causes the entered information to be transmitted to server 208. The information is stored the AudioItems 1920 database table.

Next, at 1284, the user decides whether to add a new audio item or to end the translation function. If the user wishes to add a new audio item, process 1200 returns to 1284. Alternatively, at 1284, the user can decide to close the translation function by clicking or otherwise activating a "Back" or similar button at step 1292. If the user chooses to close, process 1200 returns to 1202 at which the user may select any one of the four miscellaneous functions by activating the respective button, icon, or the like.

Alternatively, if a user wishes to exit the miscellaneous function entirely, the user activates an end function, and process 1200 proceeds to 1294. In one embodiment, a user clicks an "End", "Close", "Home" or "Back" or similar button. This action automatically ends process 1200. Since process 1200 is invoked by process 100, process 1200 then returns control to process 100 at step 117 at which the user may select a new function from one or more menus.

Figure 13:
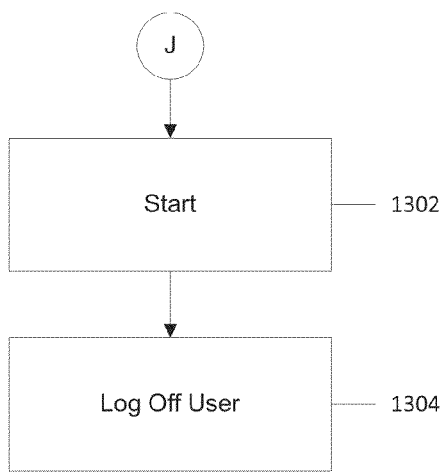
FIG. 13 depicts a flowchart of one method of logging off a user in accordance with the method of the present invention illustrated in FIG. 1.

Now referring to FIG. 13, illustrated is a flowchart of one method of logging off a user. Process 1300 begins at 1302, typically after being launched from a master process such as process 100 as described above with respect to FIG. 1. For example, process 1300 may be initiated by selecting logoff function 118k (FIG. 1) from the CAD sub-system main menu, logoff function 120e from the RMS sub-system main menu, or logoff function 122f from the SMS sub-system main menu. Once process 1300 has been initiated, it proceeds to 1304.

At 1304, the client application clears any session data stored in memory and returns the user to the login screen at step 106 of process 100 as depicted in FIG. 1.

Figure 14:
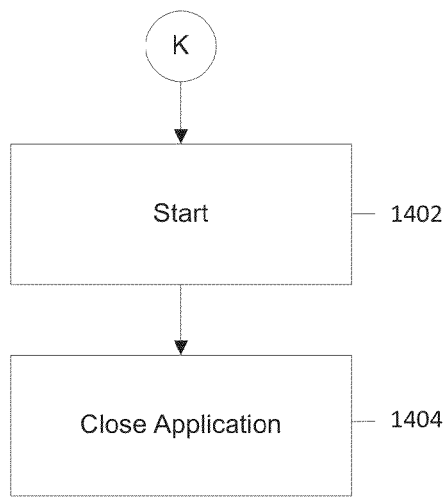
FIG. 14 depicts a flowchart of one method of allowing a user to exit a main menu in accordance with the method of the present invention illustrated in FIG. 1.

Now referring to FIG. 14, illustrated is a flowchart of one method of allowing a user to exit the CAD, RMS, and SMS sub-systems. Process 1400 begins at 1402, typically after being launched from a master process such as process 100 as described above with respect to FIG. 1. For example, process 1400 may be initiated by selecting exit function 118l (FIG. 1) from the CAD sub-system main menu, exit function 120f from the RMS sub-system main menu, or exit function 122g from the SMS sub-system main menu. Once process 1400 has been initiated, it proceeds to 1404. At 1404, the client application closes the application and the user is returned to the Windows desktop.

Turning now to FIGS. 15A-15D, illustrated is a flowchart of one method of allowing a user of the RMS sub-system to manage information and actions in accordance with the method of the present invention illustrated in FIG. 1. Process 1500 begins at 1502, typically after being launched from a master process such as process 100 as described above with respect to FIG. 1. For example, process 1500 may be initiated by selecting Personnel Activity function 120a (FIG. 1) from the RMS user main menu. Once process 1500 has been initiated, it proceeds to 1504.

At 1504, the client application executes an open incident and event query to server 208 and database 210 to obtain a list of all open events and incidents stored in database 210 that are associated with the current user. A call is made to the messaging subsystem to retrieve the list of open incidents and events assigned to the user by executing an SQL query of IncidentStatuses table 1952 (to obtain incident status such as active or inactive), Incidents table 1948 (to obtain IR number and location), IncidentNotes table 1946 (to obtain incident notes), IncidentPersonnel table 1934 (to obtain personnel associated with the incident), Personnel table 1928 (to obtain information related to the personnel such as department, personnel category, badge number, first and last name, whether employment of personnel is active, etc.), IncidentPersonnelStatuses table 1938 (to obtain personnel ID and personnel status related to the incident such as dispatched, enroute, arrived, and cleared), IncidentTypes table 1960 (to obtain incident types such as riot, robbery, etc.), Reports table 1954 (to obtain report information such as IncidentID, TypeID, ReportData, etc.), ReportHistory table 1950 (to obtain historical information of the report's status changes), ReportStatus table 1956 (to obtain report status information such as saved, sent, deleted, returned, and approved), ReportTypes table 1958 (to obtain report types such as incident report, crash report, etc.) and ReportTransmits table 1966 (to obtain information about the transmits related to a particular report, the user who initiated the report, and the user who received the report). Once this data is retrieved, process 1500 proceeds to step 1506, at which a list of open incidents and events associated with the current user is displayed to the user. This list is displayed on output device 416 of the mobile interface unit 204 as described in greater detail above with respect to FIGS. 2-4.

Next, the user can choose a specific incident or event at 1508 or can choose to view all open or returned reports at 1510. Selecting a specific incident or event at 1508 enables the user to select a particular incident or event to view its detailed information, to edit existing reports associated with the incident or event, and/or to create a new report for the incident or event.

Selecting view open/returned reports at 1510 enables the user to view a list of open and/or returned reports. An open incident is defined as an incident or event which is marked as requiring a report, which marking is typically performed by an SMS sub-system user such as an administrator. In the depicted embodiment, if the user does not complete a report for a particular incident or event, it shows up as an icon with red highlighting in the list of open or returned reports. A returned report is a report associated with an incident or event which has been rejected by the supervisor. The user typically modifies the rejected report and resubmits it for supervisor approval.

If a user wishes to select an incident or event at 1508, the user clicks, taps or otherwise selects the desired incident or event from the listing of same.

Next, at 1512, the user may double tap or double click the incident or event to expand the level of detail. This action will display the information received in step 1504 for the incident or event. Next, at 1516, the user can choose to view or edit a report attached to the incident or event, the process for which is covered in sub-method P of FIG. 15D. Alternatively, at 1508, the user can choose to create a new report for the selected incident at 1514, the process for which is covered in sub-method M of FIG. 15B.

If, at 1506, the user chooses to view open and returned reports, process 1500 proceeds to 1510 at which a list of open and returned reports are displayed to the user as described above. Next, at 1516, the user selects a specific incident or event. At 1518, the user double taps or double clicks the icon associated with the selected incident or event to expand the level of detail associated with the incident as retrieved from database 210 during step 1504. At 1520, the user can choose to view or edit any report assigned to the selected incident or event, the process for which is covered in sub-method P of FIG. 15D.

Figure 15A:
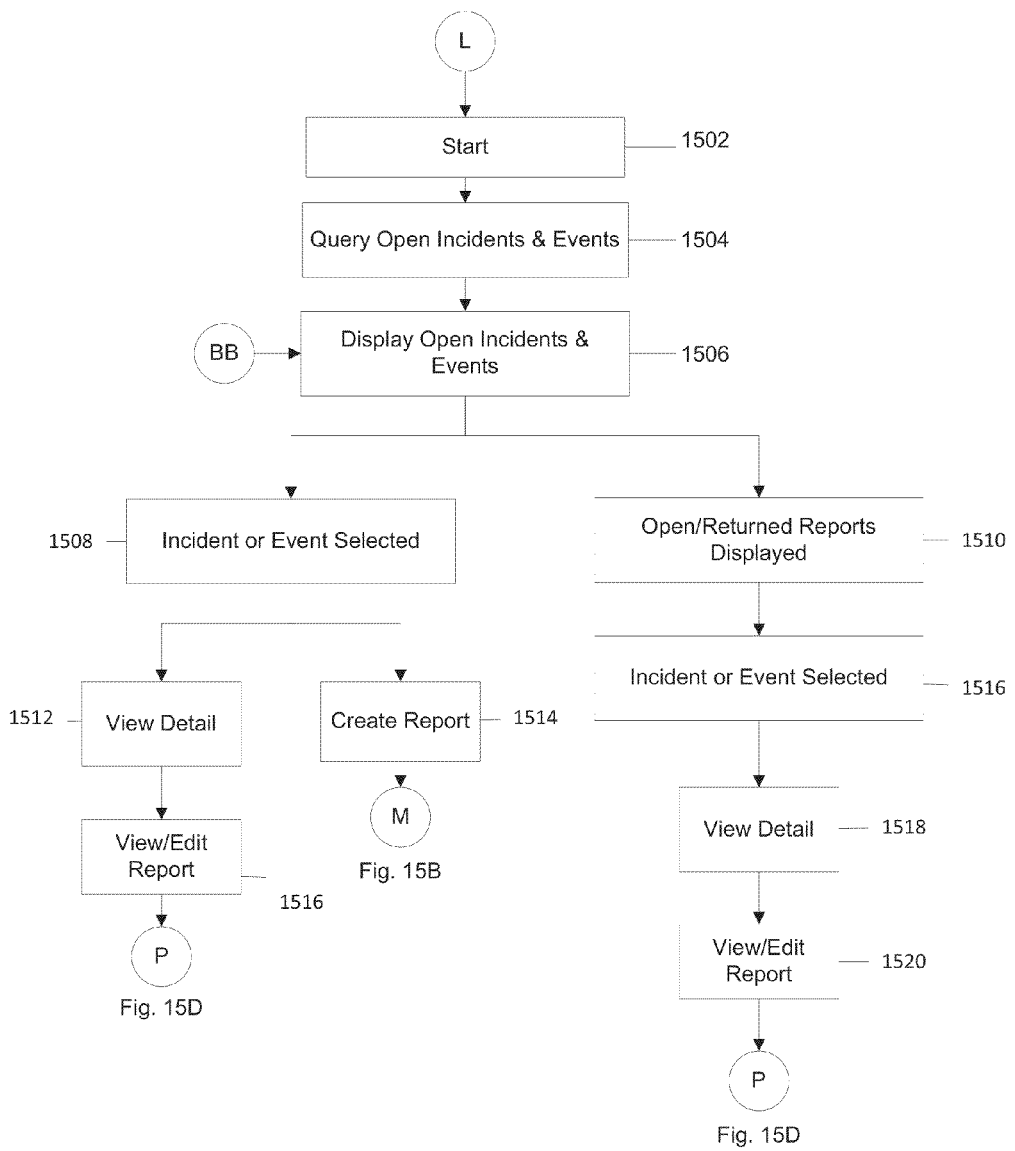
FIGS. 15A-15D depict a flowchart of one method of allowing a user of the RMS sub-system to manage information and actions including creating, viewing, and editing reports in accordance with the method of the present invention illustrated in FIG. 1.
Figure 15B:
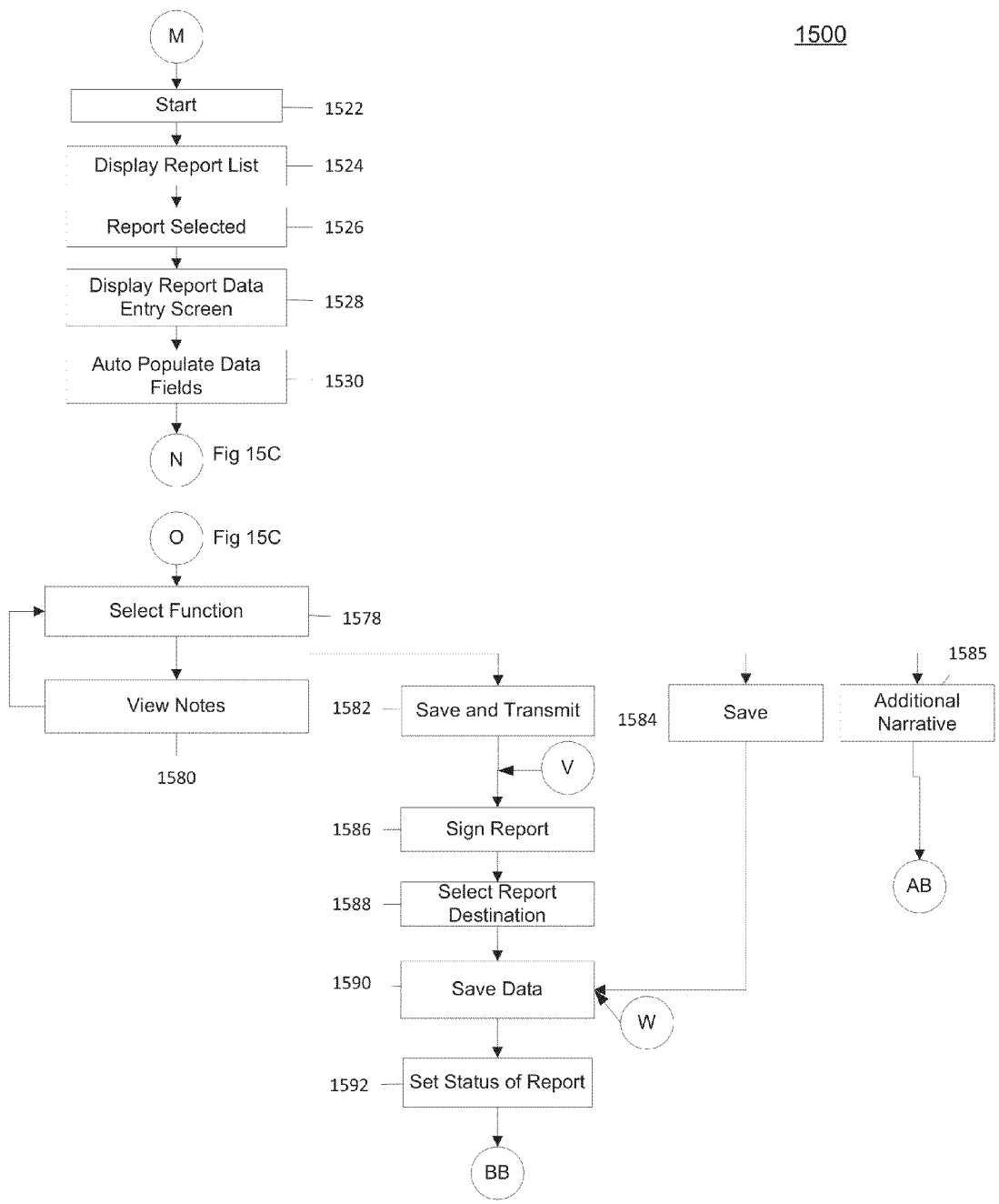

Referring now to FIG. 15B, illustrated is a flowchart of sub-method M, which allows a user to create a report in accordance with the method of the present invention. A report is typically created to allow a user to detail an incident or event. For example, the create report function may be used by a police officer to create a police report for future use by law enforcement and/or the parties involved in the incident or event.

Sub-method M begins at 1522, as a continuation of process 1500 as depicted in FIG. 15A, after a user chooses to create a new report at step 1514. For example, sub-method M may be initiated by selecting the create report option 1514 from the personnel activity screen available in the RMS sub-system main menu. These functions may be initiated, for example, by tapping, clicking, or double-clicking a "Create Report" button or the like via the user's finger or an input device such as input device 314 or 414 as discussed above with respect to FIGS. 2-4.

Once process sub-method M has been initiated, it proceeds to 1524, at which a list of available reports is displayed to a user. In the depicted embodiment, the report list includes all reports currently in use by the user's employer (e.g., police department, firehouse, and hospital) for the particular user's position (e.g., police officer, firefighter, and EMT). The report feature of system 200 is implemented via a Jaspersoft® iReport interface. Via use of the Managed Extensibility Framework ("MEF") portion of the .NET framework, the client application loads all .dll files located in the Report folder (a subfolder of the client application's main file directory) that implements the iReport interface. That is, all reports available to the system are in .dll format. The iReport interface provides an Extensible Application Markup Language "XAML" user interface that will be displayed to the user when the report is to be created or edited. The process then proceeds to 1526, at which the desired report is selected by the user.

Next, at 1528, a create report data entry screen is displayed to the user to allow the user to populate the necessary data fields. The report data entry screen may be retrieved from the mobile interface unit client application or server 208 may be queried to obtain the template. In one embodiment of the present invention, the report templates are loaded from the client machine running the client application. The template is utilized to display a report data screen to the user for receipt of the report information. Each report defines its user interface as an XAML template. The template is rendered inside a container that provides common functionalities. The rendering is a simple process of showing custom UserControl inside a WPF panel which loads the XAML.

Figure 15C:
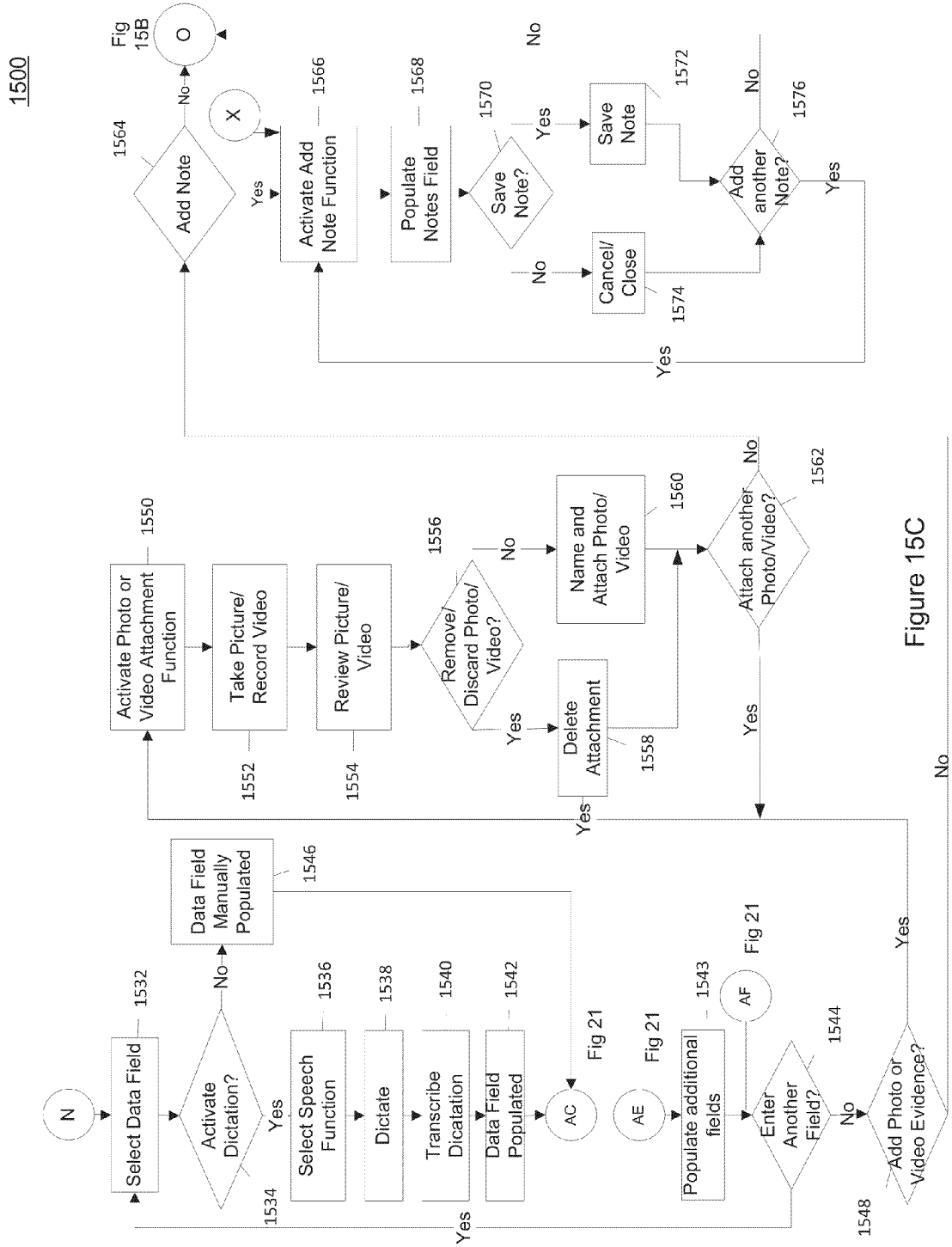

At 1530, the IR number assigned to the incident, date, and location fields of the report data screen are auto-populated. The IR number, date and location are also available in the view incident detail. In the depicted embodiment, the user may populate the party (i.e., each party involved in the event or incident) and party address automatically via a search tool within the report data screen. Next, process 1500 proceeds to sub-method N as depicted in FIG. 15C, at which the user populates the manually entered data of the create report template.

Sub-method N starts at 1532, at which the user selects the data field for which the user will enter data. Next, at 1534, the user has the option to use dictation. At 1534, dictation may be activated, for example, by tapping, clicking, or double-clicking a "Dictation" button, "Speech" button or the like available via the data entry screen via the user's finger or an input device such as input device 314 or 414 as discussed above with respect to FIGS. 2-4.

When dictation is activated, the client application initiates a dictation program or software for use by the user. In one embodiment, the client application calls a dictation module via an API such as the Windows 7 speech API. The Windows 7 speech API is a language and message format that allows the Windows 7 speech program to communicate with, and be initiated by, the client application operating on mobile user interface 204. This is done by initiating a function on the Windows Speech API to start recording. Then, when the API recognizes that the user has stopped speaking, it converts the speech into text and returns control to the client application. That is, when a user activates dictation at step 1534, a function call is initiated that activates the Windows 7 speech subroutine.

If dictation is activated, process 1500 proceeds to 1536, at which an icon is displayed to the user to indicate that the mobile interface unit is in recording mode. Such indication may be any suitable indication method including, but not limited to, a displayed text message and color-coding of some portion of the data entry screen. This is a custom user interface included in the client application that is based on the status reported by Windows 7 Speech API.

At 1538, the user dictates the text. When the API recognizes that the user has stopped speaking or if the stop button is pressed, the Windows Speech API transcribes the audio into text at 1540 and provides it to the client application as text. At 1542, the client application retrieves the transcribed text and automatically enters it into the data field for user review, and process 1500 proceeds to 1544.

At 1544, the user can select to enter data in another field in which case process 1500 returns to 1532. Alternatively, if the user chooses to forego entering data into additional data fields, process 1500 proceeds to 1548.

Figure 21:
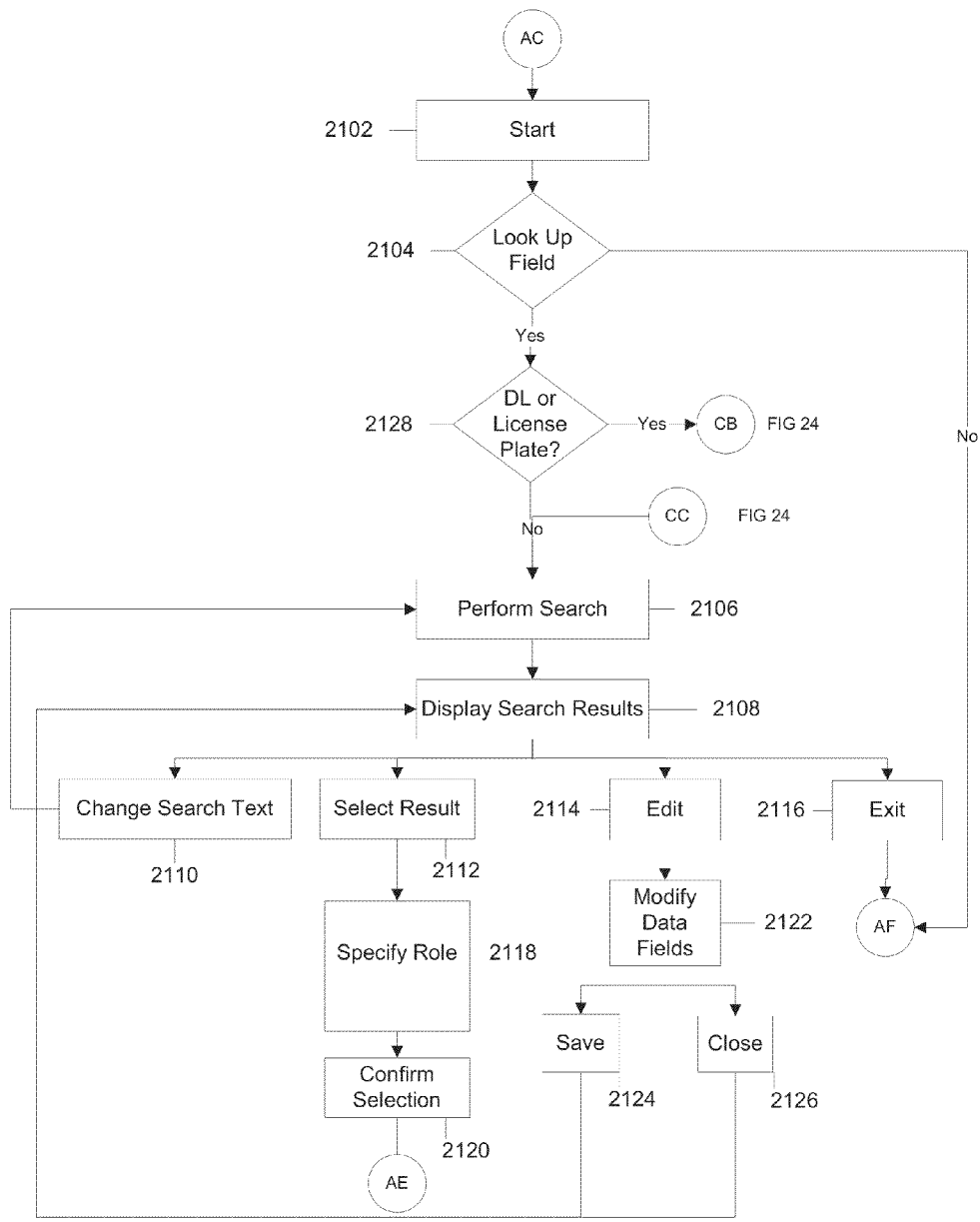
FIG. 21 depicts a flowchart of one method of allowing a user to lookup entities such as subjects, articles and vehicles on report fields which are capable of lookup.

If, at 1534, the user decides to forego dictation, process 1500 proceeds to 1546, at which the data is manually entered via the user. For example, such data may be entered via typing on a keyboard displayed in the data entry screen. After the data has been manually entered, the user can perform a lookup if the field is capable of initiating the lookup process. If such is the case process 1500 performs sub-method AC as depicted in FIG. 21. After the lookup, sub-method AC concludes either at sub-method AF where no lookup item was selected, in which case process 1500 proceeds to 1544 or sub-method AC concludes at sub-method AE, 30 where a lookup item was selected, in which case process 1500 proceeds to 1543.

At 1543, based on the information returned by the lookup functionality, additional fields on the report are filled in automatically using the information returned by the sub-method AC as depicted in FIG. 21.

At 1544, the user determines if the data entered either manually or automatically into the selected data field is acceptable. If no, process 1500 returns to 1532 to allow the user to re-enter or edit the data. Alternatively, if the data is acceptable, process 1500 proceeds to 1548, at which the user decides if the user wishes to add photo or video evidence to this report.

Next, at 1550, process 1500 allows the user to attach photo or videos to the report. The user may do so at 1550 by tapping, clicking, or double-clicking an "Add Photo" or "Add Video" button or the like available via the data entry screen via the user's finger or an input device such as input device 314 or 414 as discussed above with respect to FIGS. 2-4.

When the photo or video attachment function is activated by a user, the client application initiates an Aforge.net open source API resident on mobile interface device 204. AForge.net is an open source C+ framework which includes a set of libraries and sample applications which demonstrate its features as shown below:

AForge.Imaging—library with image processing routines and filters;

AForge.Vision—computer vision library;
AForge.Video—set of libraries for video processing;
AForge.Neuro—neural networks computation library;
AForge.Genetic—evolution programming library;
AForge.Fuzzy—fuzzy computations library;
AForge.Robotics—library providing support of some robotics kits; and
AForge.MachineLearning—machine learning library.

However, other photo and video subroutines may be substituted including, without limitation, custom photo and video subroutines provided by open source or paid providers of .NET libraries.

Once the photo or video program has been called, mobile user device 204 has been activated for photo taking or video recording and process 1500 proceeds to 1552. At 1552, the user positions mobile user device 204 and takes a picture or records the video. Then, at 1554, the user is able to review the photo or video. At 1556, the user has the option to remove and discard the photo or video if the user is not satisfied with the photo or video. If the user wishes to do discard, process 1500 proceeds to 1558, at which the current photo or video screen is displayed along with a list of existing attachments. This information is retrieved from database tables Reports 1954 and ReportAttachments 1962. The user then selects the delete function for a specific listed attachment. At this point, the messaging subsystem is called and the attachment ID is transmitted thereto. The messaging subsystem then removes the entry with the transmitted attachment ID from the ReportAttachments table 1962, thereby deleting the photo or video attachment.

Alternatively, if, at 1556, the user is satisfied with the photo or video, process 1500 proceeds to 1560, at which the photo or video is named and appended to the report. If the report is already saved, the file is transferred as a binary message to the messaging subsystem, which stores the file on server 208 and stores the information related to the file in the ReportAttachments 1962 database table. If the report is not already saved, the file is stored locally on the client machine until the report is saved, at which point the file is transferred to server 208 as described above.

At 1562, the user may elect to attach another photo or video to the report as discussed above, in which case the process 1500 returns to 1550. Alternatively, if a user does not wish to attach another photo or video, process 1500 proceeds to 1564.

At 1564, the user can decide to add notes to the report. If the user wishes to do so, process 1500 proceeds to 1566, at which the add notes function is initiated by clicking or tapping on an "Add Notes" or similar button. Next, at 1568, the user enters the note in the notes data entry field. Then, at 1570, if the user decides to save the note, the "Save Note button can be clicked, tapped, or otherwise activated causing process 1500 to proceed to 1572. For example, the "Save Note" button can be represented as a standard floppy disk-style save button or by a text "Save" or "Save Note" button.

At, 1572, a message is sent to the messaging subsystem to save a note related to the current report. This is done by executing an SQL query on database 208 which accesses database table ReportNotes 1964 to store the note entered by the user.

Alternately, if, at 1570, the user chooses to not save the note, process 1500 proceeds to 1574, at which the note data entry screen is closed and process 1500 proceeds to 1576.

At 1576, the user can decide to add another note in which case process 1500 returns to 1566. Alternately if the user decides to forego adding another note, process 1500 exits sub-method N and proceeds to 1578 as depicted in FIG. 15B.

At 1578, the data fields of the newly created report have been populated and the user is presented with a choice of three additional create report functions, namely, View Notes function 1580, Save and Transmit function 1582, and Save function 1584.

If the user selects the View Notes function 1580, a display of the notes associated with the current report will be toggled from on to off or off to on depending upon the current display status when function 1580 is executed. Process 1500 then returns to 1578.

If the user selects the Save and Transmit function at 1582, process 1500 proceeds to 1586, at which the user may enter his or her initials on the report in the data entry field associated with the personnel signature. In another embodiment, the user may enter the personnel signature via use of a digital pen.

Next, at 1588, the user selects the destination of the report, typically to his or her supervisor or department or squad. Then, at 1590, the report, the report template, and the entered data stored in XAML format is transmitted to the messaging subsystem to be stored in database 210 along with the appropriate relationship data to link the report to the incident and the user who created it, along with all the ancillary data. The messaging subsystem stores data in database 208 in the following database tables: IncidentStatuses table 1952, Incidents table 1948, Reports table 1954, ReportHistory table 1950, ReportStatus table 1956, ReportTypes table 1958, and ReportTransmits table 1966. Additionally, at 1592, the status of the report record in database 208 is set as sent. Once this status is set to sent, the user can no longer make changes to the report. That is, the only action available to the report is the ability of the supervisor, or other person to which the report was transmitted, to view, approve, and/or deny the report.

In Reports table 1954, the creator of the report is stored and the status of the report is managed. Based on this information, system 200 is able to lockout unauthorized users from editing the report which allows the workflow to be controlled. Process 1500 then returns to 1506, at which the user is re-presented with a list of open incidents and events.

Alternately if, at 1578, the user selects the Save function at 1584, process 1500 proceeds to 1590, at which the report data is saved and the status of the report is set to "saved" as discussed above with regards to steps 1590 and 1592. This option is selected when the user wishes to save his or her work but the user is not yet ready to transmit the report to a supervisor or the like (e.g., if additional work is required prior to submission).

Figure 15D:
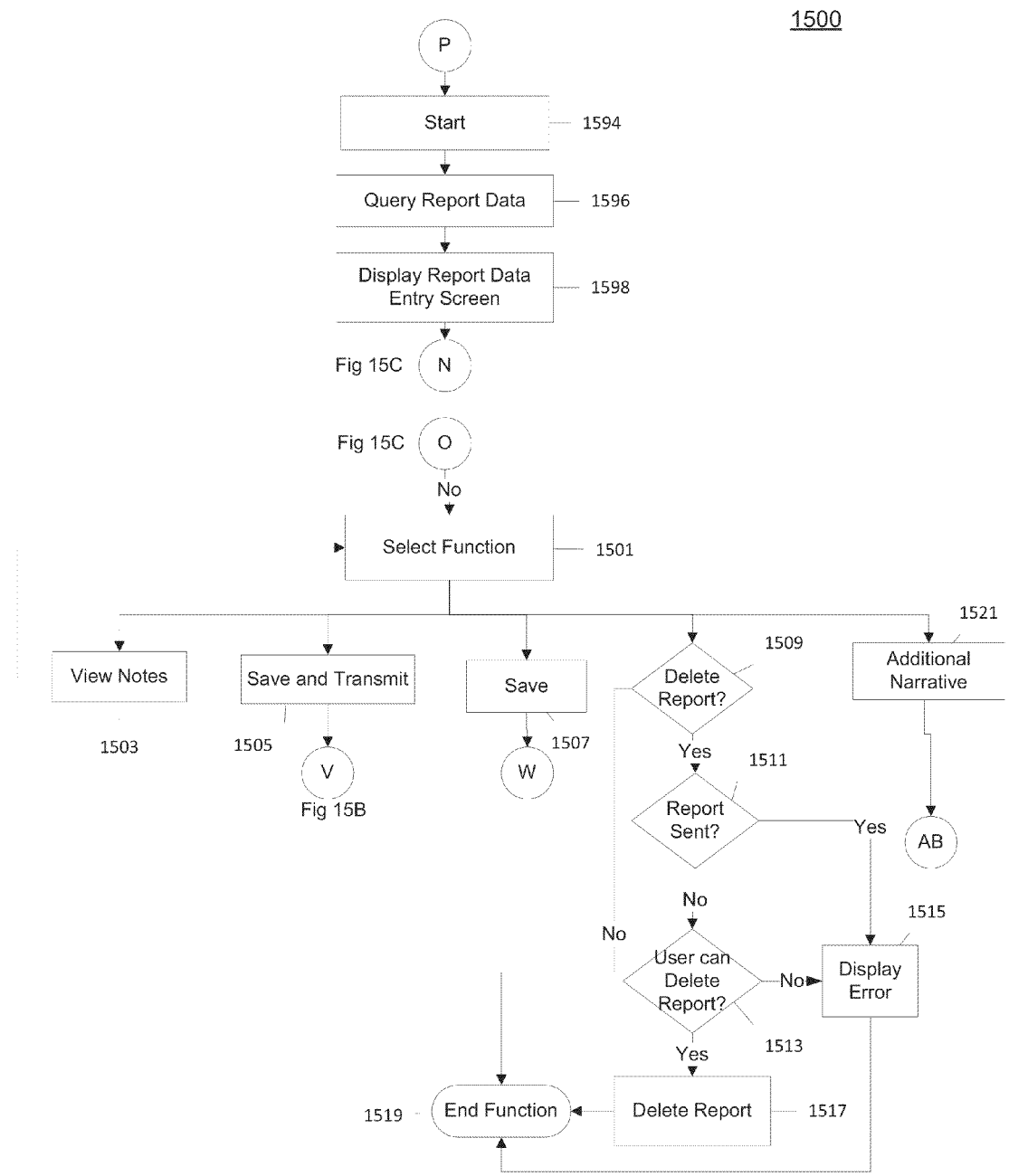

Referring now to FIG. 15D, illustrated is a flowchart of sub-method P, which allows a user to view or edit an already existing report in accordance with the method of the present invention. For example, the view/edit report function may be used by a police officer to edit a police report for future use by law enforcement and/or the parties involved in the incident or event. A report may also require editing, for example, if it was rejected by a supervisor or if it was not transmitted because it was not yet complete. The edit screen may also be used to solely view the report information without editing the report.

Sub-method P begins at 1594 as a continuation of process 1500 as depicted in FIG. 15A, after a user chooses to view or edit an existing report at steps 1516 or 1520. For example, sub-method P may be initiated by selecting the view/edit report option from the personnel activity screen available in the RMS sub-system main menu. These functions may be initiated at 1594, for example, by tapping, clicking, or double-clicking a "View/Edit Report" button or the like via the user's finger or an input device such as input device 314 or 414 as discussed above with respect to FIGS. 2-4.

Once process sub-method P has been initiated, it proceeds to 1596, at which the 15 messaging subsystem executes an SQL query to database 210, specifically, Reports table 1954 (to obtain report information such as IncidentID, TypeID, ReportData, etc.), ReportHistory table 1950 (to obtain historical information of the different status changes of the report), ReportStatus table 1956 (to obtain report status information such as saved, sent, deleted, returned, and approved), ReportTypes table 1958 (to obtain report types such as incident report, crash report, and the like) and ReportTransmits table 1966 (to obtain information about the transmits related to a particular report including the user who initiated it and the user who received the report). As discussed above, the report feature of system 200 is implemented via a Jaspersoft® iReport interface. Next, at 1598, the create report data entry screen discussed above is displayed to the user, and it includes all previously entered data. The information in the template is populated with a portion of the data retrieved in step 1596. That is, the retrieved data populates all the template fields which were previously entered and saved when the report was last updated.

Once the previously entered report data is displayed to the user, the user has the ability to enter/edit the data in the same manner in which data was originally entered. Therefore, process 1500 performs sub-method N as depicted in FIG. 15C. After the user has edited all desired data, sub-method N concludes and process 1500 returns to 1501 as depicted in FIG. 15D.

At 1501, the data fields of the newly created report have been edited and the user is presented with a choice of four additional view/edit report functions, namely, View Notes function 1503, Save and Transmit function 1505, Save function 1507, and Delete Report function 1509.

If the user selects the Notes function 1503, a display of the notes associated with the current report will be toggled from on to off or off to on depending upon the current display status when function 1503 is executed. Process 1500 then returns to 1501.

If the user selects the Save and Transmit function at 1505, process 1500 proceeds to 1586 as depicted in FIG. 15B and follows the steps described above with respect to FIG. 15B. Alternatively, if the user selects the Save function at 1507, process 1500 proceeds to 1590 as depicted in FIG. 15B and follows the steps described above with respect to FIG. 15B. Or, if the user selects the delete function at 1509 by tapping, clicking, or double-clicking a "Delete Report" button or the like available via the data entry screen via the user's finger or an input device such as input device 314 or 414 as discussed above with respect to FIGS. 2-4, process 1500 proceeds to 1511, at which the client application of mobile interface unit 204 queries server 208 and/or database 210 to determine the status of the report. That is, the messaging server queries the database tables Reports table 1954 (to obtain report information such as IncidentID, TypeID, ReportData, and the like), ReportHistory table 1950 (to obtain historical information of the different status changes of the report), ReportStatus table 1956 (to obtain report status information such as saved, sent, deleted, returned, and approved), ReportTypes table 1958 (to obtain report types such as incident report, crash report, and the like) and ReportTransmits table 1966 (to obtain information about the transmits related to a particular report including the user who initiated it and the user who received the report). If the report has a status of "sent", the user is unable to delete it and process 1500 proceeds to 1515, at which the user is displayed a message stating "the report cannot be deleted as it has already been submitted", and process 1500 proceeds to 1519, at which it ends.

Alternatively, if at 1511, the status of the report is saved or rejected, process 1500 proceeds to 1513, at which messaging server queries the database table Reports 1954 to determine whether the user has the right to delete the report. In the depicted embodiment, if the current user is not the user that created the report, then the user cannot delete the report. However, alternate embodiments are envisioned in which the creator and/or his or her manager has the authority to delete the report. If the current user does not have the rights to delete the report, process 1500 proceeds to 1515, at which the user is displayed the message "The report cannot be deleted. Only the owner can delete the report" and process 1500 proceeds to 1519 at which it ends.

Alternatively, if at 1513, the user has the rights to delete the report, process 1500 proceeds to 1517, at which the status of the report is set to "deleted", and additional data regarding the deletion is saved with the status including, but not limited to, date of deletion, time of deletion, and user performing the deletion. That is, the messaging subsystem performs an SQL statement on the database tables Reports table 1954 (to obtain report information such as IncidentID, TypeID, ReportData, and the like), ReportHistory table 1950 (to obtain historical information of the different status changes of the report), ReportStatus table 1956 (to obtain report status information such as saved, sent, deleted, returned, and approved), ReportTypes table 1958 (to obtain report types such as Incident report, crash report, etc.) and ReportTransmits table 1966 (to obtain information about the transmits related to a particular report including the user who initiated it and the user who received it). Process 1500 then ends at 1519. Since process 1500 is invoked by process 100, process 1500 then returns control to process 100 at step 117 at which the user may select a new function from the main menu of the current sub-system.

Referring back to FIG. 1B, it should be noted that the SMS sub-system main menu allows a user to execute RMS or CAD functions. These functions, when executed, simply allow the user to select functions available via the selected sub-system main menu as if those sub-systems were accessed directly from step 117 as depicted and listed in FIG. 1B.

Figure 16:
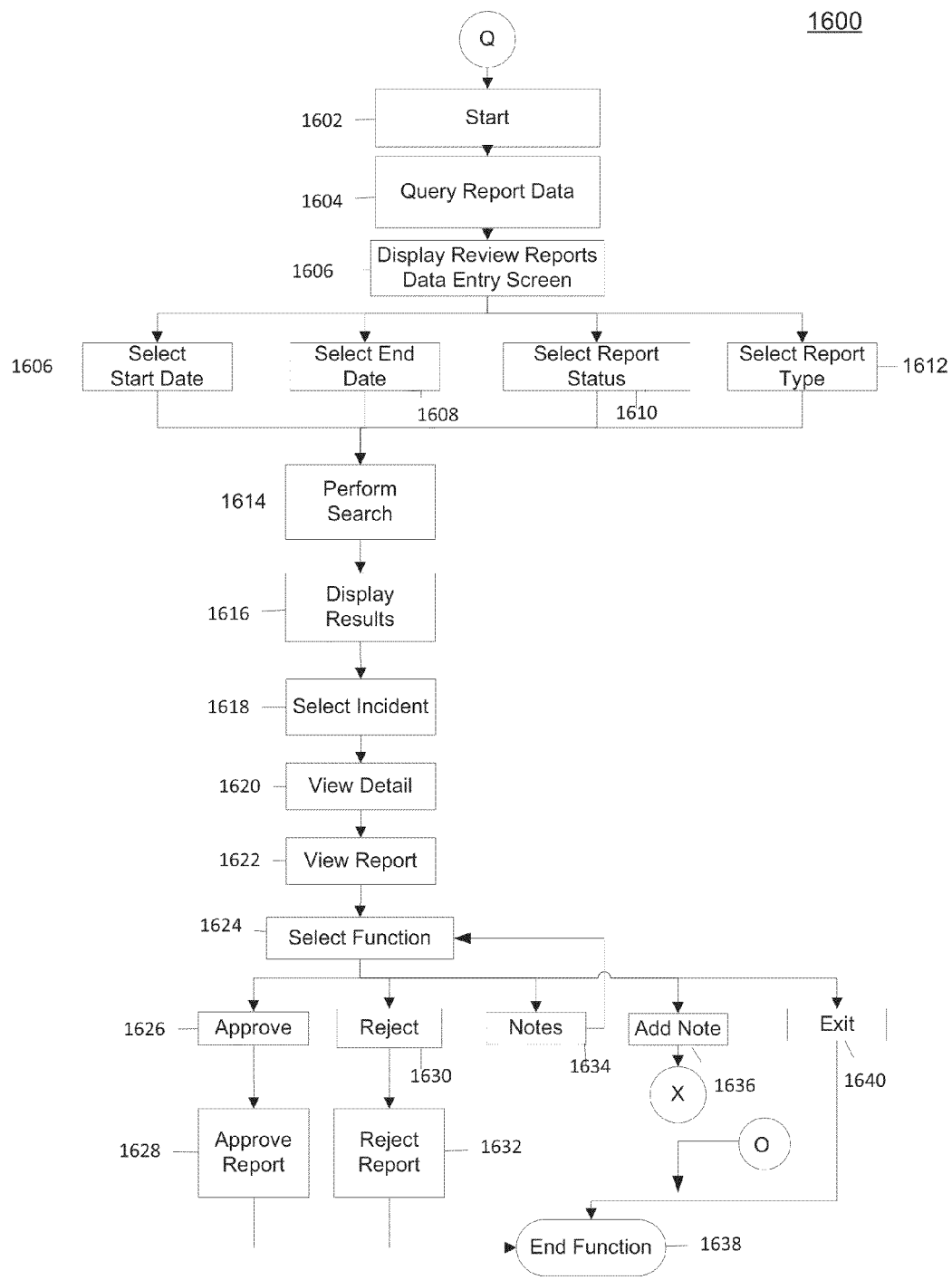
FIG. 16 depicts a flowchart of one method of allowing a user to review reports in accordance with the method of the present invention illustrated in FIG. 1.

Now referring to FIG. 16, illustrated is a flowchart of one method of allowing an administrative user to review reports in accordance with the method of the present invention illustrated in FIG. 1. Process 1600 begins at 1602, typically after being launched from a master process such as process 100 as described above with respect to FIG. 1. For example, process 1600 may be initiated by selecting Review Reports function 122c (FIG. 1) from the SMS sub-system main menu. Once process 1600 has been initiated, it proceeds to 1604.

At 1604, the client application executes a data query to server 208 and database 210, namely, ReportStatus table 1956 (to obtain report status information such as saved, sent, deleted, returned, and approved), ReportTypes table 1958 (to obtain report types such as incident report, crash report, and the like). Once this data is retrieved, the search criteria data entry screen is displayed to the user at 1606. This data entry screen includes data fields for entry of information related to the incidents or events for which the report is being sought for review (i.e., the incident or event related to the report the user wishes to locate) including, but not limited to, start date and time, end data and time, report status, and report type.

At 1606 and 1608, the user selects the start and end dates and times, respectively, for the search query. That is, the query will only search incidents or events that occurred after the start date and time and prior to the end date and time as inputted by the user. At 1610 and 1612, the user selects the report status and report type, respectively, to be used for the search query. In the depicted embodiment, this status may be selected from a pull-down menu populated by the data retrieved in step 1604. However, any of the data fields discussed herein may be populated in other manners including, but not limited to, entry of a predetermined code, manual data entry, date selection from a calendar, and the like.

Once the user has populated the desired data fields, process 1600 proceeds to 1614, at which the client application transmits the data entered to server 208 and database 210. This step may be performed when the user clicks or touches an enter, submit, search, or similar icon. Or, submission of the data may cause the data to be automatically sent to server 208 and database 210. This causes the messaging subsystem to run a query of database 210, specifically, IncidentStatuses table 1952 (to obtain incident status such as active or inactive), Incidents table 1948 (to obtain IR number and location), IncidentNotes table 1946 (to obtain incident notes), IncidentPersonnel table 1934 (to obtain personnel associated with the incident), Personnel table 1928 (to obtain information related to the personnel such as department, personnel category, badge number, first and last name, whether employment of personnel is active, or the like), IncidentPersonnelStatuses table 1938 (to obtain personnel ID and personnel status related to the incident such as dispatched, enroute, arrived, and cleared), IncidentTypes table 1960 (to obtain incident types such as riot, robbery, and the like), Reports table 1954 (to obtain report information such as IncidentID, TypeID, ReportData, and the like), ReportHistory table 1950 (to obtain historical information of the different status changes of a report), ReportStatus table 1956 (to obtain report status information such as saved, sent, deleted, returned, and approved), ReportTypes table 1958 (to obtain report types such as incident report, crash report, etc.) and ReportTransmits table 1966 (to obtain information about the transmits related to a particular report including the user who initiated it and the user who received it).

Process 1600 then proceeds to step 1616, at which a list of all retrieved incidents or events is displayed to the user. Next, at 1618, the user selects a particular incident or event from the list and the report associated with the selected incident or event is displayed to the user. In the depicted embodiment, the report is displayed in a read-only format since the ability to edit or revise the report is limited to the personnel who originally created the report. However, alternate embodiments of the present invention are envisioned in which a user may read and edit the report at step 1618.

Next at 1620, the user double taps or double clicks on the selected incident or event to expand the amount of information displayed for the incident or event. For efficiency, this data was retrieved from database 210 at step 1604. Then, at 1622, the user can select to view the report associated with the selected incident or event.

At 1624, a report has been selected and the user is presented with a choice of five additional report functions, namely, Approve function 1626, Reject function 1630, Notes function 1634, Add Note function 1636, and Exit function 1640.

If the user selects the Approve function 1626, process 1600 proceeds to 1628. At 1628, the messaging subsystem updates the report status in the Reports table 1954 to "Approved". Once a report is approved, changes cannot be made to that report. Process 1600 then proceeds to 1638, at which it ends. Since process 1600 is invoked by the SMS main menu of process 100, process 1600 then returns control to process 100 at step 117 at which the user may select a new function from the main menu of the current sub-system (i.e., the SMS sub-system).

Alternatively, at 1624, the user can initiate the Reject function at 1630. Process 1600 then proceeds to 1632, at which the messaging subsystem sets the status of the report to "Rejected" in the Reports table 1954. Once this status has been changed, the creator of the report can only view the rejected report via the view Open/Returned reports function. Process 1600 then ends at 1638.

Alternatively, the user selects the Notes function at 1634. If the user selects the Notes function 1634, a display of the notes associated with the current report will be toggled from on to off or off to on depending upon the current display status when function 1634 is executed. Process 1600 then returns to 1624.

Or, if the user selects the Add Note function at 1624, process 1600 proceeds to 1636. Step 1636 initiates sub-method X, which includes steps 1566 through 1576 as described above with regards to FIG. 15C. When sub-method X is complete, process 1600 then ends at 1638.

Alternatively, if a user chooses to exit the Review Reports function 122c at 1640, process 1600 proceeds to 1638 at which it ends as discussed above.

Figure 17:
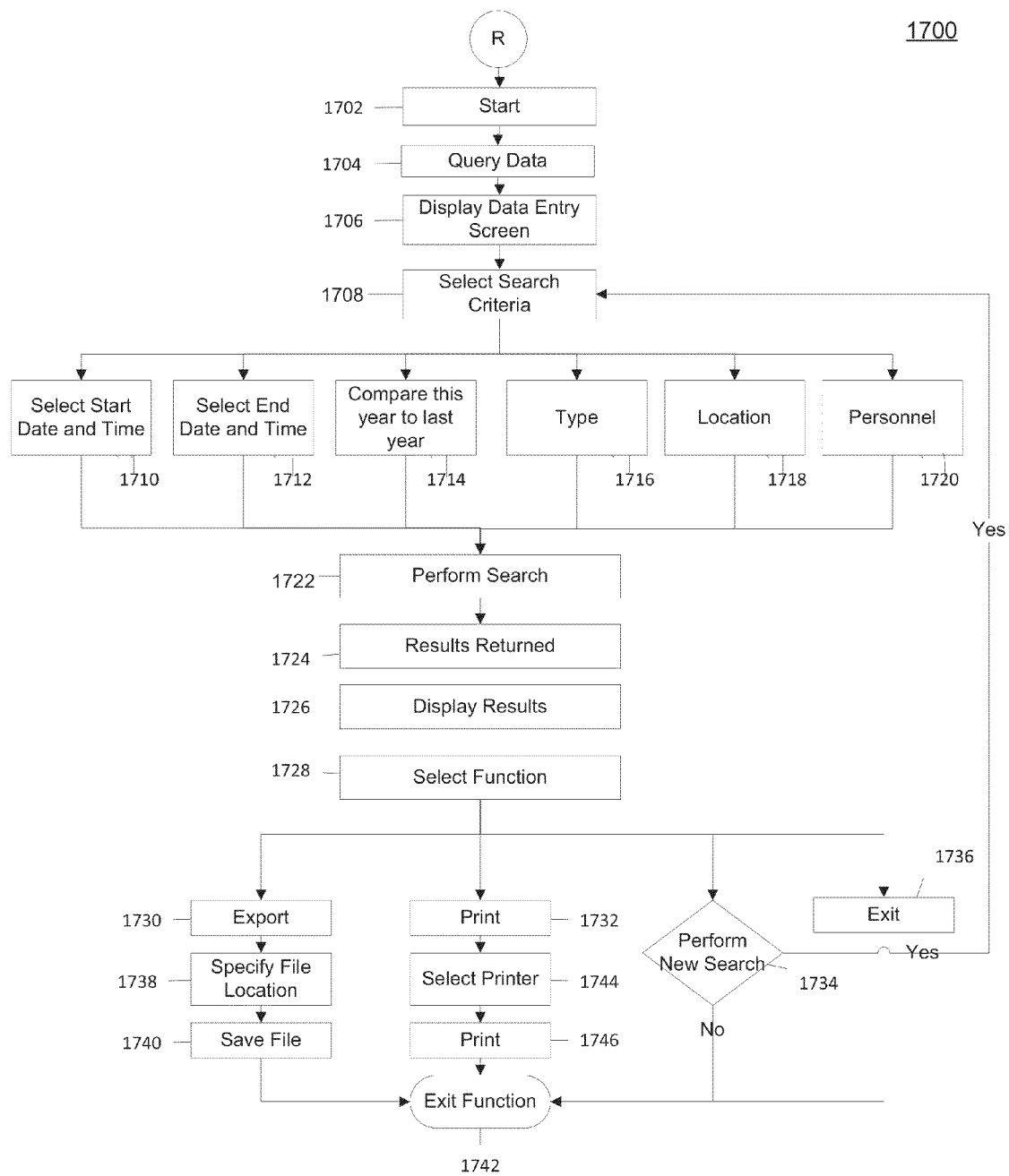
FIG. 17 depicts a flowchart of one method of allowing a user to create statistical data based upon past incident or event data in accordance with the method of the present invention illustrated in FIG. 1.

Now referring to FIG. 17, illustrated is a flowchart of one method of allowing a user to review and/or create charts of statistical data related to past incidents and/or events in accordance with the method of the present invention illustrated in FIG. 1. Process 1700 begins at 1702, typically after being launched from a master process such as process 100 as described above with respect to FIG. 1. For example, process 1700 may be initiated by selecting the Charts & Stats function 122d (FIG. 1) from the SMS subsystem main menu. Once process 1700 has been initiated, it proceeds to 1704. At 1704, the client application executes a data query to server 208 and database 210, specifically, Personnel table 1928 (to obtain information related to the personnel such as department, personnel category, badge number, first and last name, whether employment of personnel is active, or the like), Streets 1902 (to obtain a list of locations), and IncidentTypes table 1960 (to obtain incident types such as riot, robbery, and the like).

Once this data is retrieved, process 1700 proceeds to 1706, at which the search criteria data entry screen is displayed to the user. This data entry screen includes data fields for entry of information related to the incidents and/or events for which statistical data is being sought for review (i.e., the incidents and/or events related to the statistical data the user wishes to review) including, but not limited to, start date and time, end data and time, comparison of current year data to prior year's data, incident or event type, and location and personnel associated with the incident or event. The data fields may, for example, require manual entry by the user or may include pre-populated pull down menus from which a user may select the desired data.

At 1710 and 1712, the user selects the start and end dates and times, respectively, for the search query. That is, the query will only search incidents or events that occurred after the start date and time and prior to the end date and time as inputted by the user. If the user elects yes at step 1714, process 1700 ignores the start and end dates and times and searches all data for the current year and one prior year. At 1716, 1718, and 1720, the user selects the incident or event type, location, and personnel, respectively, to be used for the search query. In the depicted embodiment, this information may be selected from a pull-down menu populated by the data retrieved in step 1704. However, any of the data fields discussed herein may be populated in other manners including, but not limited to, entry of a predetermined code, manual data entry, date selection from a calendar, and the like.

Once the user has populated the desired data fields, process 1700 proceeds to 1722, at which the client application transmits the data entered to server 208 and database 210. This step may be performed when the user clicks or touches an enter, submit, search, or similar icon. Or, submission of the data may cause the data to be automatically sent to server 208 and database 210. This causes the messaging subsystem to run a query of database 210, specifically, IncidentStatuses table 1952 (to obtain incident or event status such as active or inactive), Incidents table 1948 (to obtain incident or event IR number and location), IncidentPersonnel table 1934 (to obtain personnel associated with the incident or event), Personnel table 1928 (to obtain information related to the personnel such as department, personnel category, badge number, first and last name, whether employment of personnel is active, or the like), IncidentTypes table 1960 (to obtain incident types such as riot, robbery, and the like), and Streets 1902 (to obtain streets associated with the incidents or events).

Process 1700 then proceeds to step 1724, at which all incidents and/or events are retrieved. Next, at 1726, the retrieved incidents and/or events are displayed to the user. The results are displayed via a generic grid control in .NET.

At 1728, the results have been displayed and the user is presented with a choice of four additional functions, namely, Export function 1730, Print function 1732, New Search function 1734, and Exit function 1736.

If the user wishes to export the results to another format, the user selects the Export function 1730. In the depicted embodiment, the results are exported to Excel, however, virtually any other compatible format may be substituted including, without limitation, Adobe® Acrobat®, Microsoft® Word®, and Powerpoint®. Next, process 1700 proceeds to 1738, at which the user selects a location to save the exported file via a standard Microsoft® Windows® folder location selector box.

Next, at 1740, the file is saved to the selected location via the client application. The client application exports the grid results to a Microsoft® Excel® XML format which enables the user to open the saved file in Microsoft® Excel®.

Process 1700 then proceeds to 1742, at which it ends. Since process 1700 is invoked by the SMS sub-system main menu of process 100, process 1700 then returns control to process 100 at step 117 at which the user may select a new function from the main menu of the current sub-system (i.e., the SMS sub-system).

Alternately, if at 1728, the user chooses to print the results, process 1700 proceeds to 1732, at which the user may print the results via a standard Microsoft® Windows® print dialog box in which the user can specify the desired printer at 1744. Then, at 1746, the client application prints the contents of the grid results. Process 1700 then ends at 1742.

Alternatively, at 1728, the client may choose to run a new search at 1734. If so, process 1700 then returns to 1708. Alternatively, if a user wishes to exit charts and statistics function 122d, the user selects exit function 1736, at which process 1700 proceeds to 1742, at which process 1700 ends as discussed above.

Figure 18A:
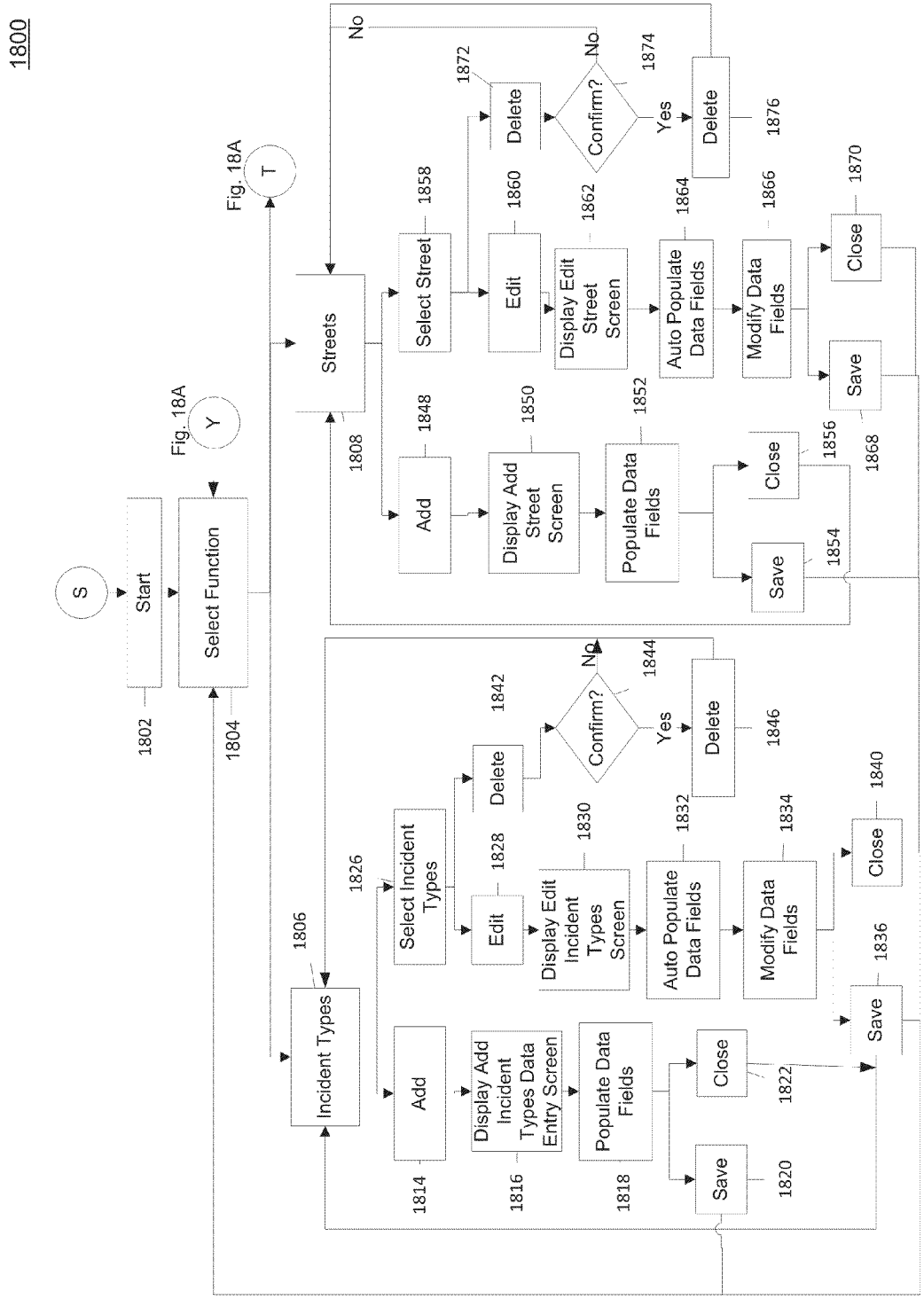
FIGS. 18A-18C depict a flowchart of one method of allowing a user to perform management functions in accordance with the method of the present invention illustrated in FIG. 1.
Figure 18B:
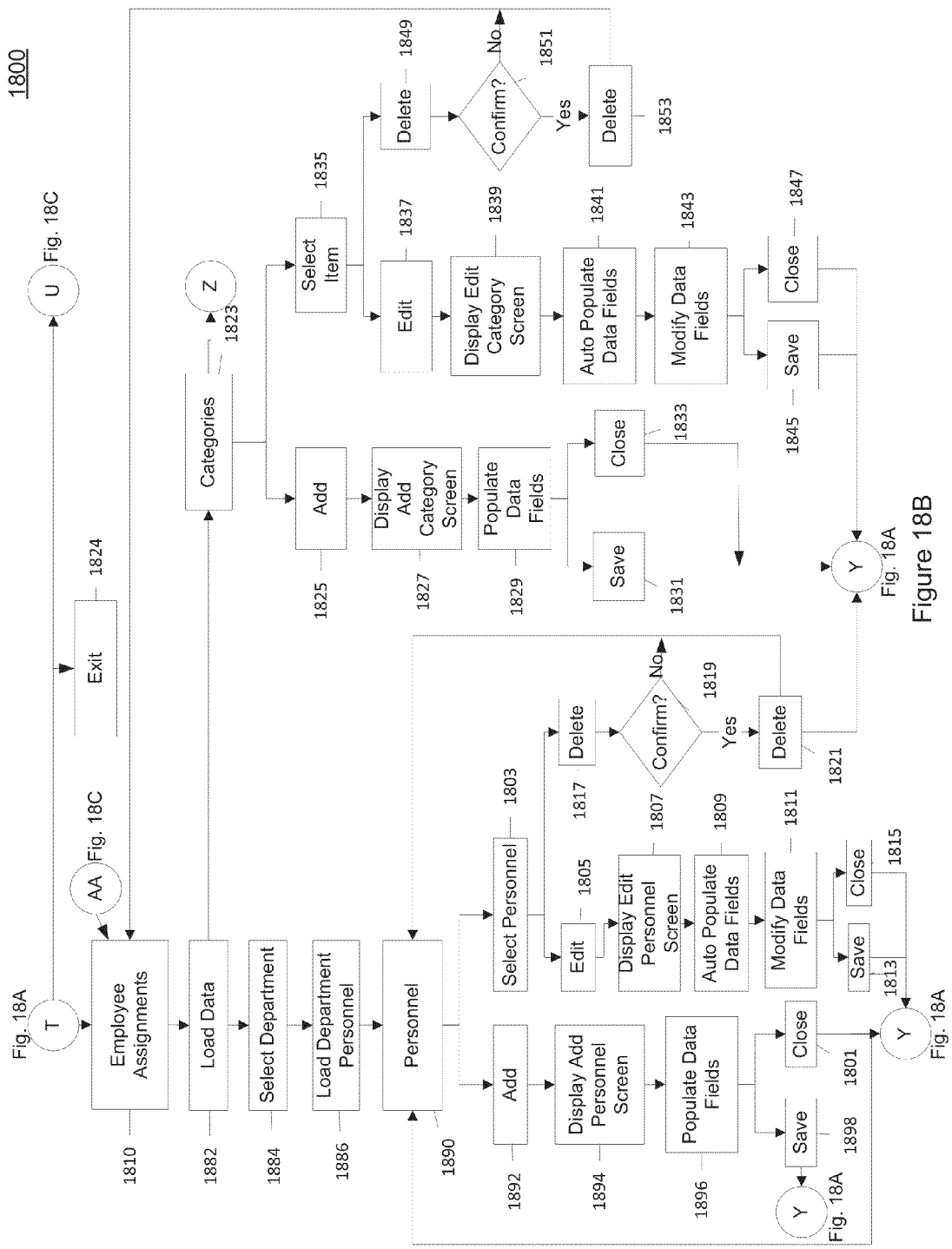
Figure 18C:
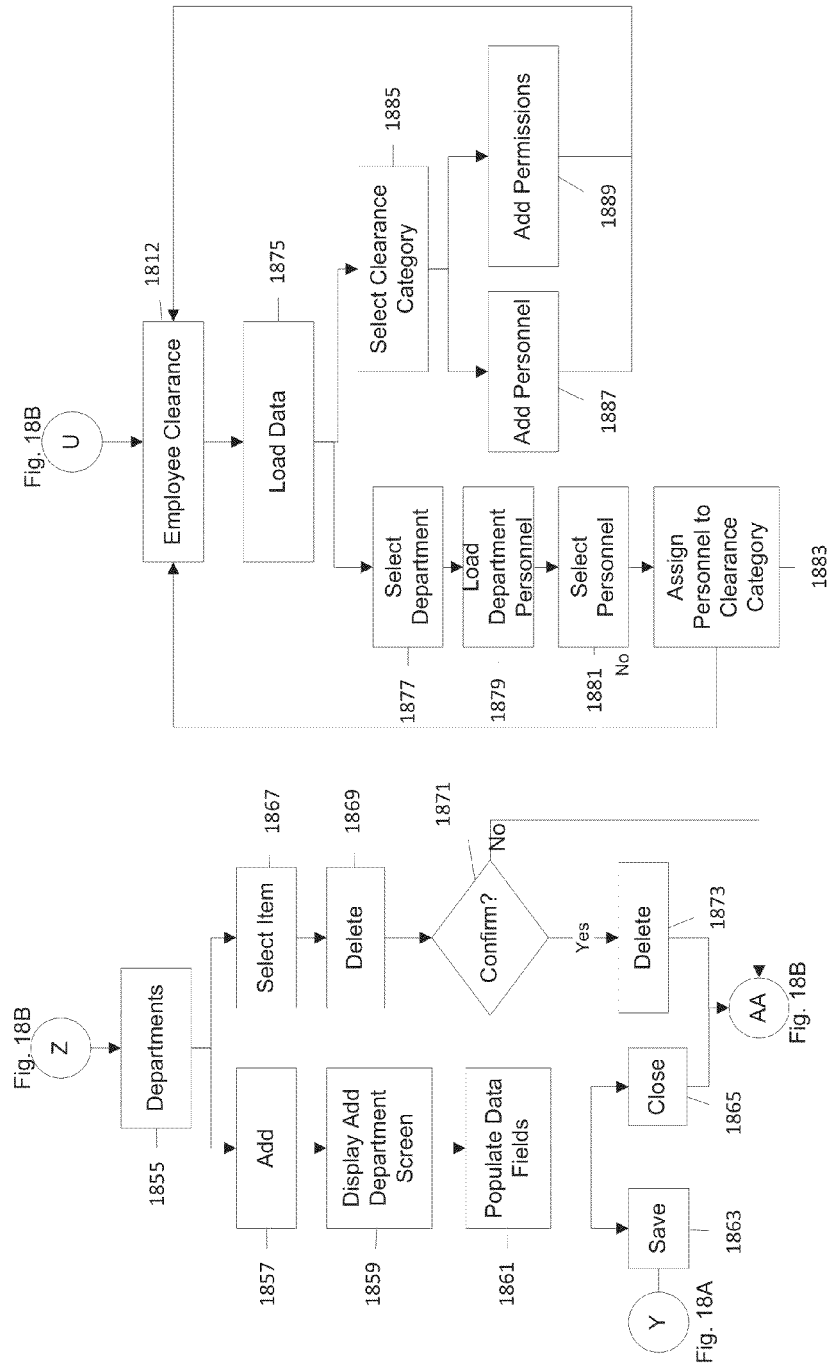
Figure 19A:
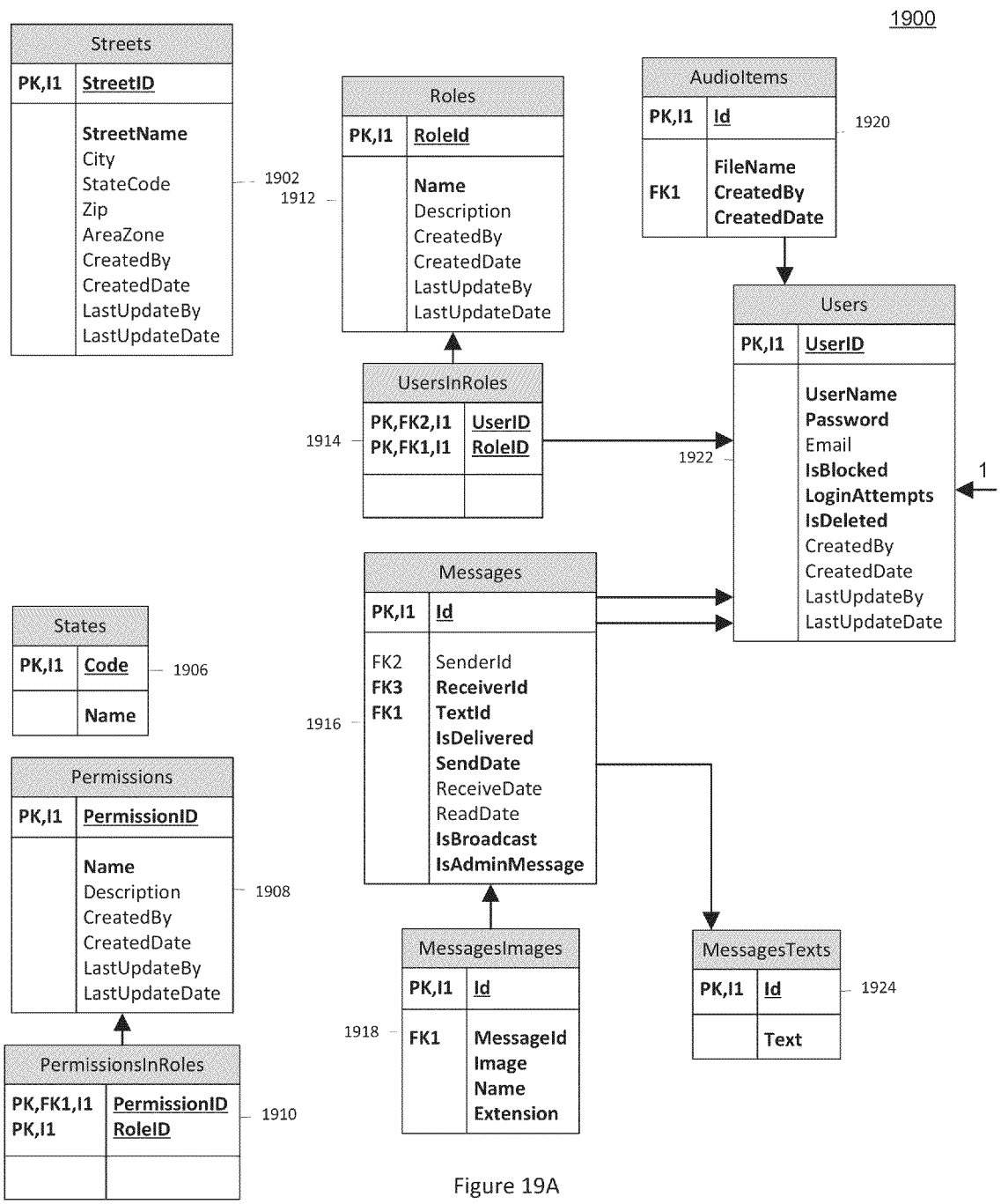
FIGS. 19A-19E depict a portion of the most relevant database tables utilized by the methods of FIGS. 1 and 5-18C.
Figure 19B:
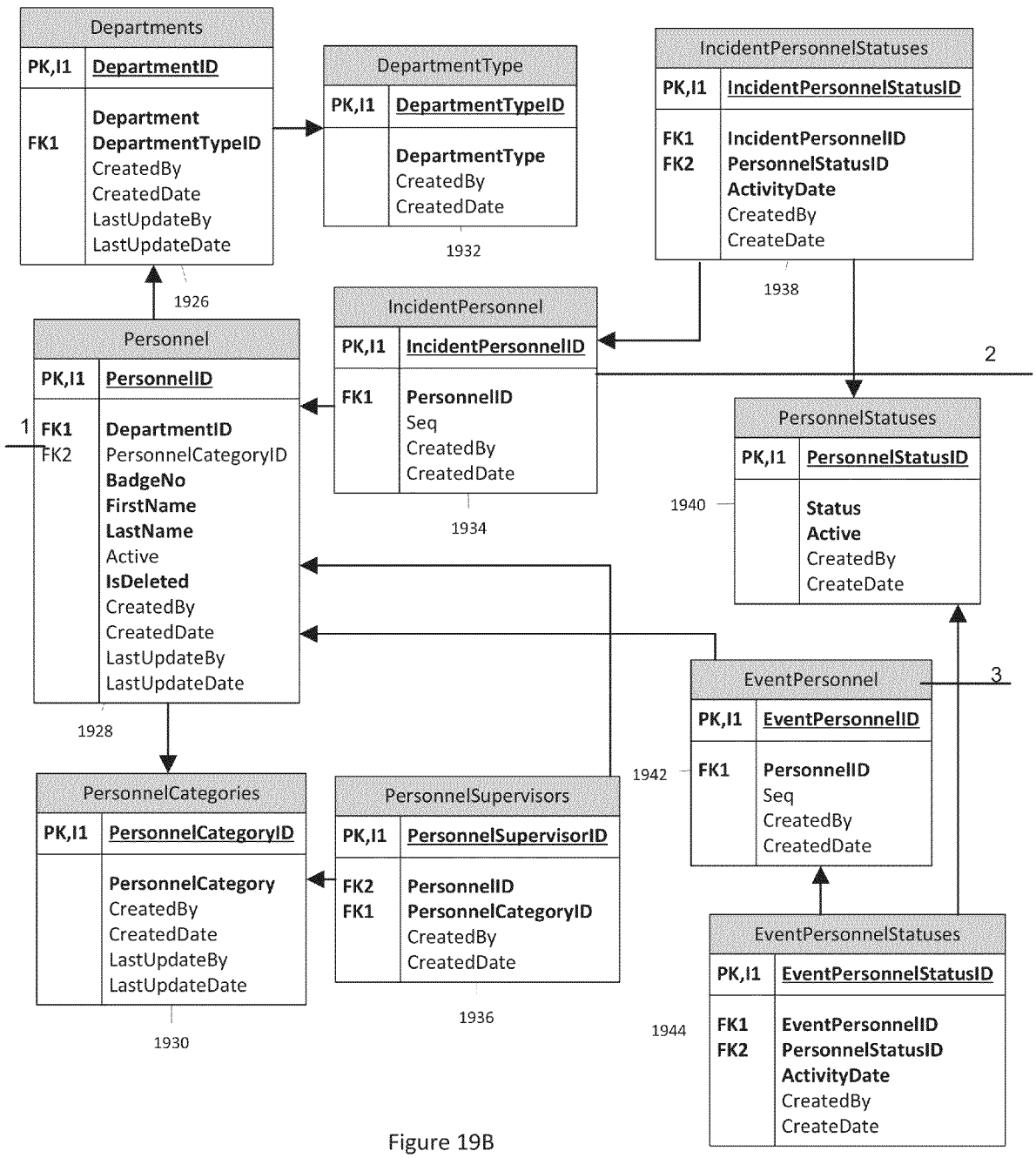
Figure 19C:
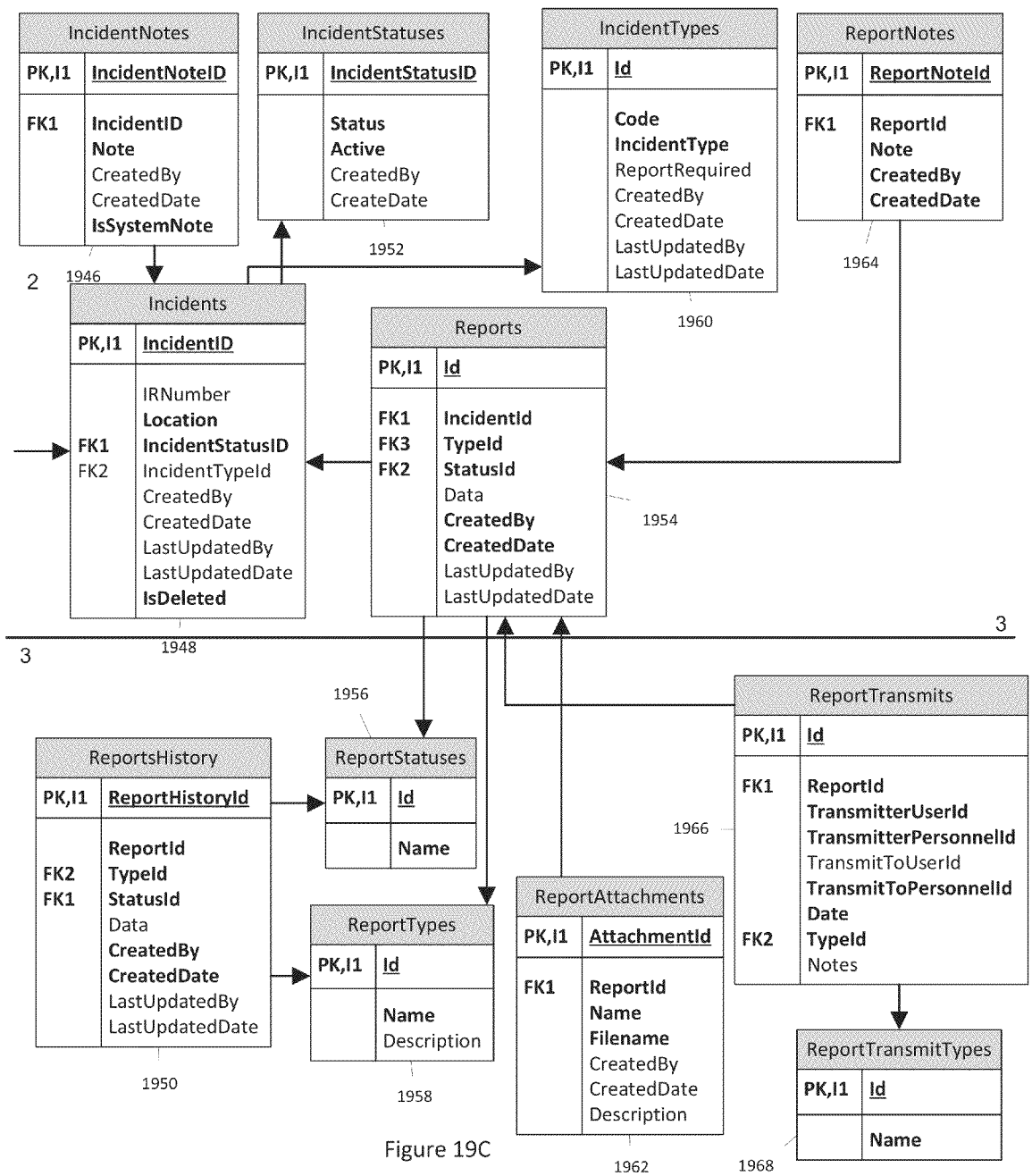
Figure 19D:
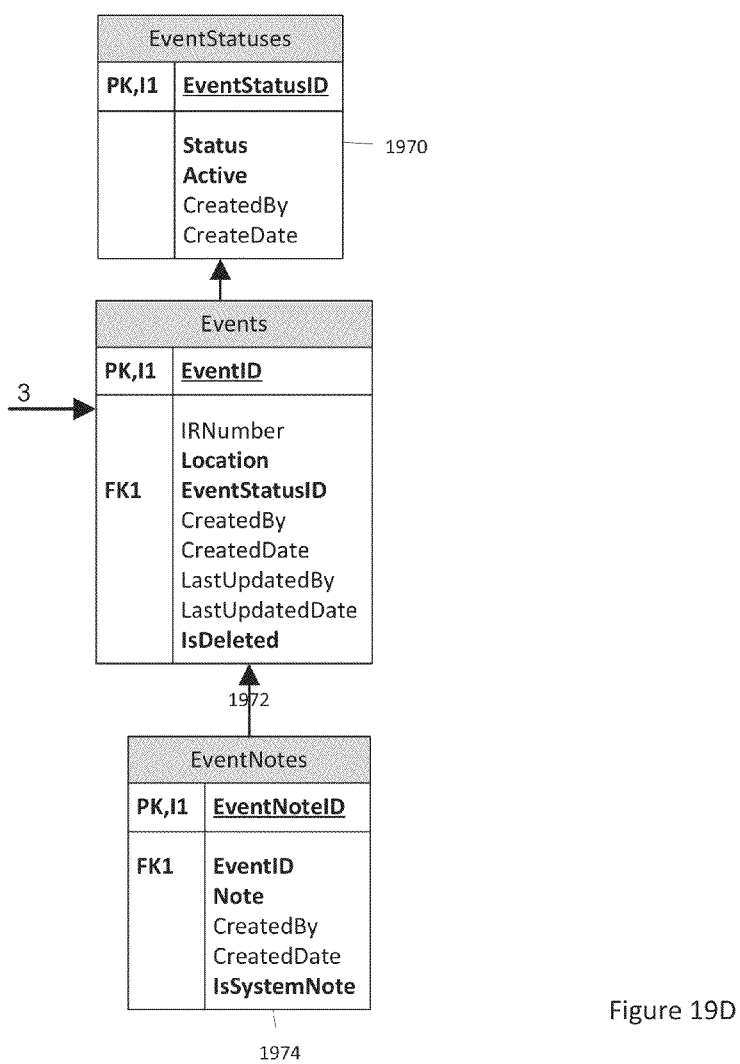
Figure 19E:
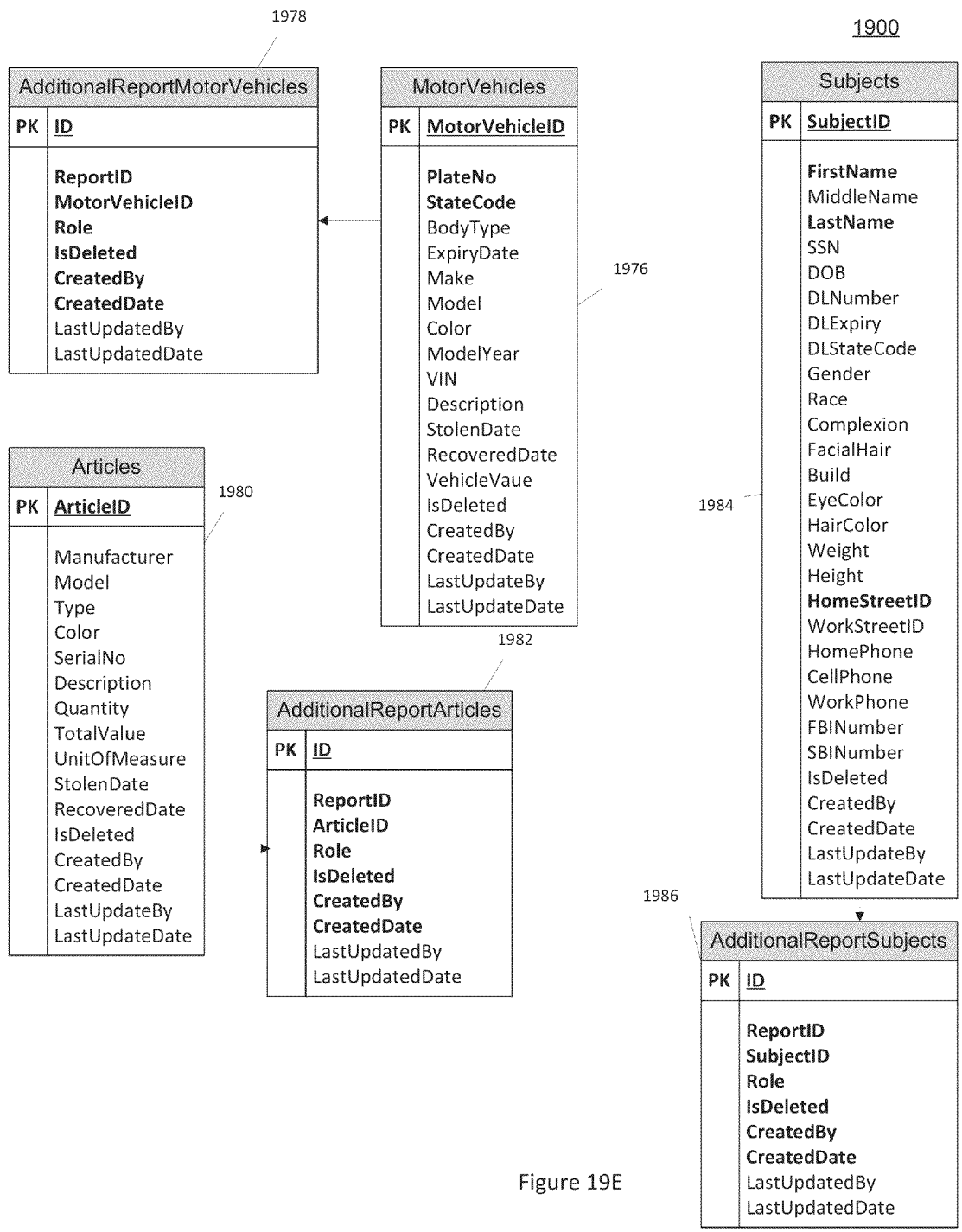

Turning next to FIGS. 18A-18C, depicted is a flowchart of one method of allowing a user to perform management and assignment functions in accordance with the method of the present invention illustrated in FIG. 1. Process 1800 begins at 1802, typically after being launched from a master process such as process 100 as described above with respect to FIG. 1. For example, process 1800 may be initiated by selecting Management and Assignments function 122e (FIG. 1) from the SMS sub-system main menu. Once process 1800 has been initiated, it proceeds to 1804. The management and assignments function allows an administrator user to manage system 200 via controlling the basic aspects of the system including, without limitation, managing streets, incident types, personnel, departments, personnel categories, personnel assignments, roles, and permissions as described in greater detail below.

At 1804, management and assignments function main screen is displayed and the user is presented with a choice of five functions, namely, Incident Types function 1806, Streets function 1808, Employee Assignments function 1810, Employee Clearance function 1812, and Exit function 1824.

In other embodiments of the present invention, greater or fewer functions may be substituted.

If the user wishes to manage incident types, the user selects the Incident Types function 1806. In the depicted embodiment, this action displays the manage incident types main screen and loads all of the existing incident types from IncidentTypes table 1960 (to obtain incident types such as riot, robbery, or the like).

At 1806, the user can elect to add an incident type at 1814 or select an incident type from a list of incident types at 1826.

If the user selects the former, process 1800 proceeds to 1814. At 1814, the user can select "Add" to add a new incident type. Process 1800 then proceeds to 1816, at which an add incident type data entry screen is displayed to the user. Then, at 1818, the user populates the data fields, and process 1800 proceeds to 1820, at which the information is transmitted via the messaging subsystem to database 210 and it is stored in IncidentsType table 1960. Process 1800 then returns to 1804, at which the user may select a new function.

Alternatively, at 1818, the user can select close function at 1822 in which case the entered data will not be saved and process 1800 returns to 1806. Alternatively, if at 1806, the user selects an incident type from the list of displayed incident types at 1826, the user is presented with the option to edit or delete the incident type.

If the user selects the edit option at 1828, the user is presented with the edit incident type screen at 1830. At 1832, the edit incident type screen is auto-populated with all of the current information for the selected incident type. This data is retrieved from database 210 in step 1806.

At 1834, the user may modify the data fields for the current incident type. Process 1800 then proceeds to 1836, at which the user can save the changes. The changes are transmitted by the messaging subsystem which updates the incident type information using an SQL statement for IncidentsType table 1960 (information such as code, incident type, and report required). Process 1800 then returns to 1804, at which the user may select a new function.

Alternatively, at 1834, the user can select the close function at 1840 in which case the entered data will not be saved and process 1800 returns to 1804.

Alternatively, at 1826, the user can choose to delete the selected incident type at 1842. Process 1800 then proceeds to 1844, at which the user is asked for confirmation of the intent to delete the current incident type. If the user chooses yes, process 1800 proceeds to 1846, at which the selected incident type is deleted. Process 1800 then returns to 1806.

If, at 1844, the user does not confirm the deletion, process 1800 also returns to 1806.

Alternately, at 1804, the user can select the Streets function at 1808. This action displays the manage streets main screen and loads all of the existing streets from Streets table 1902 (to obtain a list of all locations). At 1808, the user can elect to add a street at 1848 or select a street from a list of streets at 1858.

If the user selects the former, process 1800 proceeds to 1848, at which the user can select "Add" to add a new street. Process 1800 then proceeds to 1850, at which an add street data entry screen is displayed to the user. Then, at 1852, the user populates the data fields and process 1800 proceeds to 1854, at which the information is transmitted via the messaging subsystem to database 210 and it is stored in Streets table 1902. Process 1800 then returns to 1804, at which the user may select a new function.

Alternatively, at 1852, the user can select the close function at 1856 in which case the entered data will not be saved and process 1800 returns to 1808. Alternatively, if at 1808, the user selects a street from the list of displayed streets at 1858, the user is presented with the option to edit or delete the selected street.

If the user selects the edit option at 1860, the user is presented with the edit street screen at 1862. At 1864, the edit street screen is auto-populated with all of the current information for the selected street. This data is retrieved from database 210 in step 1808.

At 1866, the user may modify the data fields for the current street. Process 1800 then proceeds to 1868, at which the user can save the changes. The changes are transmitted by the messaging subsystem which updates the street information using an SQL statement for Streets table 1902. Process 1800 then returns to 1804, at which the user may select a new function.

Alternatively, at 1866, the user can select the close function at 1870 in which case the entered data will not be saved and process 1800 returns to 1804.

Alternatively, at 1858, the user can choose to delete the selected street at 1872. Process 1800 then proceeds to 1874, at which the user is asked for confirmation of the intent to delete the current street. If the user chooses yes, process 1800 proceeds to 1876, at which the selected street is deleted. Process 1800 then returns to 1808. If, at 1874, the user does not confirm the deletion, process 1800 also returns to 1808.

Alternately, at 1804, the user can select the Employee Assignments function at 1810. This action displays the employee assignments main screen. At 1882, the client application loads all of the existing personnel departments, personnel, and personnel categories (e.g., squad 1, squad 2, sector 1, and the like) from Departments table 1926, PersonnelCategories table 1930, and Personnel table 1928. Then, the user has the option of choosing to work with personnel, personnel categories, or personnel departments. Next, if the user chooses to work with personnel, at 1884, the user can select a particular department. Once this is done, process 1800 proceeds to 1886, at which a list of the personnel related to the selected department are returned by the messaging subsystem after it queries the data from the Personnel table 1928 and Departments table 1926.

Next, at 1890, the user can elect to add personnel at 1892 or to select personnel from a list of personnel at 1803.

If the user selects the former, process 1800 proceeds to 1892, at which the user can select "Add" to add new personnel. Process 1800 then proceeds to 1894, at which an add personnel data entry screen is displayed to the user. Then, at 1896, the user populates the data fields with information including, but not limited to, first name, last name, and the like, and process 1800 proceeds to 1898, at which the information is transmitted via the messaging subsystem to database 210 and it is stored in Personnel table 1928. Process 1800 then returns to 1804, at which the user may select a new function.

Alternatively, at 1896, the user can select the close function at 1801 in which case the entered data will not be saved and process 1800 returns to 1890. Alternatively, if at 1890, the user selects a person from the list of displayed personnel at 1803, the user is presented with the option to edit or delete the selected personnel.

If the user selects the edit option at 1805, the user is presented with the edit personnel screen at 1807. At 1809, the edit personnel screen is auto-populated with all of the current information for the selected personnel. This data is retrieved from database 210 in step 1810.

At 1811, the user may modify the data fields for the current personnel. Process 1800 then proceeds to 1813, at which the user can save the changes. The changes are transmitted by the messaging subsystem which updates the personnel information using an SQL statement for Personnel table 1928. Process 1800 then returns to 1804, at which the user may select a new function.

Alternatively, at 1811, the user can select the close function at 1815 in which case the entered data will not be saved and process 1800 returns to 1804.

Alternatively, at 1803, the user can choose to delete the selected personnel at 1817. Process 1800 then proceeds to 1819, at which the user is asked for confirmation of the intent to delete the current personnel. If the user chooses yes, process 1800 proceeds to 1821, at which the selected personnel is deleted. Process 1800 then returns to 1804.

If, at 1819, the user does not confirm the deletion, process 1800 returns to 1890.

Alternately, if at 1882, the user chooses to work with personnel categories rather than personnel or personnel departments, process 1800 proceeds to 1823, at which categories can be modified and added. The list of categories are loaded from the PersonnelCategories table 1930 at 1882.

At 1823, the user can elect to add a category at 1825 or select a category from a list of categories at 1835. If the user selects the former, process 1800 proceeds to 1825, at which the user can select "Add" to add a new category. Process 1800 then proceeds to 1827, at which an add category data entry screen is displayed to the user. Then, at 1829, the user populates the data fields and process 1800 proceeds to 1831, at which the information is transmitted via the messaging subsystem to database 210 and it is stored in PersonnelCategories table 1930. Process 1800 then returns to 1804, at which the user may select a new function.

Alternatively, at 1829, the user can select the close function at 1833 in which case the entered data will not be saved and process 1800 returns to 1804. Alternatively, if at 1823, the user selects a category from the list of displayed categories at 1835, the user is presented with the option to edit or delete the selected category.

If the user selects the edit option at 1837, the user is presented with the edit category screen at 1839. At 1841, the edit category screen is auto-populated with all of the current information for the selected category. This data is retrieved from database 210 in step 1810.

At 1843, the user may modify the data fields for the current category. Process 1800 then proceeds to 1845, at which the user can save the changes. The changes are transmitted by the messaging subsystem which updates the category information using an SQL statement for PersonnelCategories table 1930. Process 1800 then returns to 1804, at which the user may select a new function.

Alternatively, at 1843, the user can select the close function at 1847 in which case the entered data will not be saved and process 1800 returns to 1804.

Alternatively, at 1835, the user can choose to delete the selected category at 1849. Process 1800 then proceeds to 1851, at which the user is asked for confirmation of the intent to delete the current category. If the user chooses yes, process 1800 proceeds to 1853, at which the selected category is deleted. Process 1800 then returns to 1810.

If, at 1851, the user does not confirm the deletion, process 1800 also returns to 1810.

Alternately, if at 1882, the user chooses to work with personnel departments rather than personnel or personnel categories, process 1800 proceeds to 1855 (FIG. 18C), at which departments can be modified and added. The list of departments are loaded from the Departments table 1926 at 1882.

At 1855, the user can elect to add a department at 1857 or select a department from a list of department at 1867. If the user selects the former, process 1800 proceeds to 1857, at which the user can select "Add" to add a new department. Process 1800 then proceeds to 1859, at which an add department data entry screen is displayed to the user. Then, at 1861, the user populates the data fields and process 1800 proceeds to 1863, at which the information is transmitted via the messaging subsystem to database 210 and it is stored in Department table 1926. Process 1800 then returns to 1804, at which the user may select a new function.

Alternatively, at 1861, the user can select the close function at 1865 in which case the entered data will not be saved and process 1800 returns to 1810. Alternatively, if at 1855, the user selects a department from the list of displayed departments at 1867, the user is presented with the option to delete the selected category at 1869. Process 1800 then proceeds to 1871, at which the user is asked for confirmation of the intent to delete the current department. If the user chooses yes, process 1800 proceeds to 1873, at which the selected department is deleted. Process 1800 then returns to 1810. If, at 1871, the user does not confirm the deletion, process 1800 also returns to 1810.

Alternately, at 1804, the user can select the Employee Clearance function at 1812. This action displays the employee clearance main screen. At 1875, the client application loads the data from Departments table 1926 (to obtain a list of all departments), Personnel table 1928 (to obtain information related to the personnel such as department, personnel category, badge number, first and last name, whether employment of personnel is active, and the like), Personnel Category table 1930 (to obtain information about the categories to which the personnel belong), Roles table 1912 (to obtain role id and role name), UserInRoles table 1914 (to obtain information about which users belong to which roles), Users table 1922 (to obtain information such as userid, name, and email), PermissionsInRoles 1910 (to obtain information about which permissions belong to which roles), and Permissions table 1908 (to obtain information about permission ID and name).

Then, the user has the option of choosing to work with personnel or clearance categories. Next, if the user chooses to work with personnel, at 1877, the user can select a particular department. Once this is done, process 1800 proceeds to 1879, at which a list of the personnel related to the selected department are returned by the messaging subsystem after it queries the data from the Personnel table 1928 and Departments table 1926.

Next, at 1881, the user can select particular personnel and process 1800 proceeds to 1883, at which the user can assign the personnel to a clearance category by clicking and dragging the name of the personnel into the desired clearance category. In another embodiment of the present invention, the user can click the name of the personnel and then click the desired clearance category. This information is sent to the messaging subsystem which stores the information in the Personnel table 1928 and the Personnel Categories table 1930. Process 1800 then returns to 1812.

Alternately, the user can choose to work with clearance categories at 1875, and process 1800 proceeds to 1885 at which the user selects a clearance category. Next, the user can choose to add personnel to a clearance category or to add additional permissions to the selected clearance category. If the user elects to add personnel to the selected clearance category, process 1800 proceeds to 1887, at which the user can check all personnel that the user wishes to add to the selected clearance category from a list of eligible personnel. Process 1800 then returns to 1812.

Alternatively, if at 1885, the user elects to add permissions for the selected clearance category, process 1800 proceeds to

1889, at which the user selects the permissions to add to the selected clearance category from a list of eligible permissions. This information is sent to server 208 and is stored in PersonnelCategory table 1930, Permissions table 1908, Roles table 1912, and PermissionsInRoles table 1910. Process 1800 then returns to 1812.

Alternatively, if a user wishes to exit Management function 122e, the user selects exit function 1824 (FIG. 18A), at which process 1800 ends as discussed above. Process 1800 then returns control to process 100 at step 117 of process 100 (FIG. 1) at which the user may select a new function from the current subsystem main menu (i.e., the SMS subsystem).

Figure 20A:
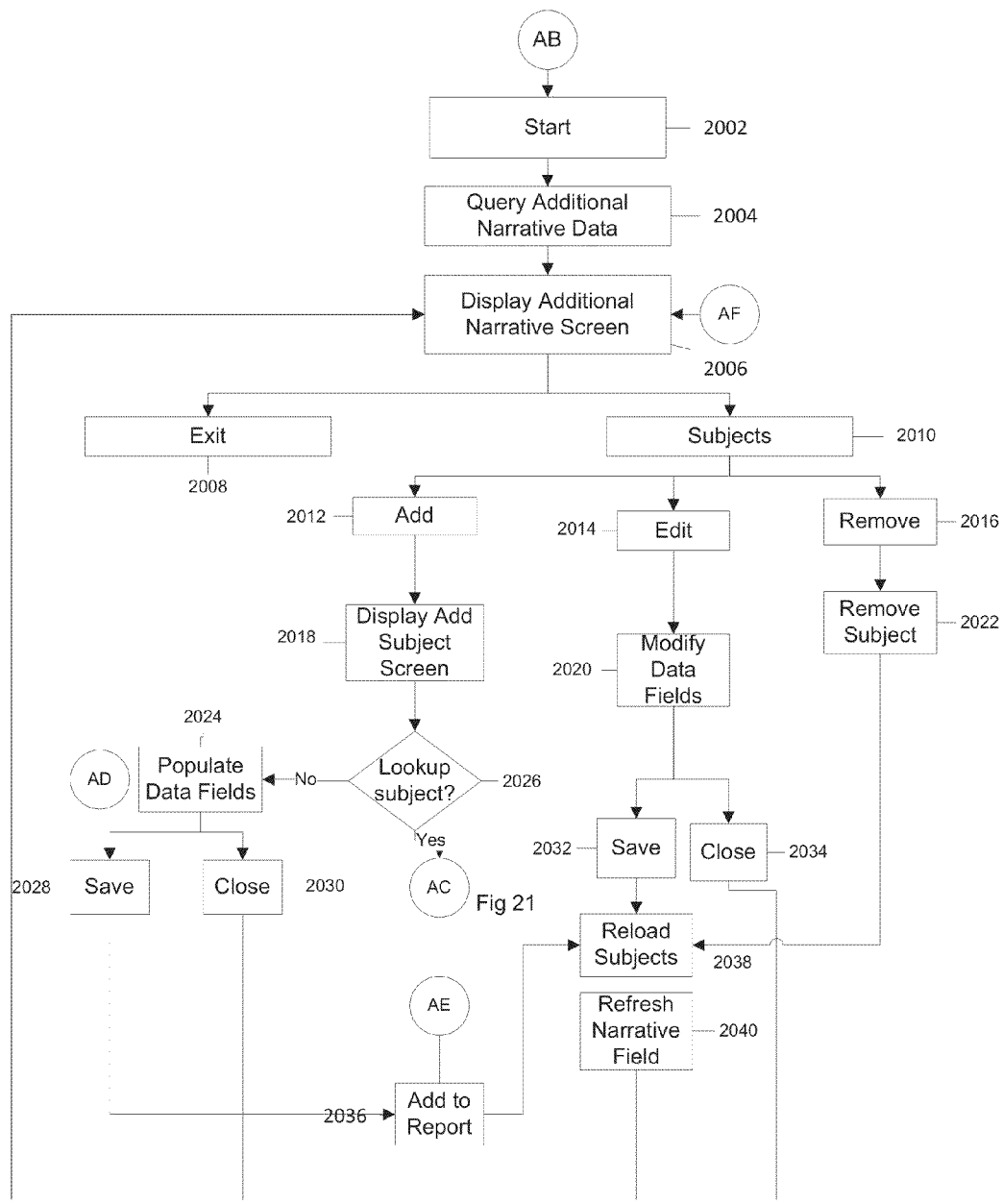
FIGS. 20A-C depict flowcharts of one method of allowing a user to add additional narrative to a report, which currently includes subjects, articles and vehicles and in future may include other entities.
Figure 20B:
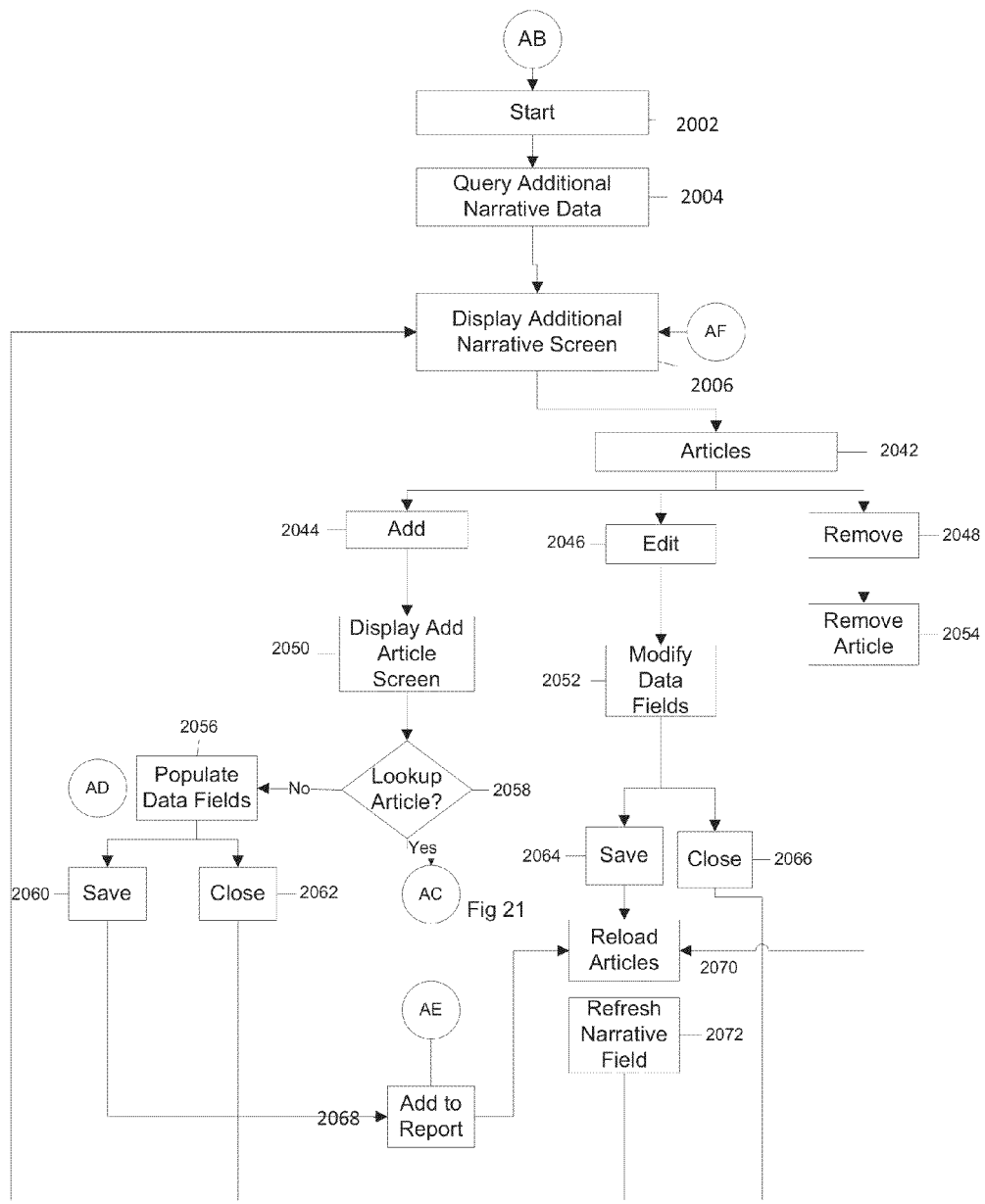
Figure 20C:
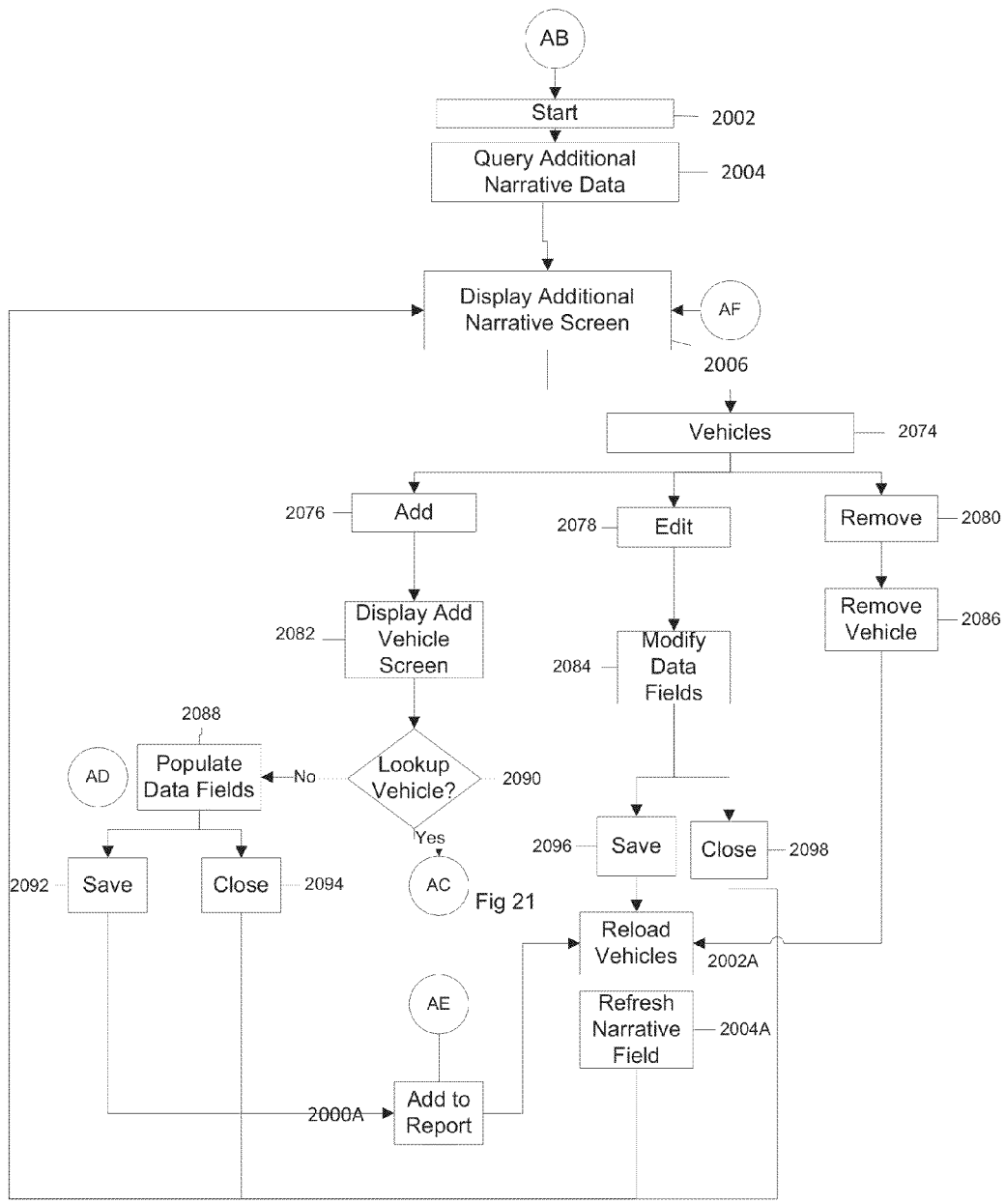

Now referring to FIG. 20, illustrated is a flowchart of one method of allowing a user to add additional narrative to a report, which currently includes subjects, articles and vehicles and in future may include other entities in accordance with the method of the present invention illustrated in FIG. 15C. Process 2000 begins at 2002, typically after being launched from a master process such as process 1500 as described above with respect to FIG. 15B and FIG. 15D. For example, process 2000 may be initiated by selecting the Additional Narrative function 1585 (FIG. 15B) or from Additional Narrative function 1521 (FIG. 15D). Once process 2000 has been initiated, it proceeds to 2004. At 2004, the client application executes a data query to server 208 and database 210, specifically, Subjects table 1984 (to obtain information related to the subject such as first and last name, ssn, dob, driver license, race, gender, build, home and work address, etc.), MotorVehicles Table 1976 (to obtain vehicle information such as body type, expiry date, color, make, model, and the like), Articles table 1980 (to obtain article information such as manufacturer, model, description, quantity, and the like), AdditionalReportSubjects table 1986 (to obtain the list of subjects linked to the current report) AdditionalReportMotorVehicles table 1978 (to obtain a list of motor vehicles linked to the current report) and AdditionalReportArticles table 1982 (to obtain a list of articles linked to the current report).

At 2006, the additional narrative screen is displayed with any existing links to subjects, articles and motor vehicles along with the option to add, edit and remove for each of the entities.

At 2008, the user can choose to exit the additional narrative function by clicking, tapping or using other forms of input to select the close button. Process 2000, terminates and returns to process 1500, to FIG. 15B or FIG. 15D.

At 2010, the user can select subjects, where the user can add, edit or remove subjects for the current report.

At 2012, the user can choose to add a subject to the additional narrative by clicking, tapping or using other forms of input to select the add button.

Process 2000 then proceeds to 2018, where an empty add subject screen is displayed.

Typically, the user would enter the subjects last name and initiate a look up at 2026, in which case process 2100 proceeds to sub-method AC in FIG. 21.

Sub-method AC would return at sub-method AE if the user had selected a lookup item, in which case the process would proceed to 2036. Alternatively, if the user did not select a lookup item, sub-method AC would return at AD, in which case the process would proceed to 2024.

At 2024, the user would populate the fields related to the subject.

At 2028, the user can select to save the subject in which case the information is transmitted to the server to be stored in the subjects table.

Process 2000 then proceeds to 2036.

Alternately, if the user selects to cancel adding a subject, the close function can be selected and the process would proceed to 2030 where the user can click, tap or choose other forms of input to select the close button. Process 2000 then would proceed to 2006.

At 2036, the user would have either selected a lookup item from sub-method AC or would have added a new subject at 2028. The subject reference is then added to the AdditionalReportSubjects table and the process proceeds to 2038, where the information related to all additional narrative items is queries similar to 2004 and the process proceeds to 2040 where the narrative field on the current report is populated with the text related to all subjects, articles and motor vehicles selected in the additional narrative function.

Alternately, if the user chooses function 2014, by selecting the edit button by clicking, tapping or any other form of input, process 2000 proceeds to 2020.

At 2020, the user can modify the content fields to their liking.

If the user chooses to save, process 2000 proceeds to 2032, where the information is sent to the server to be saved in the database. Process 2000 then concludes by proceeding to 2038.

Alternately if the user chooses not to save, process 2000 proceeds to 2034, where the user clicks, taps or uses other forms of input to select the cancel button. Process 2000 then proceeds back to 2006.

Alternately if the user chooses to remove a subject from the additional narrative, the process goes to 2016 where the user can click, tap or select other form of input to select the remove button.

Process 2000 then proceeds to 2022 where the association between subjects and report is removed on the server in the AdditionalReportSubjects table and the process 2100 proceeds to 2038.

At 2042, the user can select articles, where the user can add, edit or remove articles for the current report.

At 2044, the user can choose to add a article to the additional narrative by clicking, tapping or using other forms of input to select the add button.

Process 2000 then proceeds to 2050, where an empty add article screen is displayed.

Typically, the user would enter the article's serial number and initiate a look up at 2058, in which case process 2100 proceeds to sub-method AC in FIG. 21.

Sub-method AC would return at sub-method AE if the user had selected a lookup item, in which case the process would proceed to 2062. Alternatively, if the user did not select a lookup item, sub-method AC would return at AD, in which case the process would proceed to 2056.

At 2056, the user would populate the fields related to the article.

At 2060, the user can select to save the article in which case the information is transmitted to the server to be stored in the articles table.

Process 2000 then proceeds to 2068.

Alternately, if the user selects to cancel adding an article, the close function can be selected and the process would proceed to 2062 where the user can click, tap or choose other forms of input to select the close button. Process 2000 then would proceed to 2006.

At 2068, the user would have either selected a lookup item from sub-method AC or would have added a new article at 2060. The article reference is then added to the AdditionalReportArticles table and the process proceeds to 2070, where the information related to all additional narrative items is queries similar to 2004 and the process proceeds to 2072 where the narrative field on the current report is populated with the text related to all subjects, articles and motor vehicles selected in the additional narrative function.

Alternately, if the user chooses function 2046, by selecting the edit button by clicking, tapping or any other form of input, process 2000 proceeds to 2052.

At 2052, the user can modify the content fields to their liking.

If the user chooses to save, process 2000 proceeds to 2064, where the information is sent to the server to be saved in the database. Process 2000 then concludes by proceeding to 2070.

Alternately if the user chooses not to save, process 2000 proceeds to 2066, where the user clicks, taps or uses other forms of input to select the cancel button. Process 2000 then proceeds back to 2006.

Alternately if the user chooses to remove an article from the additional narrative, the process goes to 2048 where the user can click, tap or select other form of input to select the remove button.

Process 2000 then proceeds to 2054 where the association between article and report is removed on the server in the AdditionalReportArticles table and the process 2100 proceeds to 2070.

At 2074, the user can select vehicles, where the user can add, edit or remove vehicles for the current report.

At 2076, the user can choose to add a vehicle to the additional narrative by clicking, tapping or using other forms of input to select the add button.

Process 2000 then proceeds to 2082, where an empty add vehicle screen is displayed.

Typically, the user would enter the vehicles VIN (Vehicle Identification Number) or the Plate number and initiate a look up at 2090, in which case process 2100 proceeds to sub-method AC in FIG. 21.

Sub-method AC would return at sub-method AE if the user had selected a lookup item, in which case the process would proceed to 2000A. Alternately, if the user did not select a lookup item, sub-method AC would return at AD, in which case the process would proceed to 2088.

At 2088, the user would populate the fields related to the vehicle.

At 2092, the user can select to save the vehicle in which case the information is transmitted to the server to be stored in the MotorVehicles table.

Process 2000 then proceeds to 2000A.

Alternately, if the user selects to cancel adding a vehicle, the close function can be selected and the process would proceed to 2094 where the user can click, tap or choose other forms of input to select the close button. Process 2000 then would proceed to 2006.

At 2000A, the user would have either selected a lookup item from sub-method AC or would have added a new vehicle at 2092. The vehicle reference is then added to the AdditionalReportVehicles table and the process proceeds to 2002A, where the information related to all additional narrative items is queries similar to 2004 and the process proceeds to 2004A where the narrative field on the current report is populated with the text related to all subjects, articles and motor vehicles selected in the additional narrative function.

Alternately, if the user chooses function 2078, by selecting the edit button by clicking, tapping or any other form of input, process 2000 proceeds to 2084.

At 2084, the user can modify the content fields to their liking.

If the user chooses to save, process 2000 proceeds to 2096, where the information is sent to the server to be saved in the database. Process 2000 then concludes by proceeding to 2000A.

Alternately if the user chooses not to save, process 2000 proceeds to 2098, where the user clicks, taps or uses other forms of input to select the cancel button. Process 2000 then proceeds back to 2006.

Alternately if the user chooses to remove a vehicle from the additional narrative, the process goes to 2080 where the user can click, tap or select other form of input to select the remove button.

Process 2000 then proceeds to 2086 where the association between vehicle and report is removed on the server in the AdditionalReportVehicles table and the process 2100 proceeds to 2000A.

Now referring to FIG. 21, illustrates is a flowchart of one method of allowing a user to lookup subjects, articles and vehicles on report fields which are capable of lookup in accordance with the method of the present invention illustrated in FIG. 15D and FIG. 20. Currently this supports subjects, articles and vehicles but in the future may support other entities. For example, process 2100 may be initiated by pressing the F6 function key on the keyboard on a field which is configured to have a lookup. In the future this functionality to initiate the lookup may be achieved using a button, mouse gesture, touch gesture or other methods of input. Once process 2100 has been initiated, it proceeds to 2104.

At 2104, the client application checks to see if the field which initiated the lookup is configured to handle the lookup functionality. If it is not, process 2100 concludes at sub-method AF.

At 2104, if the field is configured to handle lookup, the client application passes the current value of the field and process 2100 proceeds to 2128.

Figure 24:
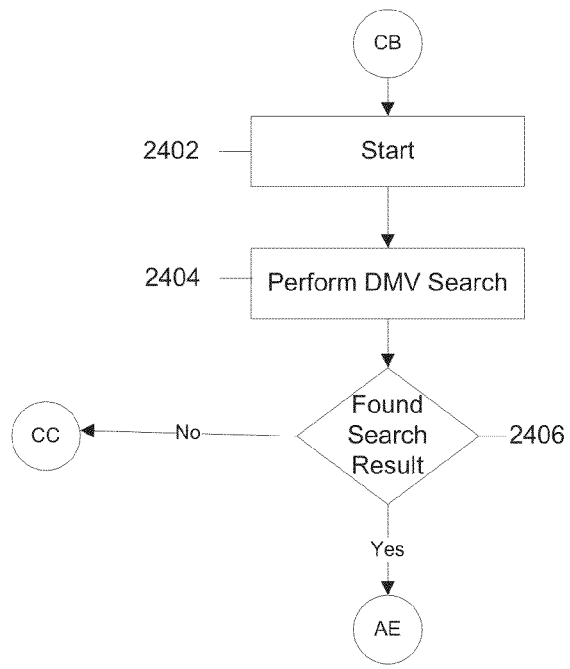
FIG. 24 depicts a flowchart of one method of allowing a user to perform a DMV search on a driver's license or a license plate.

At 2128, if the field is configured to handle Driver's License or License Plate lookup, the client application passes the current value of the field and process 2100 proceeds to sub-method CB in FIG. 24. If it is not, process 2100 proceeds to 2106.

At 2106, the client application executes a data query to server 208 and database 210, depending on the type of lookup the tables accessed are, Subjects table 1984 (to search for subjects matching the last name provided and to obtain information related to the subject such as first and last name, ssn, dob, driver license, race, gender, build, home and work address, and the like), MotorVehicles Table 1976 (to search for a vehicle using the VIN or the plate number and to obtain vehicle information such as body type, expiry date, color, make, model, and the like), and Articles table 1980 (to search for an article using the serial number and to obtain article information such as manufacturer, model, description, quantity, and the like).

Process 2100 then proceeds to step 2108, where the retrieved search results are displayed to the user. The results are displayed via a generic list control in .NET.

The user is presented with a choice of four functions, namely, Change Search Text 2110, Select Result 2112, Edit 2114 and Exit 2116.

If the user wished to modify the search text, process 2100 proceeds from 2110 to 2106, where the user can change the search criteria.

Alternately, if the user chooses function 2112, by selecting a search results by clicking, tapping or any other form of input, process 2100 proceeds to 2118.

At 2118, the user would need to specify the Role of the search result in order to finalize selection.

Process 2100 proceeds to 2120 after the user specifies the role, where the user confirms the selection by clicking, tapping or other forms of input on the select button currently depicted by a check mark. This button might be modified in the future to user other symbols or text to specify its purpose.

Process 2100 then concludes by exiting through sub-method AE.

Alternately, if the user chooses function 2114, by selecting the edit button by clicking, tapping or any other form of input, process 2100 proceeds to 2122.

At 2122, the user can modify the content fields to their liking.

If the user chooses to save, process 2100 proceeds to 2124, where the information is sent to the server to be saved in the database. Process 2100 then proceeds to 2108.

Alternately if the user chooses not to save, process 2100 proceeds to 2126, where the user clicks, taps or uses other forms of input to select the cancel button. Process 2100 then proceeds back to 2108.

Alternately, if the user chooses to exit the lookup functionality, process 2100 proceeds to 2116, where the user clicks, taps, or uses other forms of input to select the close button. Process 2100 then concludes by proceeding to sub-method AF.

Figure 22:
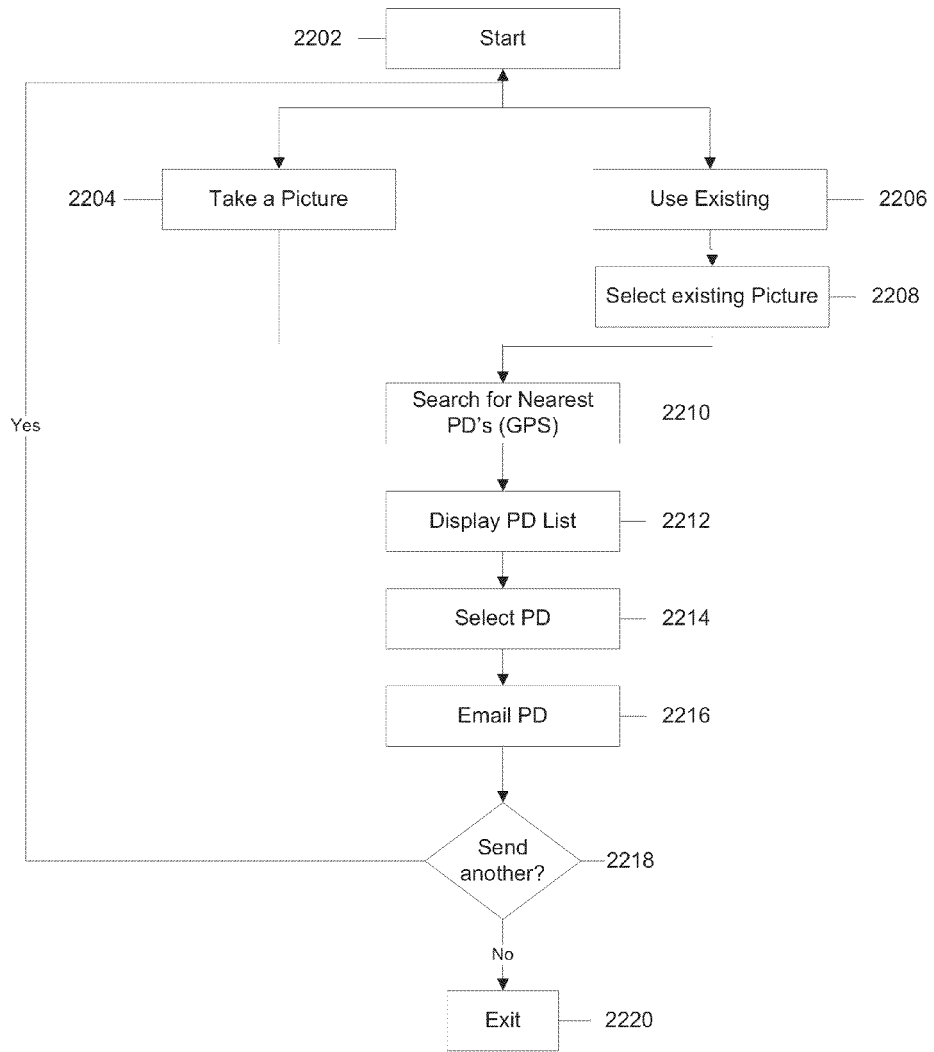
FIG. 22 depicts a flowchart of one method of allowing a user to use a Mobile application to send Picture(s)/Video(s) to a nearby law enforcement agency to report suspicious behavior/crime.

Now referring to FIG. 22, a flowchart is illustrated depicting one method of allowing a user to use a Mobile application to send Picture(s)/Video(s) to a nearby law enforcement agency to report suspicious behavior/crime. For example, process 2200 may be initiated using a custom app on a portable electronic device, such as an Apple iOS device, Android device, Windows Mobile Device or a Blackberry Device. Process 2200 may be initiated by pressing the app icon on the mobile device. In some embodiments, this functionality to initiate the process may be achieved using a button, mouse gesture, touch gesture or other methods of input. Once process 2200 has been initiated, it proceeds to 2202.

At 2202, the user is presented with a choice of two functions, namely, Take a Picture/Video and Use Existing. If the user wished to take a new Picture/Video, process 2200 proceeds from 2202 to 2204.

At 2204, the user can take a picture or video using the Native mobile API provided by Apple iOS, Android, Windows Phone or Blackberry. The user records picture/video and the process 2204 proceeds to 2210. Alternately, if the user chooses function 2206, by selecting Use Existing by clicking, tapping or any other form of input, process 2200 proceeds to 2206.

At 2206, the user initiates the process by clicking on Use Existing button. In some embodiments, this process may be achieved using a button, mouse gesture, touch gesture or other methods of input.

Once initiated, process 2206 proceeds to 2208. At 2208, the user can select and existing picture/video using the Native mobile API provided by Apple iOS, Android, Windows Phone or Blackberry. Once selected, process 2206 proceeds to 2210.

At 2210, the application uses the GPS coordinates provided by the native mobile operating system and sends a query to the webservice. The webservice in-turn returns a list of agencies close to the coordinates.

Process 2210 proceeds to 2212, where the user is presented with a list of agencies provided by process 2210.

At 2214, the user selects the agency where the selected photo/video should be sent to. Once initiated, process 2214 proceeds to 2216, where a message, such as an email, is generated from the user's mobile device and the email containing the picture/video selected is sent.

Once completed, process 2216 proceeds to 2218 where the user can select to send another photo/video, in which case the process proceeds to 2202. Alternately the user can choose to end the session which will proceed to process 2220. At 2220, the client application closes.

Once the process is completed, the agency selected will receive the email sent by users. Here, there is a manual process in place where by the agency user will sift through emails received and decide on valid leads. The agency user then can decide to utilize the Messaging functionality as outlined in FIG. 1200, to transmit phone/video to the rest of the department.

Now referring to FIG. 23, a flowchart is illustrated that depicts one method of allowing a user to initiate Live Talk functionality which enables one user to have a video/audio call with another. For example, process 2300 may be initiated by pressing the Live Talk button. In some embodiments, this functionality to initiate the Live Talk may be achieved using a button, mouse gesture, touch gesture or other methods of input. Once process 2300 has been initiated, it proceeds to 2304.

At 2304, the client application sends a request to the webservice to initiate a audio-video call with the selected user. At this point the two users see the screen indicating that a call is being initiated. Any of the two users can choose to connect or ignore the call.

At 2306, if the call is connected, by the connection being established and the recipient user accepting the call, the process 2306 proceeds to 2308. If it is not, process 2304 proceeds to 2310.

At 2308, the client application displays the feed from the caller and the recipients web cameras. This is achieved, for example, using standard .NET framework video control. At this point the users can video chat and hear the audio between each other.

At 2310, the Live Talk session is ended, either by one other user selection or from process 2306. Once finished process 2310 proceeds to 2312 where the process ends.

Now referring to FIG. 24, a flowchart is illustrated depicting one method of allowing a user to perform a DMV search on a driver's license or a license plate. For example, process 2400 may be initiated as part of process 2100 lookup. Once process 2400 has been initiated, it proceeds to 2404.

Process 2404, uses the same functionality as process 1100 and queries the external system to retrieve driver license or license plate information.

Process 2404 proceeds to 2406, if a result is found the process proceeds to sub-function AE to update the report. If not it returns to sub-function CC in FIG. 2100 returning to process 2106.

Figure 25:
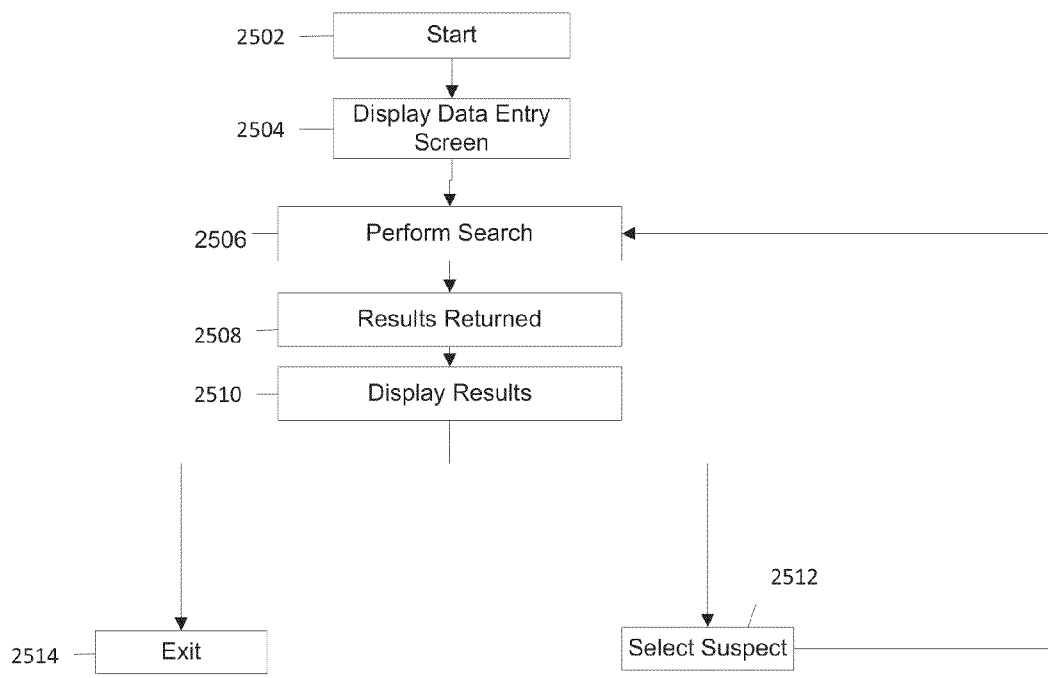
FIG. 25 depicts a flowchart of one method of allowing a user to create a suspect mapping chart of statistical data related to past incidents and/or events, suspects, vehicles, articles, offices and other entities in the system.

Now referring to FIG. 25, a flowchart is illustrated depicting one method of allowing a user to create a suspect mapping chart of statistical data related to past incidents and/or events, suspects, vehicles, articles, offices and other entities in the system. Process 2500 begins at 2502, typically after being launched from a master process such as process 100 as described above with respect to FIG. 1. For example, process 2500 may be initiated by selecting the Suspect Mapping function 122*h* (FIG. 1) from the SMS subsystem main menu. Once process 2500 has been initiated, it proceeds to 2504.

At 2504, the search criteria data entry screen is displayed to the user. This data entry screen includes text field to search for information related to suspects.

Once the user has populated the desired data field, process 2500 proceeds to 2506, at which the client application transmits the data entered to server 208 and database 210. This step may be performed when the user clicks or touches an enter, submit, search, or similar icon. Alternatively, submission of the data may cause the data to be automatically sent to server 208 and database 210. This causes the messaging subsystem to run a query of database 210, specifically, IncidentStatuses table 1952 (to obtain incident or event status such as active or inactive), Incidents table 1948 (to obtain incident or event IR number and location), IncidentPersonnel table 1934 (to obtain personnel associated with the incident or event), Personnel table 1928 (to obtain information related to the personnel such as department, personnel category, badge number, first and last name, whether employment of personnel is active, or the like), IncidentTypes table 1960 (to obtain incident types such as riot, robbery, and the like), and Streets 1902 (to obtain streets associated with the incidents or events).

Process 2500 then proceeds to step 2508, at which all personnel/suspects are retrieved. Next, at 2510, the retrieved personnel/suspects are displayed to the user. The results are displayed via a generic WPF mapping control in, for example, .NET.

At 2510, the results have been displayed and the user is presented with a choice of two functions namely, Select Suspect 2512, and Exit function 2514.

If the user wishes to select a suspect, process 2500 proceeds to 2506. Alternatively, if a user wishes to exit Suspect Mapping function 122*d*, the user selects exit function 2514, at which process 2500 proceeds to 2514, at which process 2500 ends as discussed above.

It should be understood, of course, that the foregoing relates to exemplary embodiments of the invention and that modifications may be made without departing from the spirit and scope of the invention as set forth in the following claims.

What is claimed is:

1. An integrated information management and action system employed for use in the emergency response services by mobile and non-mobile users comprising:
    an access sub-system operable to receive credentials from a user communicatively coupled to said management system, and that upon receiving said credentials, logs said user into said management system;
    an action sub-system operable to receive an action request from a first user and transmits said action request to a second user;
    one or more mobile interface units;
    a computer-aided dispatch sub-system allowing dispatch personnel to assign personnel to an incident or event, the computer-aided dispatch sub-system including a personnel status field for identifying a status of each of the personnel assigned to the incident or event;
    a report management sub-system for creating, viewing, and editing reports;
    a supervisor management sub-system;
    one or more non-mobile interface units;
    a central processing device operatively connected to said mobile interface units via a first network, said central processing device operatively connected to said non-mobile interface units via a second network; and
    an information storage sub-system internal to or operatively coupled to said central processing device, wherein the user is granted access to at least one of the supervisor management sub-system, the report management sub-system and the computer-aided dispatch sub-system based on the credentials entered in the access sub-system, wherein when the user generates a report, editing access to the report is limited and tracked within the report management sub-system to ensure chain of custody of the report;
    said mobile interface units include a two-way audio and video subsystem having a live talk functionality which enables incident command of an incident from a remote location;
    said mobile interface units include a suspect mapping chart subsystem that creates a suspect mapping chart of statistical data related to past incidents and/or events, suspects, vehicles, articles, and offices in the system; and
    the action sub-system, the access sub-system, the computer-aided dispatch sub-system, the report management sub-system and the supervisory sub-system are integrated into a single system accessible by the mobile and non-mobile users.

2. The system according to claim 1, wherein said mobile interface units include a map generation sub-system.

3. The system according to claim 1, wherein said mobile interface units include a report search sub-system capable of retrieving one or more of said reports.

4. The system according to claim 1, wherein said mobile interface units include a remote database access sub-system that allows said user to access one or more remote databases.

5. The system according to claim 4, wherein said remote database is at least one of a motor vehicle information database and a National Crime Information Center database.

6. The system according to claim 1, wherein said mobile interface units includes at least one of an instant messaging sub-system, a message board sub-system, a contact information sub-system; and a statistical analysis sub-system.

7. The system according to claim 1, wherein said report generation sub-system allows comments to be provided to a creator of said report.

8. The system according to claim 1, wherein said mobile interface units include a plurality of mobile interface units, and said non-mobile interface units include a plurality of non-mobile interface units.

9. The system according to claim 1, wherein said mobile interface units include a picture/video sending subsystem allowing a user to use a mobile application to send Picture(s)/Video(s) to a nearby law enforcement agency to report suspicious behavior/crime.

10. The system according to claim 1, wherein said mobile interface units include a records search subsystem allowing a user to perform a department of motor vehicle search on a driver's license or a license plate.

11. The system according to claim 1, wherein the one or more mobile interface units include one or more of a language translation sub-system, an action receipt sub-system, a voice-to-text conversion sub-system, a media management sub-system, a revision management sub-system that restricts abilities of at least a portion of said users, and a report generation sub-system that creates reports operatively coupled to at least one of said language translation sub-system, said action receipt sub-system, said voice-to-text conversion sub-system, said media management sub-system, and said revision management sub-system to auto-populate report fields.

12. An integrated information management and action system employed for use in the emergency response services by mobile and non-mobile users comprising:
    an access sub-system operable to receive credentials from a user communicatively coupled to the information management and action system, and that upon receiving said credentials, logs said user into the information management and action system;
    a computer-aided dispatch sub-system allowing dispatch personnel to assign personnel to an incident or event, the computer-aided dispatch sub-system including a personnel status field for identifying a status of each of the personnel assigned to the incident or event;

a report management sub-system for creating, viewing, and editing reports;

a supervisor management sub-system;

one or more mobile interface units;

one or more non-mobile interface units;

a central processing device operatively connected to said mobile interface units via a first network, said central processing device operatively connected to said non-mobile interface units via a second network; and an information storage sub-system internal to or operatively coupled to said central processing device, wherein the user is granted access to at least one of the supervisor management sub-system, the report management sub-system and the computer-aided dispatch sub-system based on the credentials entered in the access sub-system, wherein when the user generates a report, editing access to the report is limited and tracked within the report management sub-system to ensure chain of custody of the report;

said mobile interface units include a two-way audio and video subsystem having a live talk functionality which enables incident command of an incident from a remote location;

said mobile interface units include a suspect mapping chart subsystem that creates a suspect mapping chart of statistical data related to past incidents and/or events, suspects, vehicles, articles, and offices in the system; and the action sub-system, the access sub-system, the computer-aided dispatch sub-system, the report management sub-system and the supervisory sub-system are integrated into a single system accessible by the mobile and non-mobile users.

13. The system according to claim 12, further comprising a messaging function that enables the user to transmit messages and/or orders, with or without images, to all personnel or a subset thereof.

14. The system according to claim 12, further comprising a timestamp automatically assigned to notes added within the report management sub-system.

15. The system according to claim 12, further comprising a video and image processing sub-system allowing a user to include video and images into reports.

* * * * *